(12) United States Patent
Zhang et al.

(10) Patent No.: US 9,470,339 B2
(45) Date of Patent: Oct. 18, 2016

(54) FITTING FOR CONNECTING TWO PIECES OF CHANNEL FRAMING TO ONE ANOTHER

(71) Applicant: Cooper Technologies Company, Houston, TX (US)

(72) Inventors: Zhihui Zhang, Edwardsville, IL (US); William E. McCarthy, Edwardsville, IL (US); James A. Knutson, Collinsville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/298,483

(22) Filed: Jun. 6, 2014

(65) Prior Publication Data

US 2014/0283475 A1   Sep. 25, 2014

Related U.S. Application Data

(63) Continuation of application No. 13/966,897, filed on Aug. 14, 2013.

(60) Provisional application No. 61/785,097, filed on Mar. 14, 2013.

(51) Int. Cl.
   *F16L 3/10*   (2006.01)
   *E04B 2/78*   (2006.01)
   (Continued)

(52) U.S. Cl.
   CPC .................. *F16L 3/10* (2013.01); *E04B 1/185* (2013.01); *E04B 1/1903* (2013.01);
   (Continued)

(58) Field of Classification Search
   CPC .... E04B 1/185; E04B 1/1903; E04B 2/7809;
   E04B 2001/1957; E04C 3/08; E04C 2003/0447; F16L 3/10; F16L 3/221; F16B 35/06; F16B 37/0885; Y10T 29/49625
   See application file for complete search history.

(56) References Cited

U.S. PATENT DOCUMENTS 1,813,545 A   7/1931   Reinhold
1,963,908 A   6/1934   Manasek
(Continued)

FOREIGN PATENT DOCUMENTS

CN   202416847 U   9/2012
DE   7701100 U1   5/1977
(Continued)

OTHER PUBLICATIONS

Non-Final Office action for U.S. Appl. No. 13/966,897, Oct. 7, 2014, 12 pages.
(Continued)

*Primary Examiner* — Jeanette E Chapman
(74) *Attorney, Agent, or Firm* — Senniger Powers LLP

(57) ABSTRACT

A fitting for connecting first and second pieces of channel framing to one another includes a coupling component having first and second coupling portions. The first coupling portion has a dovetail cross-sectional shape, and the second coupling portion having a dovetail cross-sectional shape which is inverted relative to the first coupling portion. The first coupling portion is configured for reception in a fitting groove of the first piece of channel framing, and the second coupling portion is configured for reception in a fitting groove of the second piece of channel framing to connect the first and second pieces of channel framing to one another such that the fitting sides of the first and second pieces of channel framing are juxtaposed and face one another.

19 Claims, 81 Drawing Sheets

(51) Int. Cl.
  *F16B 37/08* (2006.01)
  *F16L 3/22* (2006.01)
  *E04B 1/18* (2006.01)
  *E04B 1/19* (2006.01)
  *E04C 3/08* (2006.01)
  *F16B 35/06* (2006.01)
  *H02G 3/04* (2006.01)
  *E04C 3/04* (2006.01)

(52) U.S. Cl.
  CPC .............. *E04B 2/7809* (2013.01); *E04C 3/08* (2013.01); *F16B 35/06* (2013.01); *F16B 37/0885* (2013.01); *F16L 3/221* (2013.01); *H02G 3/0437* (2013.01); *E04B 2001/1957* (2013.01); *E04C 2003/0447* (2013.01); *Y10T 29/49625* (2015.01)

(56) References Cited

U.S. PATENT DOCUMENTS

| | | | |
|---|---|---|---|
| 2,307,653 A | 1/1943 | Wright | |
| 2,375,513 A | 5/1945 | Bach | |
| 2,420,826 A | 5/1947 | Irrgang | |
| 2,470,991 A | 5/1949 | Kindorf et al. | |
| 2,767,609 A | 10/1956 | Cousino | |
| 2,767,951 A | 10/1956 | Cousino | |
| 2,846,169 A | 8/1958 | Sulllivan | |
| 3,226,069 A | 12/1965 | Clarke | |
| 3,310,264 A | 3/1967 | Appleton | |
| 3,312,034 A | 4/1967 | Steinmann | |
| 3,396,499 A | 8/1968 | Biffani | |
| 3,417,951 A | 12/1968 | Rebentisch, Jr. | |
| 3,451,183 A | 6/1969 | Lespagnol et al. | |
| 3,463,428 A | 8/1969 | Kindorf et al. | |
| 3,486,726 A | 12/1969 | Kindorf et al. | |
| 3,513,606 A | 5/1970 | Jones | |
| 3,527,432 A | 9/1970 | Lytle | |
| 3,547,385 A | 12/1970 | Kindorf | |
| 3,566,561 A | 3/1971 | Tozer | |
| 3,592,493 A | 7/1971 | Goose | |
| 3,601,347 A | 8/1971 | Attwood et al. | |
| 3,612,461 A | 10/1971 | Brown | |
| 3,650,499 A | 3/1972 | Biggane | |
| 3,752,198 A * | 8/1973 | Fiorentino | D03C 3/24 140/92.1 |
| 3,757,485 A | 9/1973 | Vincens | |
| 3,944,308 A | 3/1976 | Persson | |
| 3,986,314 A | 10/1976 | Moeller | |
| 3,998,419 A | 12/1976 | Semmerling | |
| 4,044,428 A | 8/1977 | Kowalski | |
| 4,185,802 A | 1/1980 | Myles et al. | |
| 4,211,381 A | 7/1980 | Heard | |
| 4,216,930 A | 8/1980 | Rossler, Jr. et al. | |
| 4,227,355 A | 10/1980 | Wendt | |
| 4,358,216 A | 11/1982 | Pleickhardt et al. | |
| 4,379,651 A | 4/1983 | Nagashima | |
| 4,417,711 A | 11/1983 | Madej | |
| 4,479,341 A | 10/1984 | Schuplin | |
| 4,516,296 A | 5/1985 | Sherman | |
| 4,610,562 A | 9/1986 | Dunn | |
| 4,637,748 A | 1/1987 | Beavers | |
| 4,657,458 A | 4/1987 | Wollar et al. | |
| 4,708,554 A | 11/1987 | Howard | |
| 4,726,165 A | 2/1988 | Brinsa | |
| 4,830,531 A | 5/1989 | Condit et al. | |
| 4,948,313 A | 8/1990 | Zankovich | |
| 4,950,099 A | 8/1990 | Roellin | |
| 4,961,553 A | 10/1990 | Todd | |
| 5,022,614 A | 6/1991 | Rinderer | |
| D322,929 S | 1/1992 | Abbestam et al. | |
| 5,102,074 A | 4/1992 | Okada | |
| 5,141,186 A | 8/1992 | Cusic | |
| 5,146,724 A | 9/1992 | Angelo | |
| 5,163,644 A | 11/1992 | Kowalski | |
| 5,175,971 A * | 1/1993 | McCombs | E04H 12/02 52/697 |
| 5,228,263 A | 7/1993 | Vaughn | |
| 5,335,890 A | 8/1994 | Pryor et al. | |
| 5,351,926 A | 10/1994 | Moses | |
| 5,375,798 A | 12/1994 | Hungerford, Jr. | |
| 5,489,173 A * | 2/1996 | Hofle | 411/85 |
| 5,503,511 A | 4/1996 | Flamme | |
| 5,595,363 A | 1/1997 | De Leebeeck | |
| 5,628,508 A | 5/1997 | Koole | |
| 5,628,598 A | 5/1997 | Hofle | |
| 5,655,865 A * | 8/1997 | Plank et al. | 411/85 |
| 5,729,948 A * | 3/1998 | Levy et al. | 52/656.9 |
| 5,746,535 A * | 5/1998 | Kohler | 403/258 |
| 5,779,412 A | 7/1998 | Nagai et al. | |
| 5,799,452 A | 9/1998 | Moore | |
| 5,799,907 A | 9/1998 | Andronica | |
| 5,806,897 A * | 9/1998 | Nagai et al. | 285/86 |
| 5,820,322 A | 10/1998 | Hermann et al. | |
| 5,855,342 A | 1/1999 | Hawkins et al. | |
| 5,864,997 A | 2/1999 | Kelly | |
| 5,918,999 A | 7/1999 | Lamarca | |
| 5,924,650 A | 7/1999 | Richichi | |
| 5,927,041 A | 7/1999 | Sedlmeier et al. | |
| 5,984,243 A | 11/1999 | Pfaller et al. | |
| 5,988,930 A | 11/1999 | Liebetrau et al. | |
| 6,061,984 A | 5/2000 | Rose | |
| 6,062,764 A | 5/2000 | Rixen et al. | |
| 6,322,030 B1 | 11/2001 | Marra | |
| 6,484,358 B1 | 11/2002 | Duong et al. | |
| 6,494,415 B1 | 12/2002 | Roth | |
| 6,572,057 B1 | 6/2003 | Roth | |
| 6,655,099 B1 | 12/2003 | Trenoweth | |
| 6,660,938 B2 | 12/2003 | Herb et al. | |
| 6,679,461 B1 | 1/2004 | Hawkins | |
| 6,682,253 B2 | 1/2004 | Binna et al. | |
| 6,712,543 B1 | 3/2004 | Schmalzhofer | |
| 6,726,117 B2 | 4/2004 | Herb et al. | |
| 6,751,914 B2 | 6/2004 | Zeh et al. | |
| 7,014,213 B1 | 3/2006 | Kaiser | |
| 7,044,701 B2 | 5/2006 | Herb | |
| 7,096,641 B2 | 8/2006 | Birnbaum et al. | |
| 7,179,010 B2 | 2/2007 | Weger et al. | |
| 7,240,884 B2 | 7/2007 | Shim | |
| 7,287,733 B2 | 10/2007 | Bongio et al. | |
| 7,389,621 B2 | 6/2008 | Hawes | |
| 7,448,822 B2 | 11/2008 | Nebeker et al. | |
| 7,478,787 B2 | 1/2009 | Bankston et al. | |
| 7,484,697 B1 | 2/2009 | Nelson | |
| 7,600,724 B2 | 10/2009 | Nelson et al. | |
| 7,604,444 B2 | 10/2009 | Wu | |
| 7,661,915 B2 | 2/2010 | Whipple | |
| 7,818,925 B2 | 10/2010 | Benedict | |
| 7,922,130 B2 | 4/2011 | Hawkins | |
| 7,922,417 B2 | 4/2011 | Jimenez | |
| 7,984,601 B2 | 7/2011 | Bimbaum et al. | |
| 8,100,600 B2 * | 1/2012 | Blum | F16B 37/045 403/256 |
| 8,225,581 B2 | 7/2012 | Strickland et al. | |
| 8,303,223 B2 | 11/2012 | Rass et al. | |
| 8,341,913 B2 | 1/2013 | Meres et al. | |
| 8,366,340 B2 * | 2/2013 | Munakata et al. | 403/255 |
| 8,454,259 B2 | 6/2013 | Oetlinger | |
| 8,465,242 B2 | 6/2013 | Arendt et al. | |
| 8,511,929 B2 | 8/2013 | Raye et al. | |
| 8,523,923 B2 * | 9/2013 | Thomke et al. | 606/324 |
| 8,567,030 B2 | 10/2013 | Koch et al. | |
| 8,596,009 B2 | 12/2013 | Baxter et al. | |
| 8,661,765 B2 | 3/2014 | Schaefer et al. | |
| 8,662,455 B2 | 3/2014 | Hernandez et al. | |
| 8,695,296 B2 | 4/2014 | Bergman | |
| D728,753 S | 5/2015 | Hikoyama | |
| 9,187,898 B1 | 11/2015 | Underkofler et al. | |
| 9,194,418 B2 | 11/2015 | Parthibhan et al. | |
| 2002/0000498 A1 | 1/2002 | Workman | |
| 2002/0060280 A1 | 5/2002 | Yaphe et al. | |
| 2002/0110435 A1 | 8/2002 | Herb et al. | |
| 2002/0122691 A1 | 9/2002 | Wood | |
| 2003/0042033 A1 | 3/2003 | Herb et al. | |

(56) References Cited

U.S. PATENT DOCUMENTS

| | | |
|---|---|---|
| 2003/0043033 A1 | 3/2003 | Lee |
| 2003/0063961 A1 | 4/2003 | Lay |
| 2003/0122044 A1 | 7/2003 | Unverzagt et al. |
| 2003/0159397 A1 | 8/2003 | Birnbaum |
| 2004/0165943 A1 | 8/2004 | Herb |
| 2004/0165947 A1 | 8/2004 | Herb |
| 2004/0165965 A1 | 8/2004 | Unverzagt et al. |
| 2004/0228681 A1 | 11/2004 | Herb |
| 2005/0116123 A1 | 6/2005 | Bailey et al. |
| 2005/0129458 A1 | 6/2005 | Hoffmann |
| 2006/0027715 A1 | 2/2006 | Dinh et al. |
| 2006/0038398 A1 | 2/2006 | Whipple et al. |
| 2007/0040075 A1 | 2/2007 | Moretto |
| 2007/0075213 A1 | 4/2007 | Foser et al. |
| 2007/0101670 A1 | 5/2007 | Ahren et al. |
| 2007/0120036 A1 | 5/2007 | Olle et al. |
| 2007/0145222 A1 | 6/2007 | Rausch |
| 2007/0248793 A1 | 10/2007 | Herb et al. |
| 2008/0229699 A1 | 9/2008 | Nehls |
| 2010/0102011 A1 | 4/2010 | Blum |
| 2010/0193645 A1 | 8/2010 | Merhar et al. |
| 2012/0110788 A1 | 5/2012 | Chen |
| 2012/0119037 A1 | 5/2012 | Azuma et al. |
| 2012/0286110 A1 | 11/2012 | Hill |
| 2012/0297723 A1 | 11/2012 | Siddiqui et al. |
| 2012/0315106 A1 | 12/2012 | Amedt et al. |
| 2014/0042286 A1 | 2/2014 | Jaffari |
| 2014/0091050 A1 | 4/2014 | Zhang |
| 2014/0093307 A1 | 4/2014 | Zhang |
| 2014/0097304 A1 | 4/2014 | Mastro |
| 2014/0197284 A1 | 7/2014 | Hikoyama |
| 2014/0283475 A1 | 9/2014 | Zhang et al. |
| 2015/0276092 A1 | 10/2015 | Oliver et al. |

FOREIGN PATENT DOCUMENTS

| | | |
|---|---|---|
| DE | 8232700 U1 | 6/1983 |
| DE | 35 13 382 A1 | 10/1986 |
| DE | 8704502 U1 | 5/1987 |
| DE | 102006035405 A1 | 5/2008 |
| DE | 202010004406 U1 | 7/2010 |
| DE | 102009000603 A1 | 9/2010 |
| DE | 20 2012 102 394 U1 | 9/2012 |
| EP | 0592743 A1 | 4/1994 |
| GB | 569377 | 5/1945 |
| GB | 687403 | 2/1953 |
| GB | 1157545 | 7/1969 |
| GB | 1370645 | 10/1974 |
| JP | 2000139583 | 5/2000 |
| WO | 9837349 A1 | 8/1998 |
| WO | 2013125821 A1 | 8/2013 |
| WO | 2014159372 A1 | 10/2014 |

OTHER PUBLICATIONS

Non-Final Office action for U.S. Appl. No. 14/298,461, Apr. 23, 2015, 8 pages.
International Search Report and Written Opinion for PCT/US2014/023253, dated Jul. 16, 2014, 8 pages.
Non-Final Office action for U.S. Appl. No. 13/966,897, Mar. 5, 2015, 20 pages.
Drawing of MQM Wing Nut, (at least as early as Mar. 13, 2012), 1 page.
Hilti MI/MZ Technical Guide, 4.2 MQ System Components—Load Data and Material Specifications, MQM Wing Nut, (at least as early as Mar. 13, 2012), 1 page, www.us.hilti.com, Canada.
Unistrut, P1000® & P1001 Channels, (at least as early as Mar. 13, 2012), 1 page.
Unistrut, P1100® & P1101 Channels, (at least as early as Mar. 13, 2012), 1 page.
Unistrut, P2000® & P2001 Channels, (at least as early as Mar. 13, 2012), 1 page.
Unistrut, Channels Nuts, Top Retainer Nut, (at least as early as Mar. 13, 2012), 1 page.
Power-Strut Engineering Catalog, Pictorial Table of Contents, (at least as early as Mar. 13, 2012), pp. 11-14, www.alliedeg.com.
B-Line by Eaton—Channel Nuts & Hardware, Strut Systems, (at least as early as Mar. 13, 2012), pp. 45-53.
Office action for U.S. Appl. No. 13/966,897, dated Aug. 25, 2015, 10 pages.
Office action for U.S. Appl. No. 14/298,461, dated Oct. 16, 2015, 11 pages.
Office action for U.S. Appl. No. 14/298,474, dated Oct. 30, 2015, 11 pages.
Office action for U.S. Appl. No. 14/298,469, dated Nov. 2, 2015, 9 pages.
Office action for U.S. Appl. No. 14/298,447, dated Nov. 2, 2015, 7 pages.
Final Office Action for U.S. Appl. No. 14/298,474, Apr. 1, 2016, 16 pages.
Power-Strut Engineering Catalog, Tyco International. 2008, retrieved on Jan. 5, 2016, http://www.power-strut.com/DB/PDF1/Power-Strut-Catalog_2008.pdf, pp. 63, 65.
Unistrut General Engineering Catalog. Catalog [online]. Unistrut Corporation. Mar. 1, 1998, retrieved on Jan. 5, 2016, http://www.unistrut.us/DB/PDF_Archive/No_12.pdf, pp. 117, 118.
Final Office action for U.S. Appl. No. 13/966,897, Feb. 2, 2016, 16 pages.
Non-Final Office action for U.S. Appl. No. 14/298,461, Feb. 8, 2016, 12 pages.
Final Office action for U.S. Appl. No. 14/298,447, Apr. 7, 2016, 10 pages.
Notice of Allowance for U.S. Appl. No. 14/298,469, Apr. 12, 2016, 11 pages.
Non-Final Office action for U.S. Appl. No. 13/966,897, Jul. 21, 2016, 13 pages.
Non-Final Office action for U.S. Appl. No. 14/298,461, Jul. 28, 2015, 13 pages.
Final Office Action for U.S. Appl. No. 14/298,474, Jul. 21, 2016, 9 pages.
Non-Final Office action for U.S. Appl. No. 14/298,447, Jul. 21, 2016, 8 pages.

\* cited by examiner

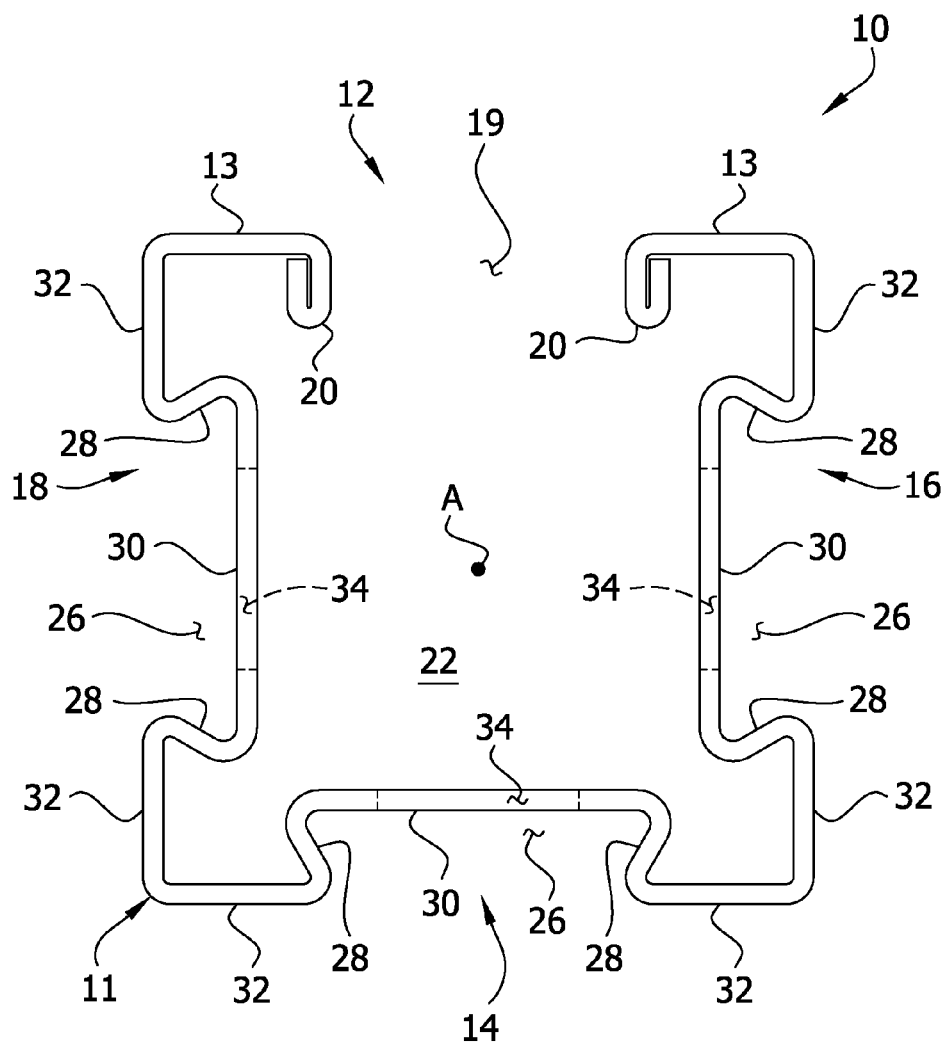

> US 9,470,339 B2

FITTING FOR CONNECTING TWO PIECES OF CHANNEL FRAMING TO ONE ANOTHER

CROSS-REFERENCE TO RELATED APPLICATIONS

The present application is a continuation application of U.S. Ser. No. 13/966,897, filed Aug. 14, 2013, which claims the benefit of the filing date of U.S. Provisional Application No. 61/785,097, filed Mar. 14, 2013, the entirety of each of which is incorporated by reference herein.

FIELD OF THE DISCLOSURE

The present disclosure generally relates to channel framing with at least one additional side that is functional, and fittings for use with the additional functional side of the channel framing.

BACKGROUND

One type of channel framing is called strut channel, which is used in the construction and electrical industries for structural support, often for supporting wiring, plumbing, or mechanical components such as air conditioning or ventilation systems. Strut channel is usually formed from metal sheet, folded over into an open channel shape with inwards-curving lips to provide additional stiffness and as a location to mount interconnecting components. The side of the strut channel opposite the open channel usually has holes of some sort in the base, to facilitate interconnection or fastening strut to underlying building structures. The other sides (e.g., left and right sides) typically do not have any functionality. Thus, the strut channel really has only one side for mounting components on the strut.

To provide additional functionality, two or more pieces of strut channel may be welded to one another. However, this assembled strut channel is typically special ordered and cannot be easily disassembled or otherwise changed, such as at the job site, to account for changes during the course of installing strut channels.

SUMMARY

In one aspect, channel framing comprises an elongate body having a longitudinal axis and defining an interior extending along the longitudinal axis. The body includes a first side defining a continuous slot extending lengthwise of the body and into the interior of the body, and a second side generally opposing the first side and defining a fitting groove extending lengthwise of the body. The fitting groove is configured for receiving at least one type of fitting to secure the fitting to the channel framing. In one example, the fitting groove has a dovetail cross-sectional shape.

Various fittings for use with the channel framing are disclosed. For example, a fitting for connecting first and second pieces of channel framing to one another includes a coupling component having first and second coupling portions. The first coupling portion has a dovetail cross-sectional shape, and the second coupling portion having a dovetail cross-sectional shape which is inverted relative to the first coupling portion. The first coupling portion is configured for reception in a fitting groove of the first piece of channel framing, and the second coupling portion is configured for reception in a fitting groove of the second piece of channel framing to connect the first and second pieces of channel framing to one another such that the fitting sides of the first and second pieces of channel framing are juxtaposed and face one another.

Other aspects and features are disclosed herein below.

BRIEF DESCRIPTION OF THE DRAWINGS

FIG. 2 is a front elevational view of the channel framing.

Corresponding reference characters indicate corresponding parts throughout the drawings.

DETAILED DESCRIPTION OF THE DRAWINGS

Figure 1:
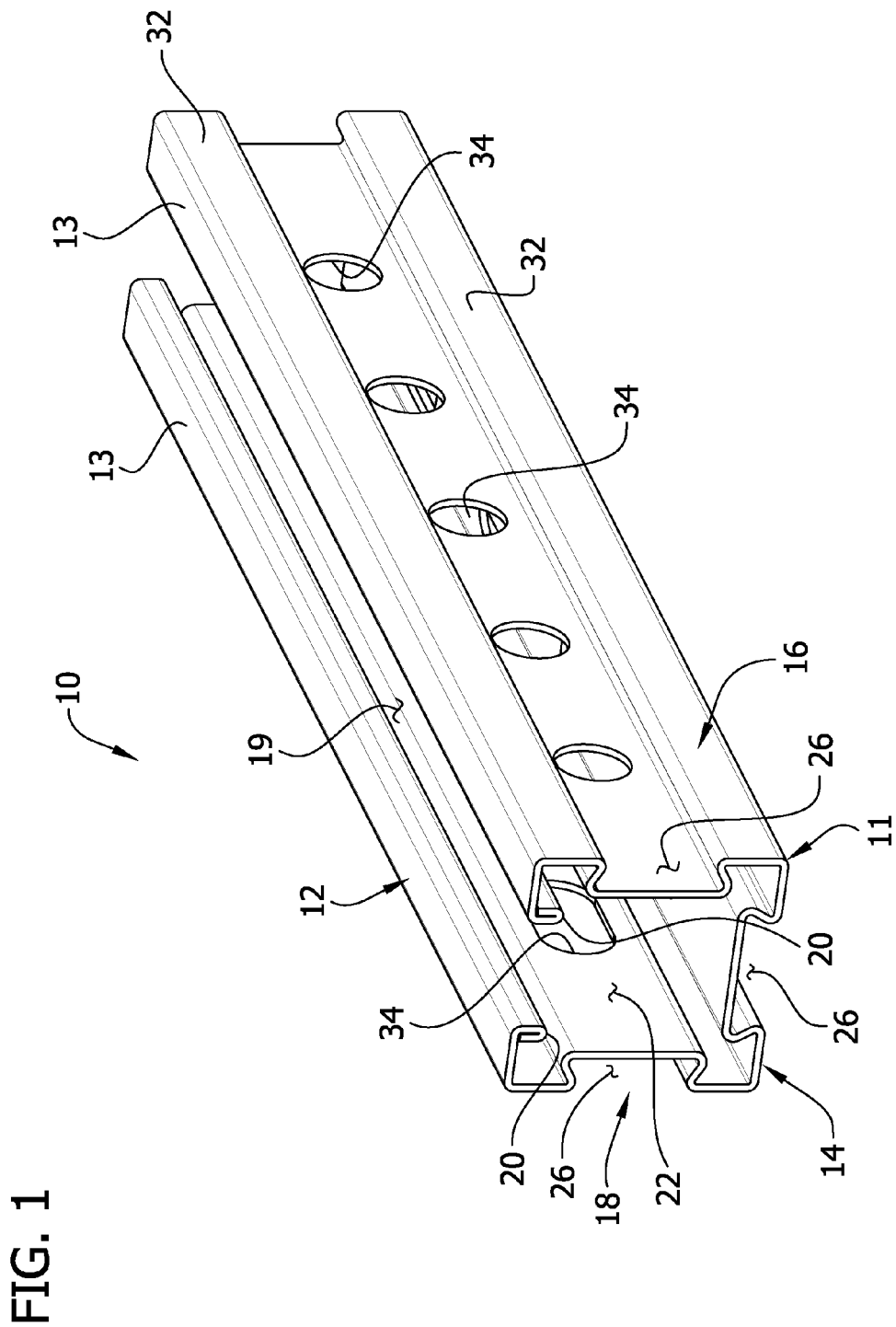
FIG. 1 is a perspective of one embodiment of channel framing.

Referring to FIGS. 1-5, an embodiment of channel framing constructed according to the teachings of the present disclosure is generally indicated at reference numeral 10. Suitable channel framing 10 according to the teachings of the present disclosure may be constructed for use in many different fields, industries, and applications, including, but not limited to, safety grating industry, spring steel fastener industry, cable trays and ladders, pipe hangers, solar industry, racks and runways, electrical enclosures, seismic industry, and rooftop supports.

Figure 2A:
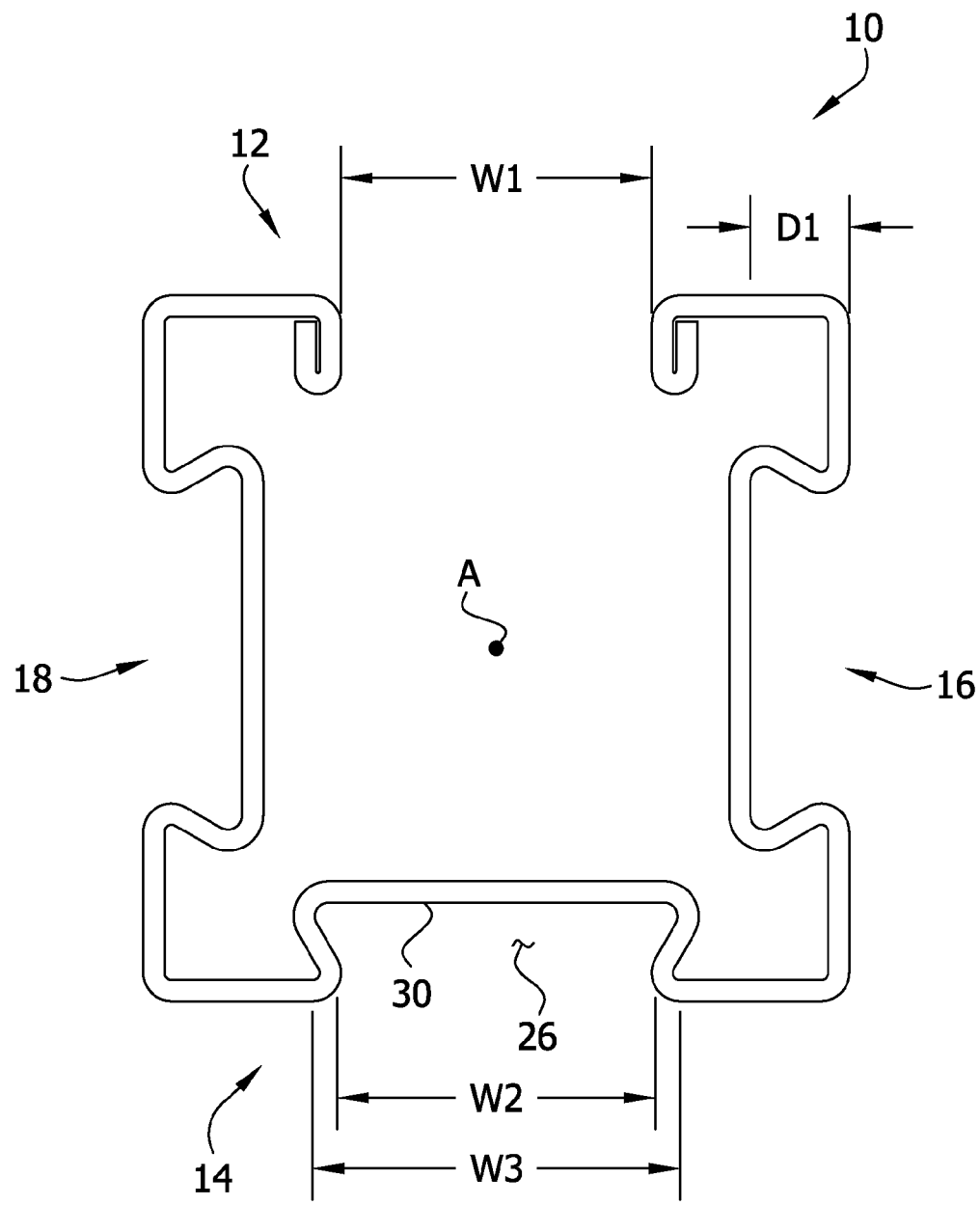
FIG. 2A is an enlarged front elevational view of the channel framing.
Figure 3:
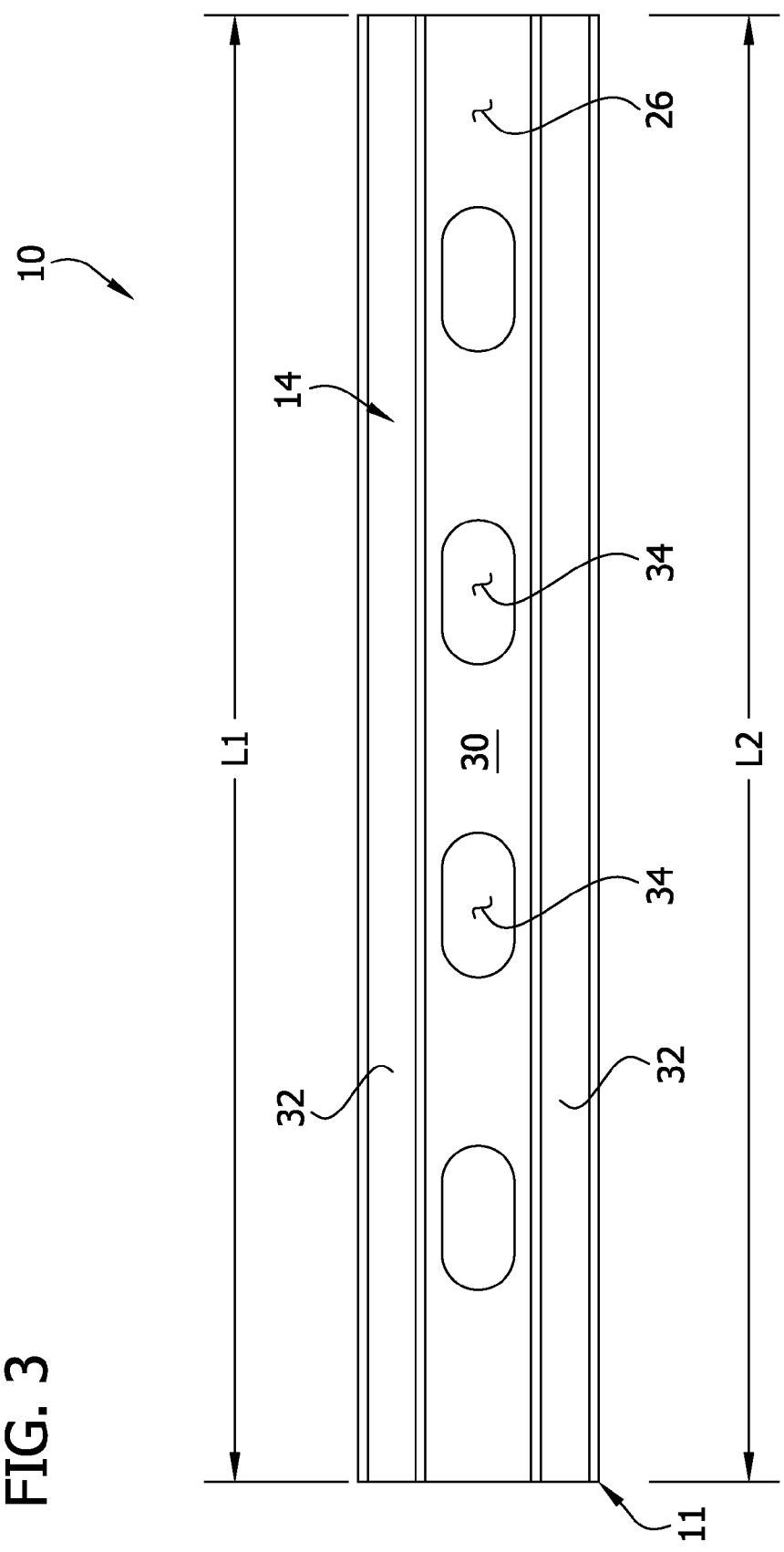
FIG. 3 is a bottom plan view of the channel framing.
Figure 4:
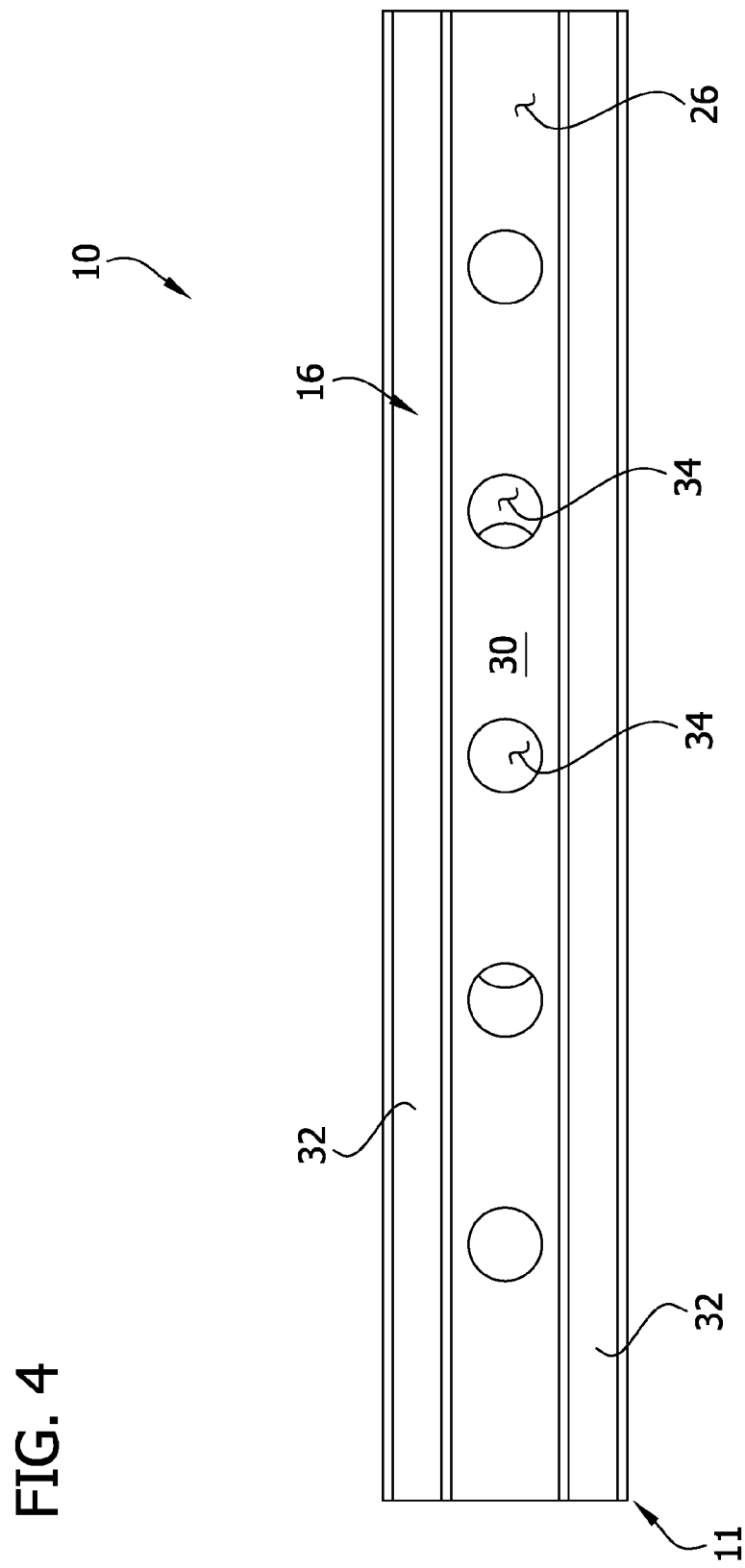
FIG. 4 is a right elevational view of the channel framing.
Figure 5:
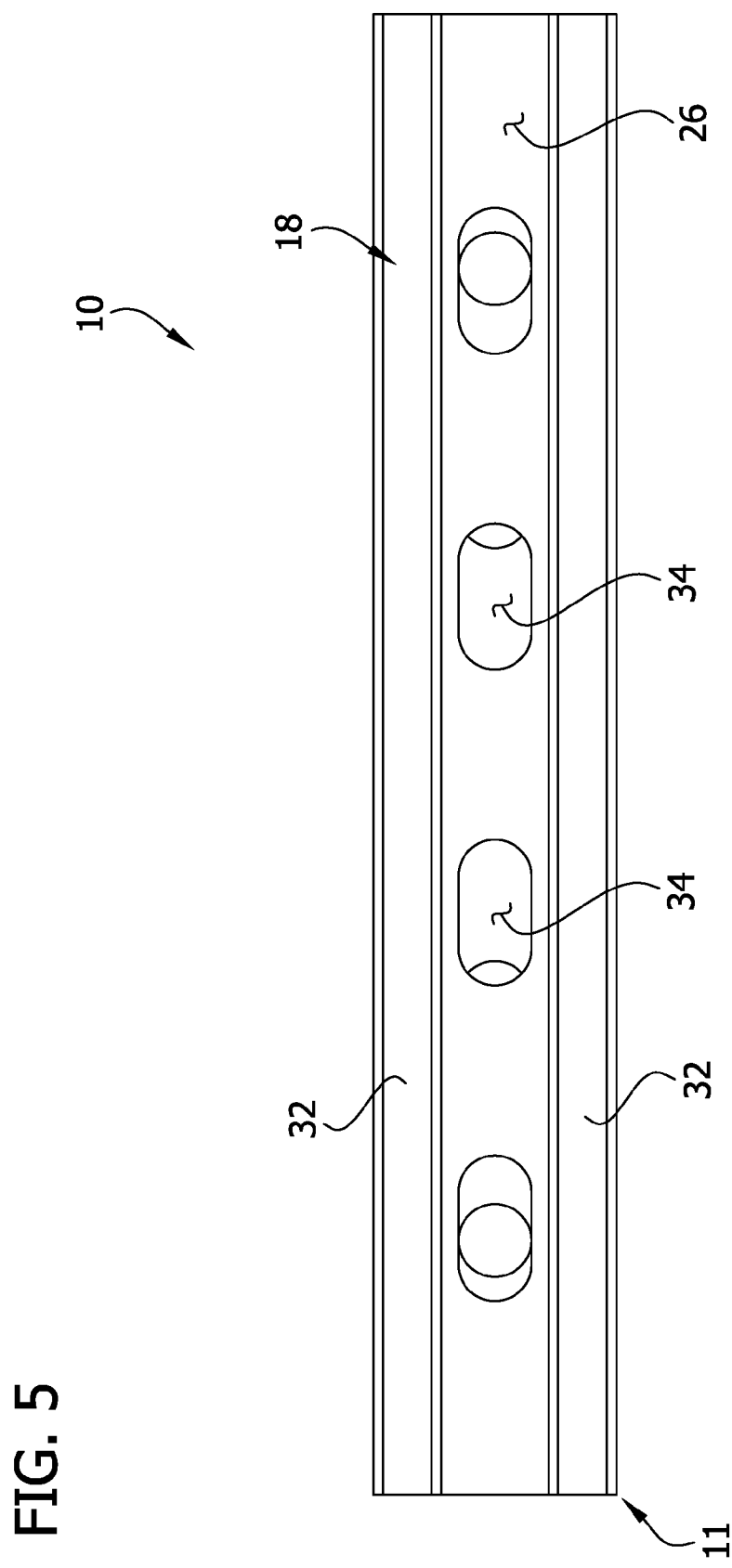
FIG. 5 is a left elevational view of the channel framing.
Figure 6:
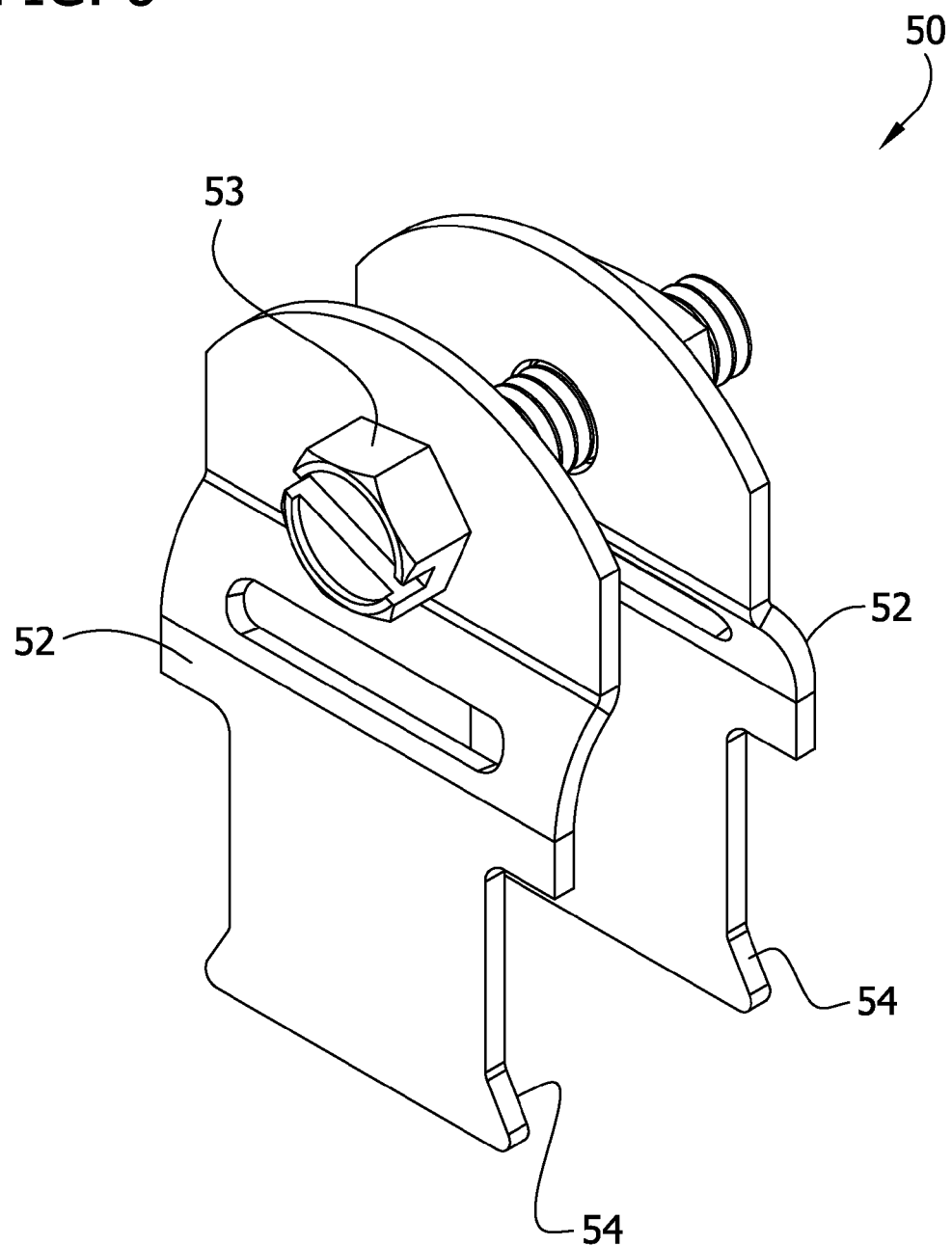
FIG. 6 is a perspective of an embodiment of a fitting comprising a conduit clamp for use with the channel framing.
Figure 7:
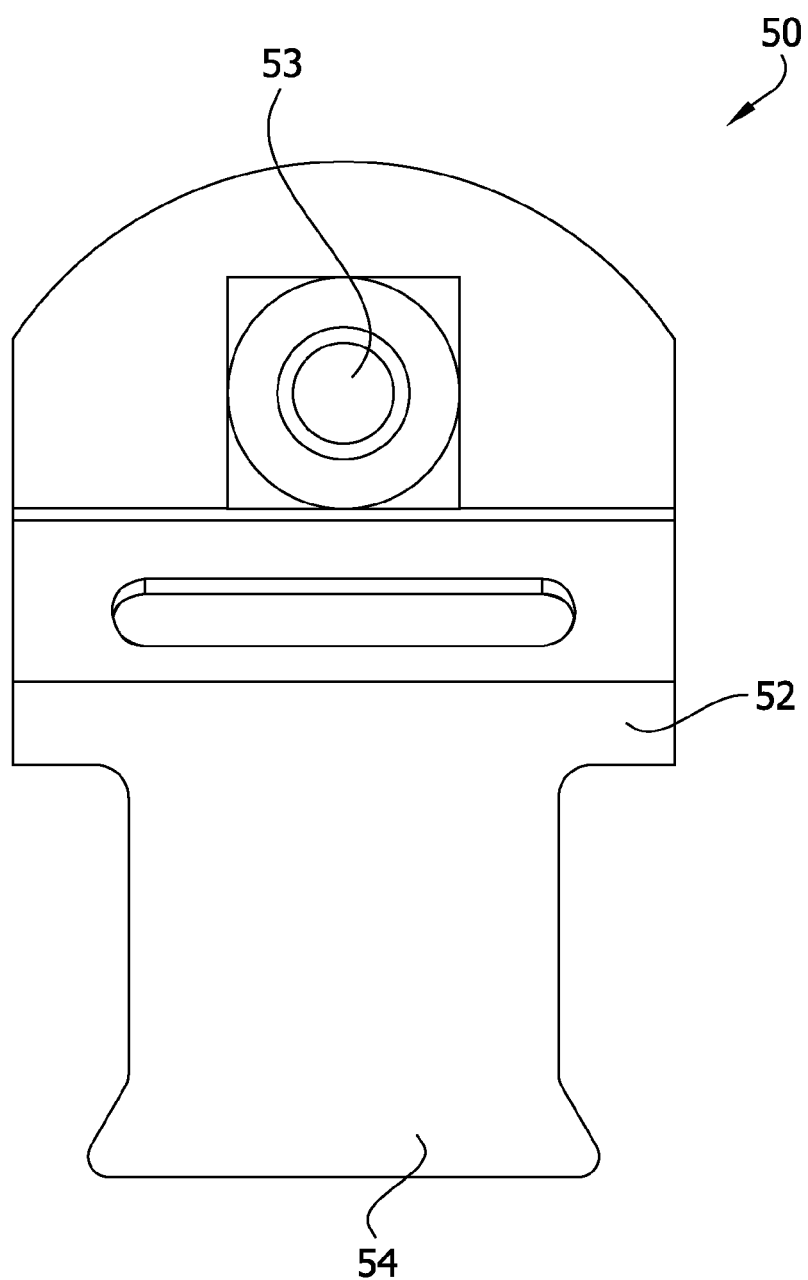
FIG. 7 is a front elevational view of the conduit clamp.
Figure 8:
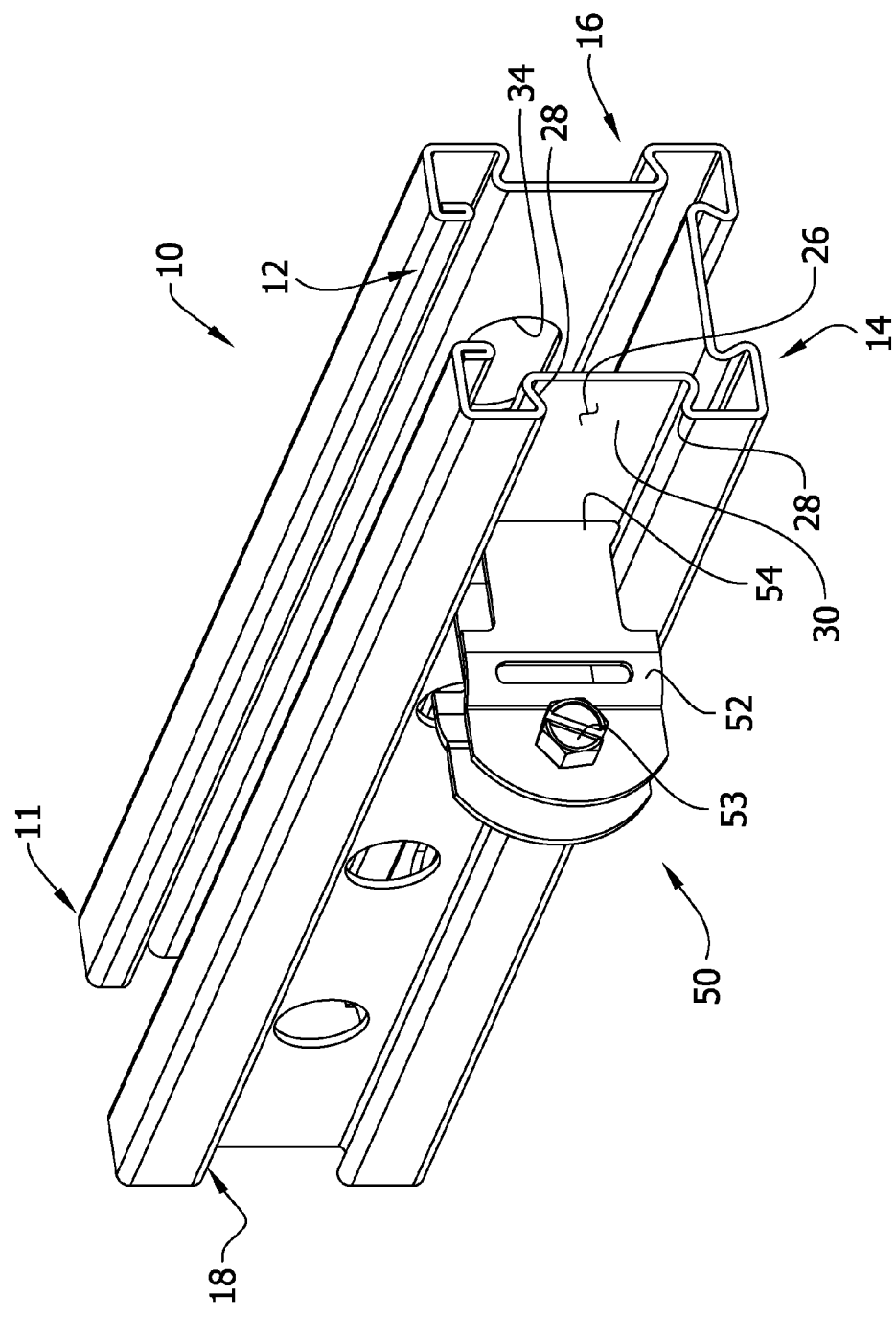
FIG. 8 is a perspective of the conduit clamp installed on a left side of the channel framing.

The channel framing 10 has an elongate body, generally designated 11, with a generally square or rectangular cross-sectional shape having four sides and a longitudinal axis A (FIG. 2) extending along the length L1 (FIG. 3) of the body. As illustrated, the body 11 has an upper side 12, a lower side 14, a right side 16, and a left side 18 (each indicated generally), although the respective relative locations of the respective sides will depend on the orientation of the channel framing in use. The upper side 12 (or slotted side) defines a continuous slot 19 (i.e., the upper side is open) having a width W1 (FIG. 2A). The upper side 12 has outside surfaces 13 on either side of the slot 19, and inwardly (or downwardly) depending lips 20 leading to an open interior 22 of the channel framing 10.

Figure 1A:
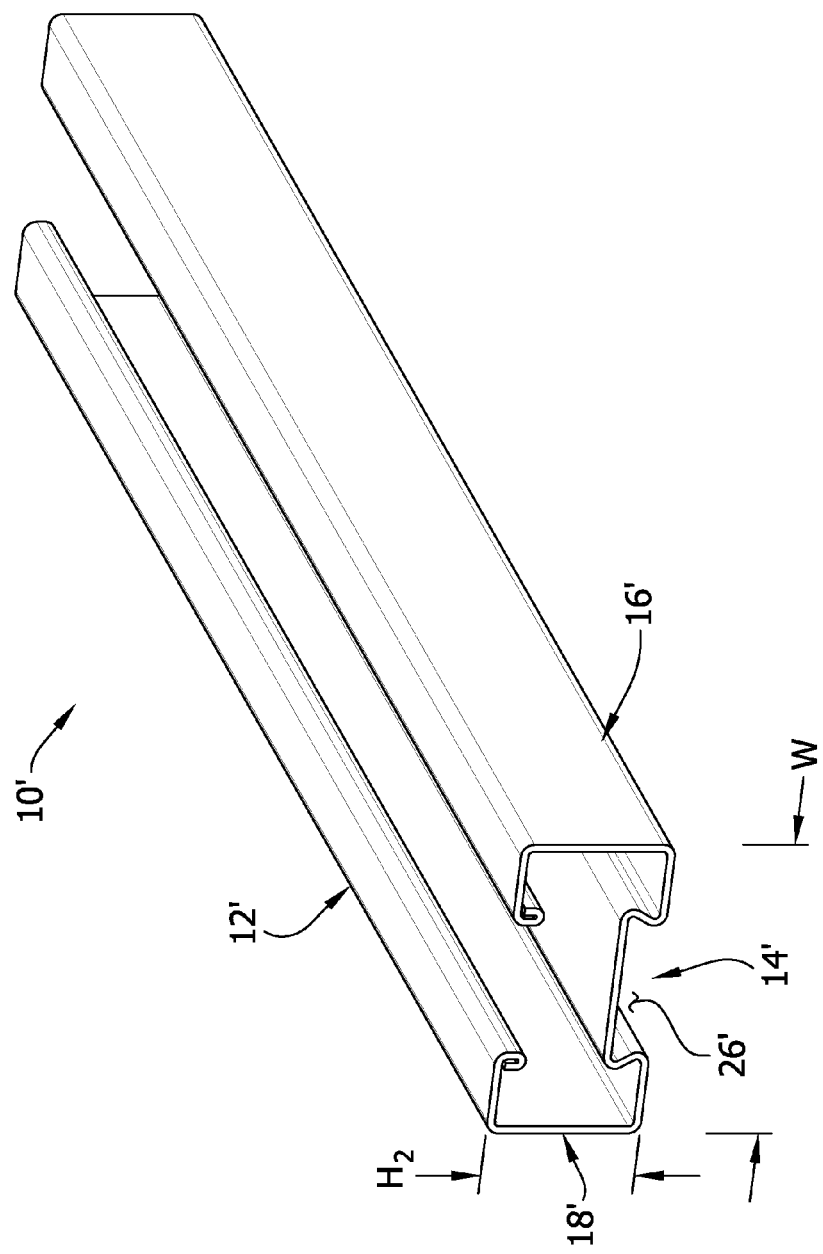
FIG. 1A is a perspective of another embodiment of a channel framing.

In the illustrated embodiment, each of the lower, right and left sides 14, 16, 18, respectively, defines a fitting groove 26 having a length L2 (FIG. 3) extending lengthwise of the body 11 (e.g., along the entire length L1 of the body), and a depth D1 (FIG. 2A) extending generally toward the longitudinal axis A of the body. In the illustrated embodiment, the fitting grooves 26 have substantially identical cross-sectional shapes and dimensions. In another embodiment, at least the side (e.g., lower side 14) opposite the slotted side (e.g., upper side 12) defines a fitting groove 26, while the other two sides (e.g., right and left side 16, 18) may or may not define fitting grooves. An example of such a channel framing is generally indicated at 10' in FIG. 1A. The upper or slotted side 12' is the same as upper side 12 of the channel framing 10 in FIG. 1, and the lower side 14' and the fitting groove 26' are the same as the lower side 14 and the fitting groove 26 of the channel framing in FIG. 1. In addition to the right and left side 16', 18' being free from grooves, the other difference between the channel framing 10' and the channel framing 10 are the heightwise dimensions between the upper and lower sides 12, 14 and 12', 14'. In the present channel framing 10', the height $H_2$ is less than the width W, and in particular, the height may be 50% less than the width (e.g., the height may be 25 mm and the width may be 50 mm). The channel framing 10' may have other dimensions.

Referring back to channel framing 10, as indicated in FIG. 2, each fitting groove 26 is defined by opposing side walls 28 extending inwardly from generally planar outer surfaces 32 of the corresponding side 14, 16, 18 and toward the interior 22 of the body 11. The side walls 28 extend to a bottom wall 30 that spans between and interconnects the side walls. The side walls 28 flare away from one another as they extend inward from the outer surfaces 32 toward the bottom 30 of the fitting groove 26 so that each fitting groove has a generally dove-tail cross-sectional shape. Accordingly, as shown in FIG. 2A each fitting groove 26 has a first relatively narrower width W2 (e.g., a minimum width) at its entrance and a second relatively wider width W3 (e.g., a maximum width) adjacent the bottom wall 30. In general, the fitting grooves 26 are configured for receiving a coupling component of a fitting for use in attaching or securing the fitting to any one of the sides 14, 16, 18 of the strut channel 10. As explained in more detail below, the coupling component is configured to generally "lock" (such as twist lock) in the fitting groove to inhibit withdrawal of the fitting from the groove.

In the illustrated embodiment, openings 34 extend through each of the bottom walls 30 of the fitting grooves 26. The openings 34 may be configured for attaching the channel framing 10 to a structure (e.g., a ceiling). The openings 34 may be, for example, knockouts, or punched, or half-slots, or slots, as are generally known in the art. Typically, the openings 34 in the channel framing 10 will be the same type of opening, although the same channel framing may include a mix of different types of openings, such as shown in the illustrated embodiments.

The channel framing 10 may be formed from rigid metal, such as low carbon steel, stainless steel, aluminum, or other metals, or from other material, such as fiberglass or plastic. The channel framing 10 may be cold formed using a rolling mill, such as when forming the channel framing from steel, or the channel framing may be extruded from an extrusion die, such as when forming the channel framing from aluminum. The channel framing 10 may be formed in other ways. The channel framing 10 may have a thickness from about 0.5 mm to about 4 mm. In one non-limiting example, the channel framing 10 may be formed from 18 gauge (1.2 mm) steel sheet metal, or from 20 gauge (0.9 mm) steel sheet metal. In another non-limiting embodiment, the dimension of each of the width and height of the channel framing 10 may be 53.5 mm, as opposed to 50 mm.

Figure 9:
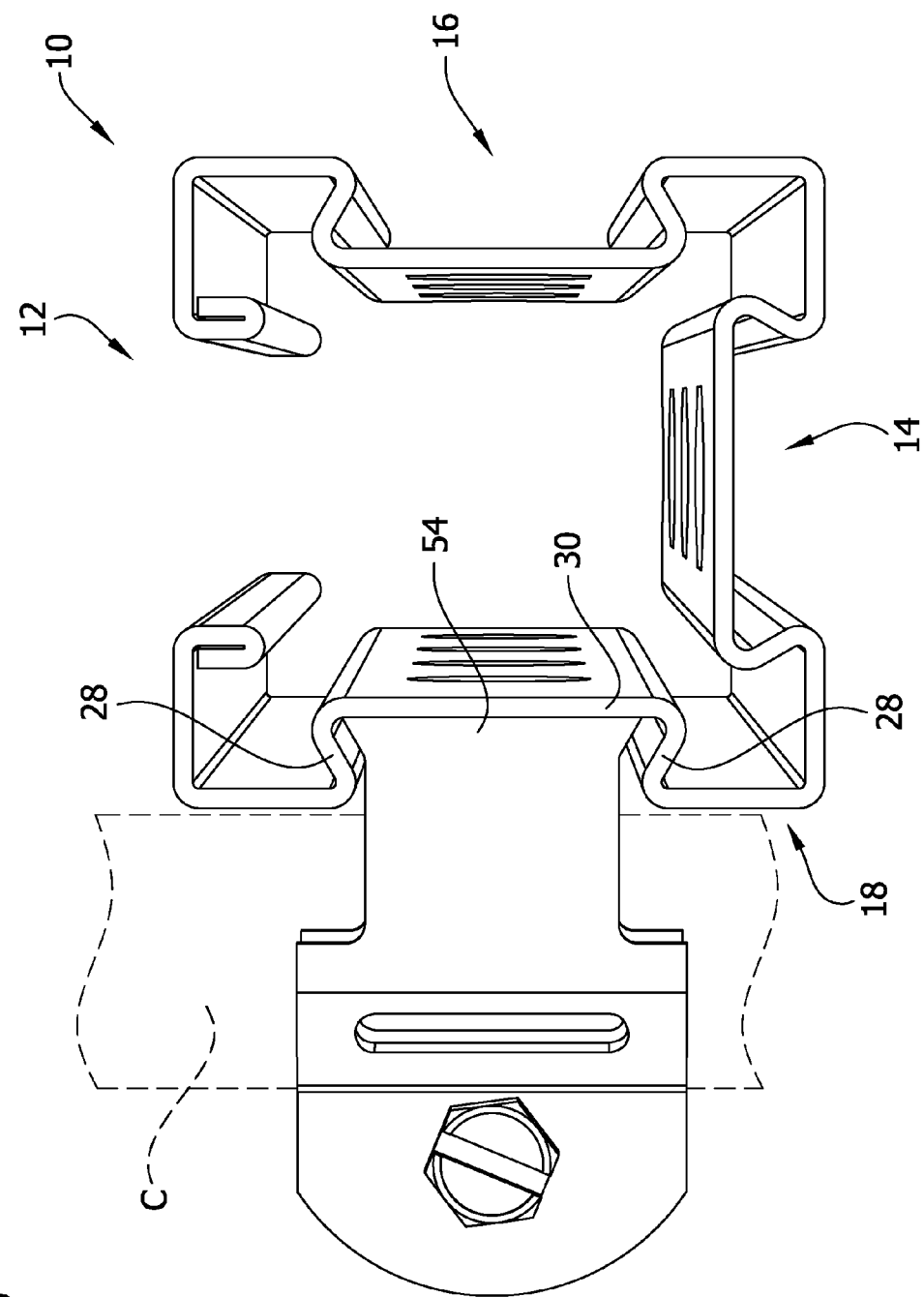
FIG. 9 is a front elevational view of FIG. 8.

Referring to FIGS. 6-9, one embodiment of a fitting for use with the channel framing 10 comprises a conduit clamp, generally indicated at 50, for mounting a conduit (e.g., a pipe) to the channel framing. The conduit clamp 50 includes a pair of opposing jaws 52 secured to one another by a bolt 53 (or other fastener) at attached ends thereof for clamping a conduit C (FIG. 9). The jaws 52 may be formed from rigid metal, such as low carbon steel, stainless steel, aluminum, or other metals, or from other material. Each jaw 52 includes a coupling component 54 adjacent its free end having a generally dovetail shape corresponding to the shapes of the fitting grooves 26.

In one embodiment, to attach the conduit clamp 50 to the channel framing 10, the jaws 52 may be slid through an open end of one of the fitting grooves 26. Alternatively, the free ends of the conduit clamp jaws 52 may be pressed together, and the coupling components 54 inserted into the fitting groove 26 so that the coupling components are oriented to general align with the fitting groove. After inserting the coupling components 54 in the fitting groove 26 in this orientation, the conduit clamp 50 is rotated (e.g., about 90 degrees or more generally about a quarter turn), whereupon the coupling components rotate into an orientation in which they are generally perpendicular to the fitting groove 26 to lock the coupling components and the conduit clamp 50 in the fitting groove. The conduit C can then be inserted between the jaws 52 and the bolt 53 tightened to secure the conduit to the channel framing 10. Once the conduit C is secured by the conduit clamp 50, the conduit limits rotation of the conduit clamp 50 and holds the conduit clamp in the locking orientation.

Figure 10:
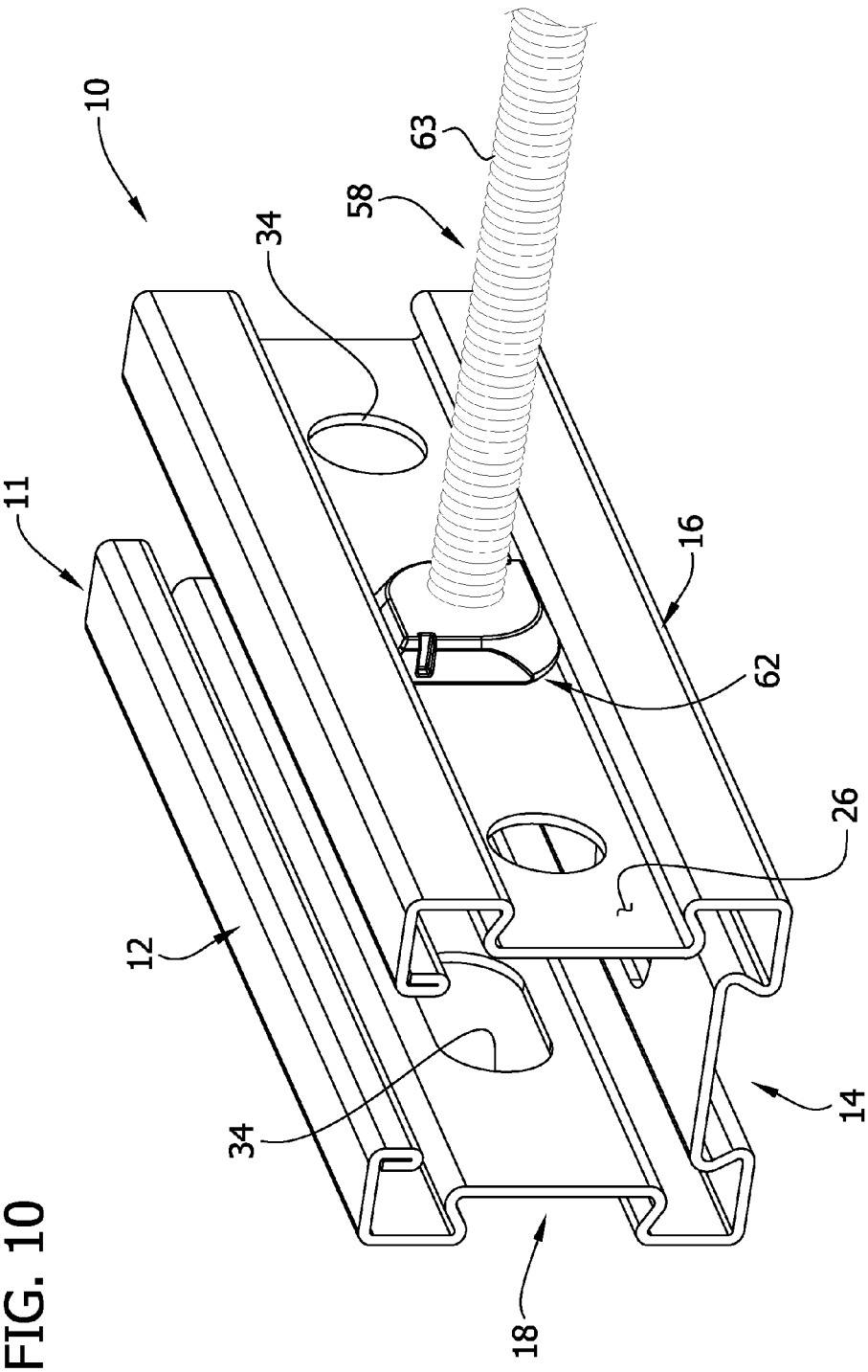
FIG. 10 is a perspective of another embodiment of fitting comprising a rod hanger assembly installed on the right side of the channel framing.

Referring to FIG. 10, another embodiment of a fitting comprises a rod hanger assembly, generally indicated at 58, for use in hanging the channel framing 10 on a ceiling or other elevated structure. The illustrated rod hanger assembly 58 comprises a coupling component, generally indicated at 62, and a threaded rod 63 secured to the coupling component and extending outward therefrom. In the illustrated embodiment, the rod 63 is threadably attached to the coupling component 62, as explained below. The rod 63 may be attached to the coupling component 62 in other ways, such as by welding. Moreover, the illustrated coupling component 62 may be configured for attachment to other components, including but not limited to, a bolt or a threaded stud for attaching another component (e.g., a bracket) to the channel framing 10.

Figure 11:
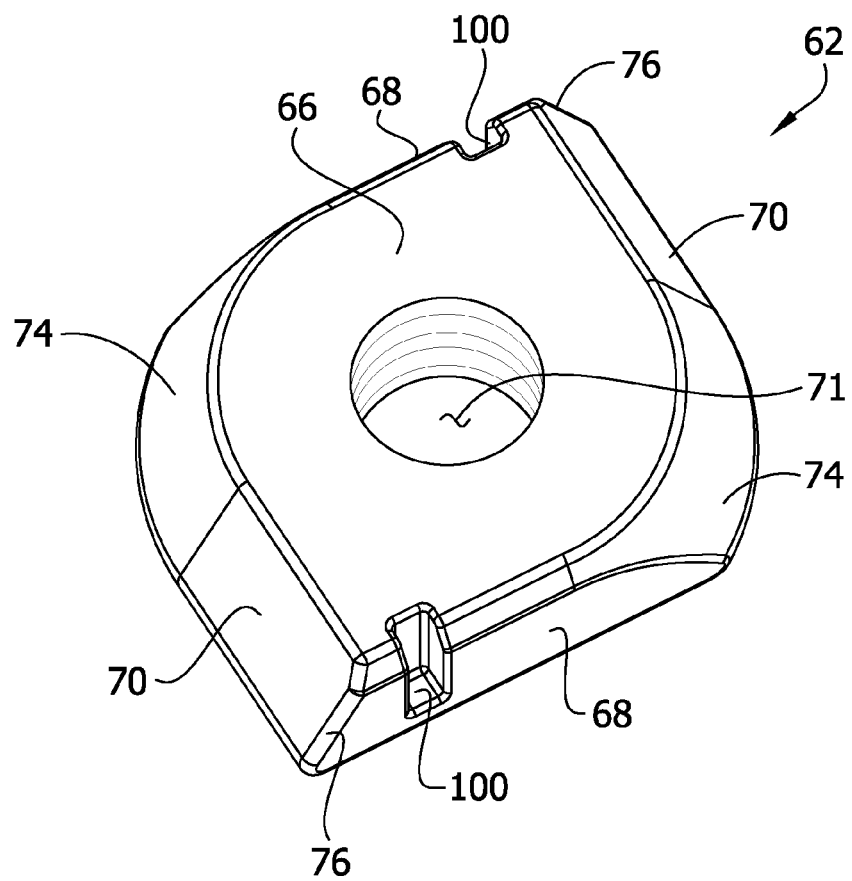
FIG. 11 is a perspective of a coupling component of the rod hanger assembly of FIG. 10.
Figure 12:
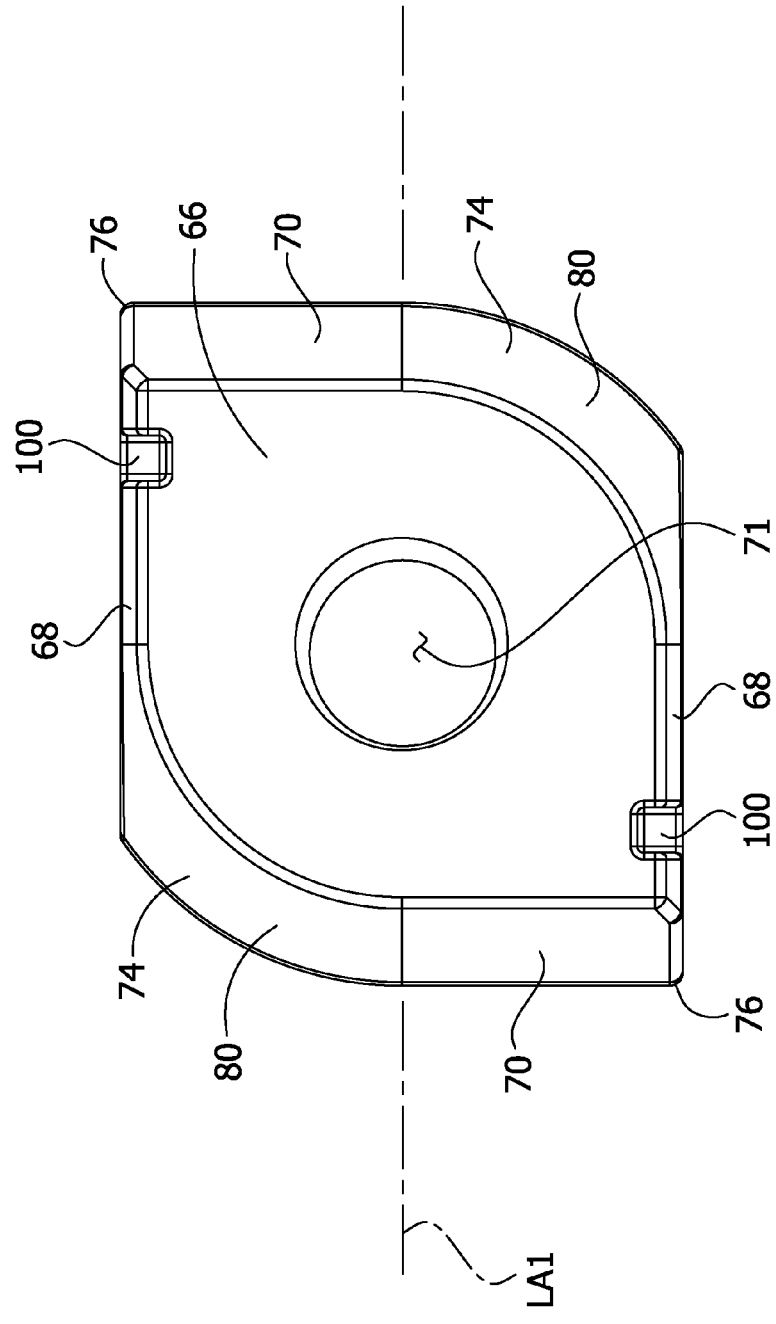
FIG. 12 is a top plan view of the coupling component of FIG. 11.
Figure 13:
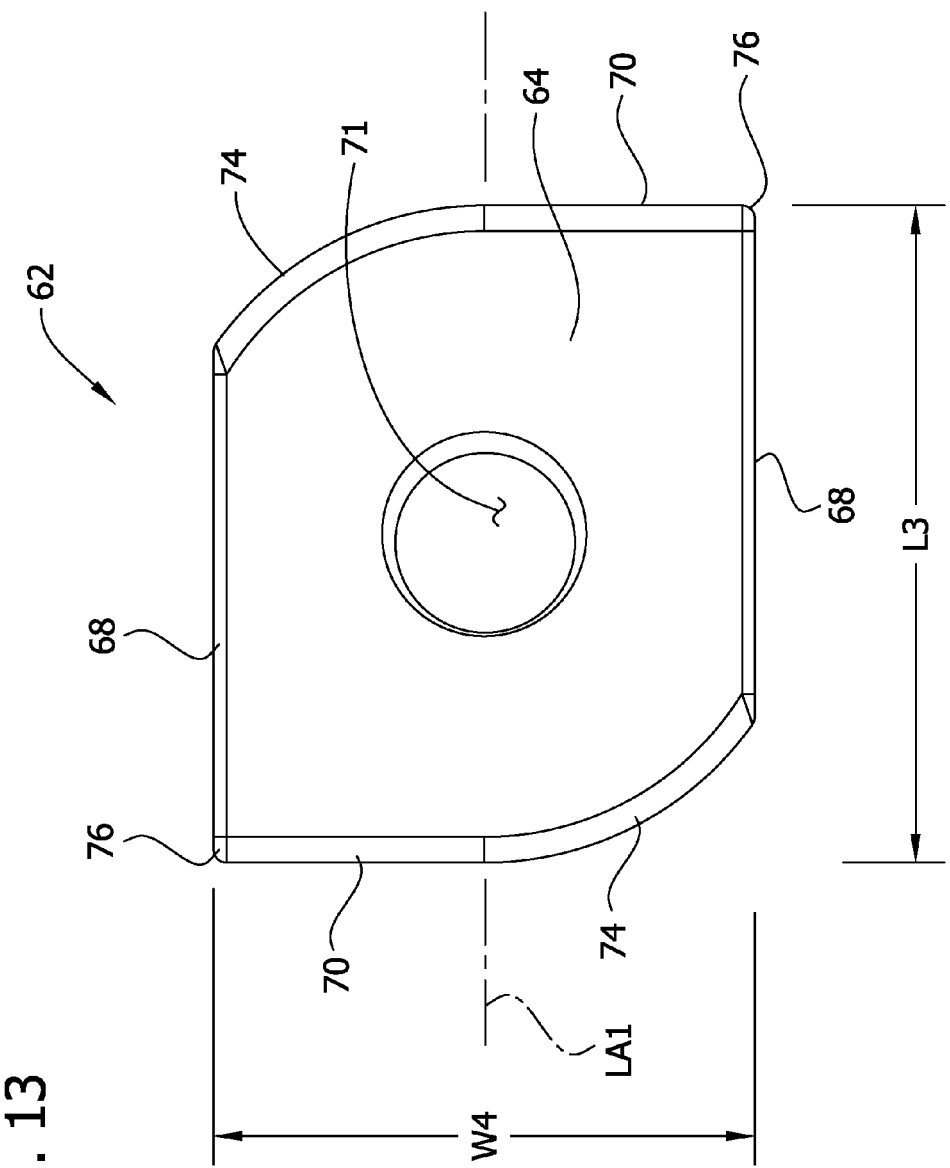
FIG. 13 is a bottom plan view of the coupling component.

The illustrated coupling component 62 may be generally referred to as a nut or a fitting-groove nut. Referring to FIGS. 11-13, the coupling component 62 has a length L3 (FIG. 13), a longitudinal axis LA1, and a width W4 (FIG. 13). The coupling component 62 includes an inside (lower) face 64, an outside (upper) face 66, opposite sides 68, and opposite ends 70. While the length L3 of the coupling component 62 is greater than the first or minimum widths W2 of the fitting grooves 26 at the outer surfaces 32 of the respective sides 14, 16, 18, the width W4 of the coupling component is less than the first widths W2 of the fitting grooves so that the coupling component may be inserted in and installed on the any of the fitting grooves in a manner to be hereinafter described.

Figure 14:
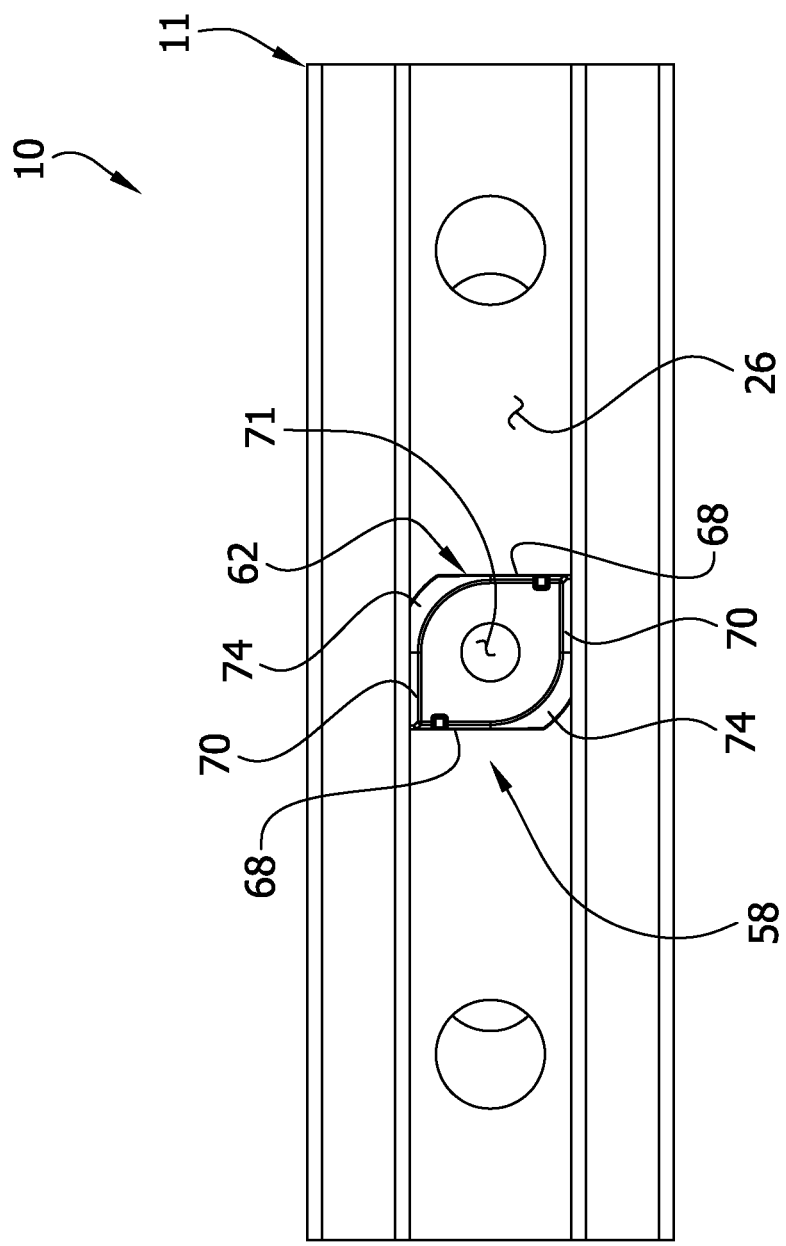
FIG. 14 is a right elevational view of the coupling component installed on the right side of the channel framing.

Diagonally opposite first and second corners 74 of the coupling component 62 at opposite ends 70 of the coupling component are rounded for facilitating such installation (see FIGS. 10 and 14). Conversely, diagonally opposite third and fourth corners 76 are preferably substantially squared off (i.e., not rounded) to facilitate locking of the coupling component 62 in the fitting groove 26 and to inhibit over rotation of the coupling component in the fitting groove 26. Further, the opposite ends 70 and the first and second corners 74 of the coupling component 62 are beveled or chamfered outwardly from the outside face 66 toward the inside face 64, generally matching the angle of the opposing walls 28 of the fitting grooves 26. The beveled, rounded corners 74 facilitate turning the coupling component 62 to a crosswise position relative to the fitting groove 26 so the longitudinal axis LA1 of the coupling component is generally perpendicular to the longitudinal axis of the channel framing 10, while the beveled opposite ends 70 have a shape corresponding generally to the shape of the space between the side walls 28 and the bottom wall 30 of the fitting groves 26, as will be described in more detail later. The coupling component 62 has a central threaded opening 71 extending completely through the component from its inside face 64 to its outside face 66, thus making it a "nut," as disclosed above. The coupling component 62 may be formed by a stamping operation or other suitable operation. The coupling component 62 may be formed from metal, such as a zinc-coated, heat treated, AISI 1018 steel having a Rockwell hardness of 30-50 C and more preferably 40-45 C. Other materials may be used.

To install the coupling component 62 in a fitting groove 26, the coupling component 62 is suitably oriented so it longitudinal axis LA1 is generally aligned with the fitting groove, entered into and passed through the fitting grooves until the inside face 64 of the coupling component generally bottoms out in the groove. The coupling component 62 is then turned (rotated) about 90 degrees (or about a quarter turn) in a first direction (e.g., clockwise as viewed in FIG. 14) so that the respective rounded, beveled corners 74 slide past the side walls 28 of the fitting groove as the longitudinal axis LA1 of the coupling component is rotated into a position in which it is generally perpendicular to the fitting grove 26 and the longitudinal axis of the channel framing 10. As rotation of the coupling component 62 is continued, the beveled ends 70 follow the rounded, beveled corners 74 as they move into abutting relation with the side walls 28. Further clockwise rotation of the coupling component 62 is prevented by the unreduced (squared off) corners 76, which assist in locking the coupling component against further turning (e.g., over-rotation). When the coupling component 62 is oriented in the locking position, its beveled ends 70 may fit snugly between the flared side walls 28 and the bottom wall 30 of the fitting groove 26, and in particular, the beveled ends may engage the flared side walls in a friction fit or press fit engagement to resist counter-rotation (i.e., counterclockwise as viewed in FIG. 14) of the coupling component once the coupling component is locked in its cross-wise position. In this example, a pair of the hanger assemblies 58 may be used to suspend the channel framing 10 from a ceiling or other elevated structure, and in such applications, the channel framing may be referred to as a trapeze support or hanger, as is generally known in the art. It is understood that other types of components may be secured to the framing channel 10 using the coupling component 62, including a bolt that secures a bracket or other component to the channel framing 10.

Referring to FIGS. 15-19, another embodiment of a rod hanger assembly (broadly, a fitting) is generally indicated at 79. This rod hanger assembly comprises a nut-washer assembly (broadly, a fastener assembly), generally indicated at 80, and a threaded rod 83 secured to the nut-washer assembly. As seen best in FIGS. 17-19, the nut-washer assembly 80 comprises a coupling component, generally indicated at 62 (which in the illustrated embodiment is essentially identical to the coupling component described above, and therefore it and like structures are indicated by corresponding reference numerals); a washer, generally indicated at 84, spaced from the coupling component 62 and adapted to engage the outside surfaces 32 of a respective side 14, 16, 18 of the channel framing 10 at opposite sides of the corresponding fitting groove 26; and a resiliently deformable element 86 interposed between and connecting the coupling component 62 and the washer for generating a force holding the washer and the coupling component in clamping engagement with respective outside surfaces of the corresponding side of the channel framing 10. As explained above, in this embodiment the coupling component 62 is identical to the coupling component 62 disclosed above, although the coupling component may be of a different configuration without departing from the scope of the present invention.

Figure 17:
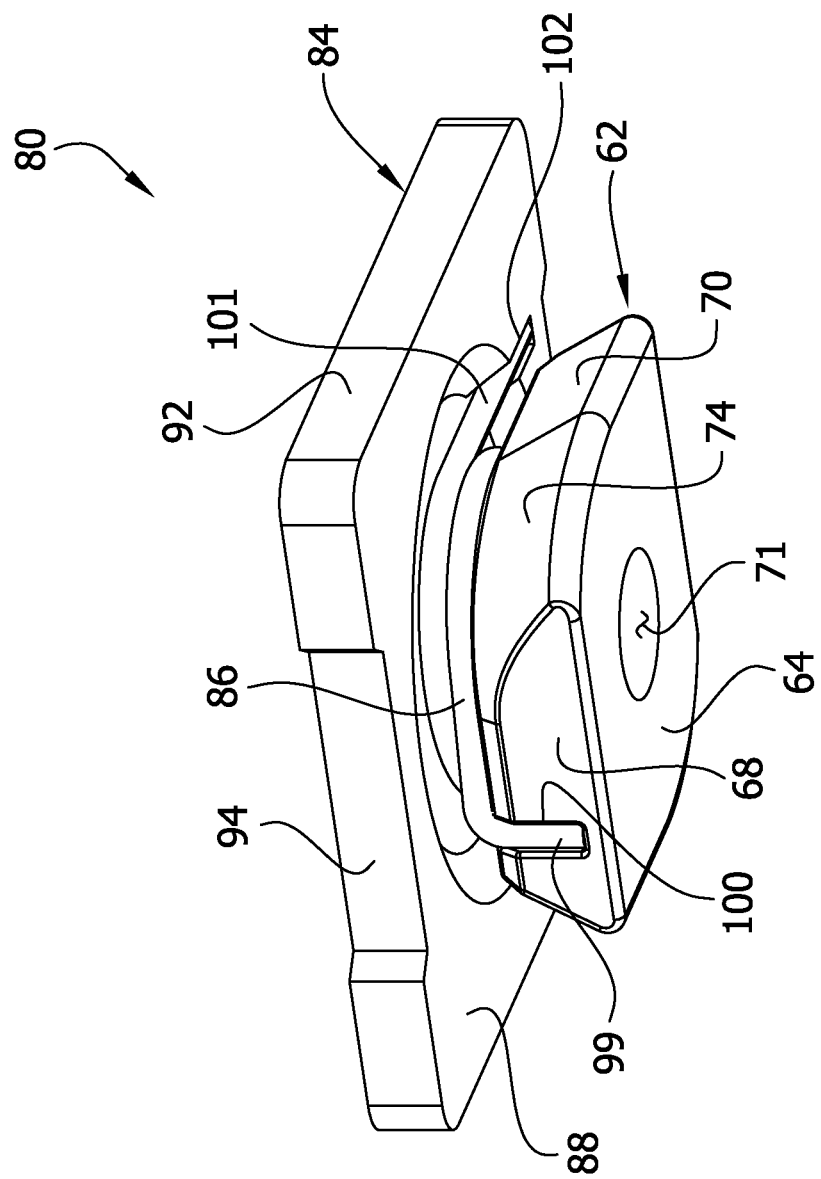
FIG. 17 is an enlarged bottom perspective of a fastener assembly (e.g., a nut-washer assembly) of the fitting in FIG. 15.
Figure 18:
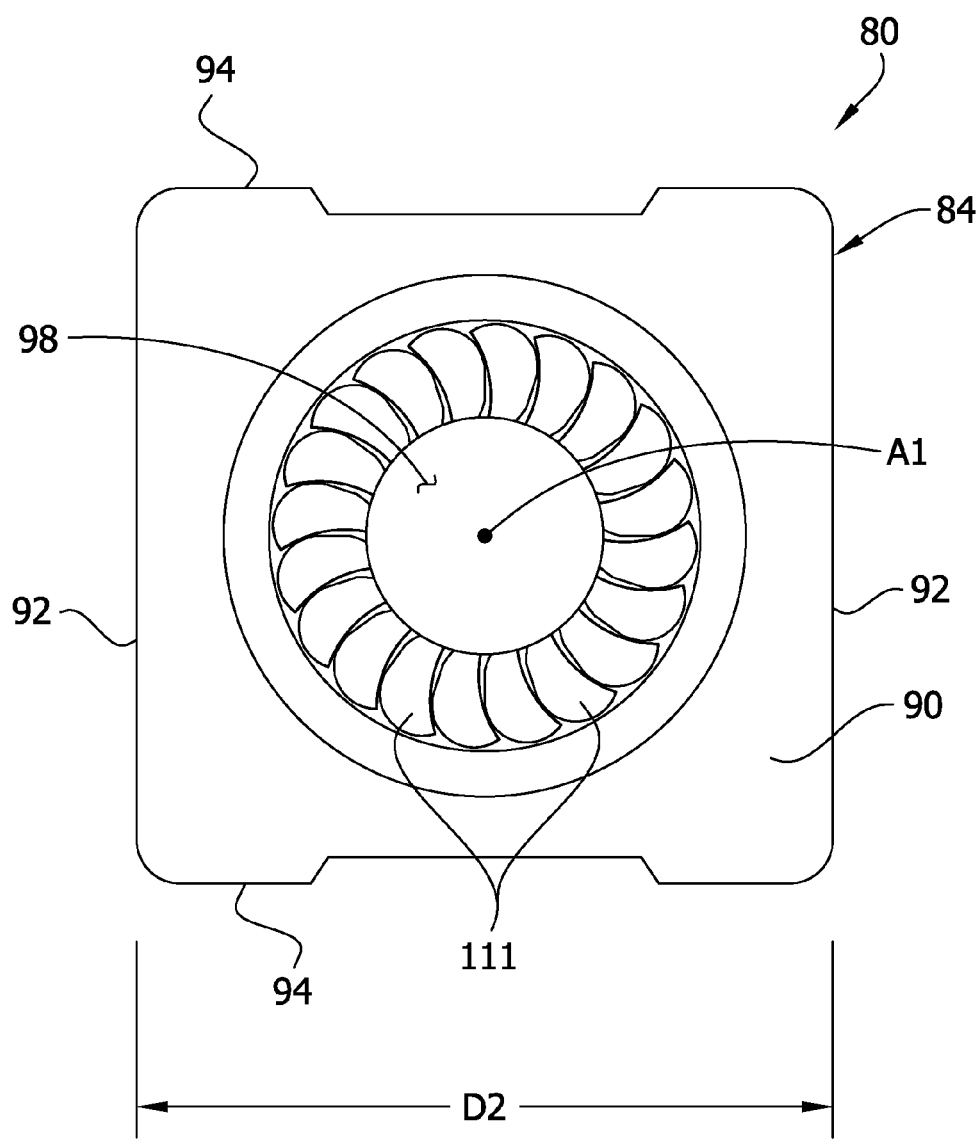
FIG. 18 is top plan view of the fastener assembly.
Figure 19:
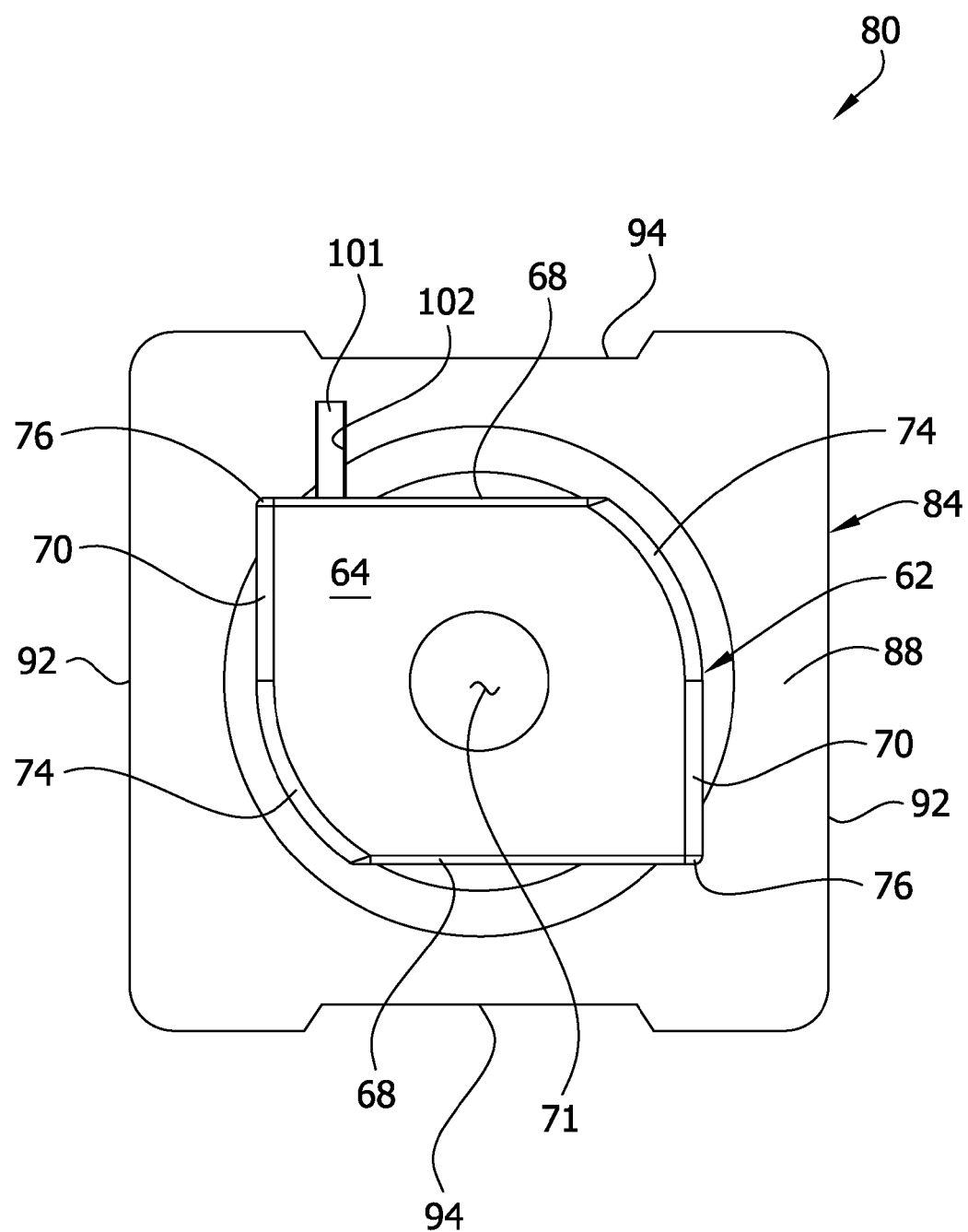
FIG. 19 is a bottom plan view of the fastener assembly.

Referring still to FIGS. 17-19, the washer 84 is generally rectangular or square in shape, although other shapes (e.g., polygonal, oval, circular) are possible. The washer 84 has an inside (lower) face 88, an outside (upper) face 90, a first pair of opposing sides 92, and a second pair of opposing sides 94. The distance d1 (FIG. 18) between the sides of at least one pair of opposing sides (e.g., the first pair of sides 92) is greater than the first or minimum widths W2 of the fitting grooves 26 of the channel framing 10 so that the washer 84 can span the fitting groove with portions of the inside face 88 of the washer contacting the outside surfaces 32 of the corresponding side 14, 16, 18 of the channel framing. The washer 84 has an unthreaded (clearance) opening 98 through it generally aligned with the threaded opening 71 in the coupling component 62. As used herein, the term "washer" means any structural member adapted to bridge the fitting groove 26 in the framing 10, and further having an opening (e.g., 98) through it for receiving a rod 83 or a fastener (e.g., a bolt) threaded into the coupling component 62 or a stud (e.g., a threaded stud) extending from the coupling component and the size and shape of the washer can vary as needed or desired.

Figure 24:
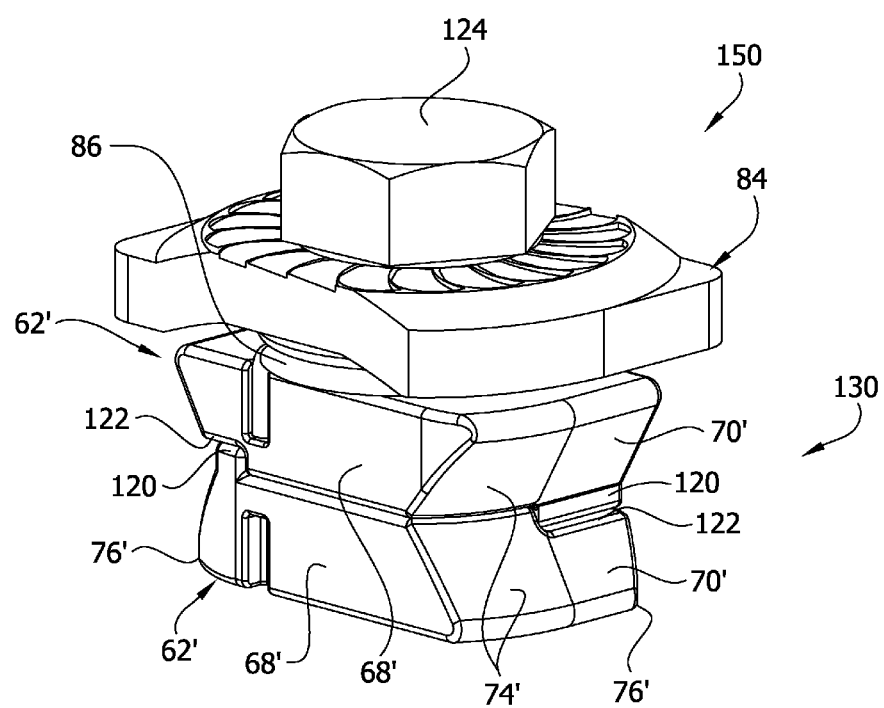
FIG. 24 is a perspective of another embodiment of a fitting including two of the coupling components of FIG. 21 forming a dual coupling component assembly.
Figure 24A:
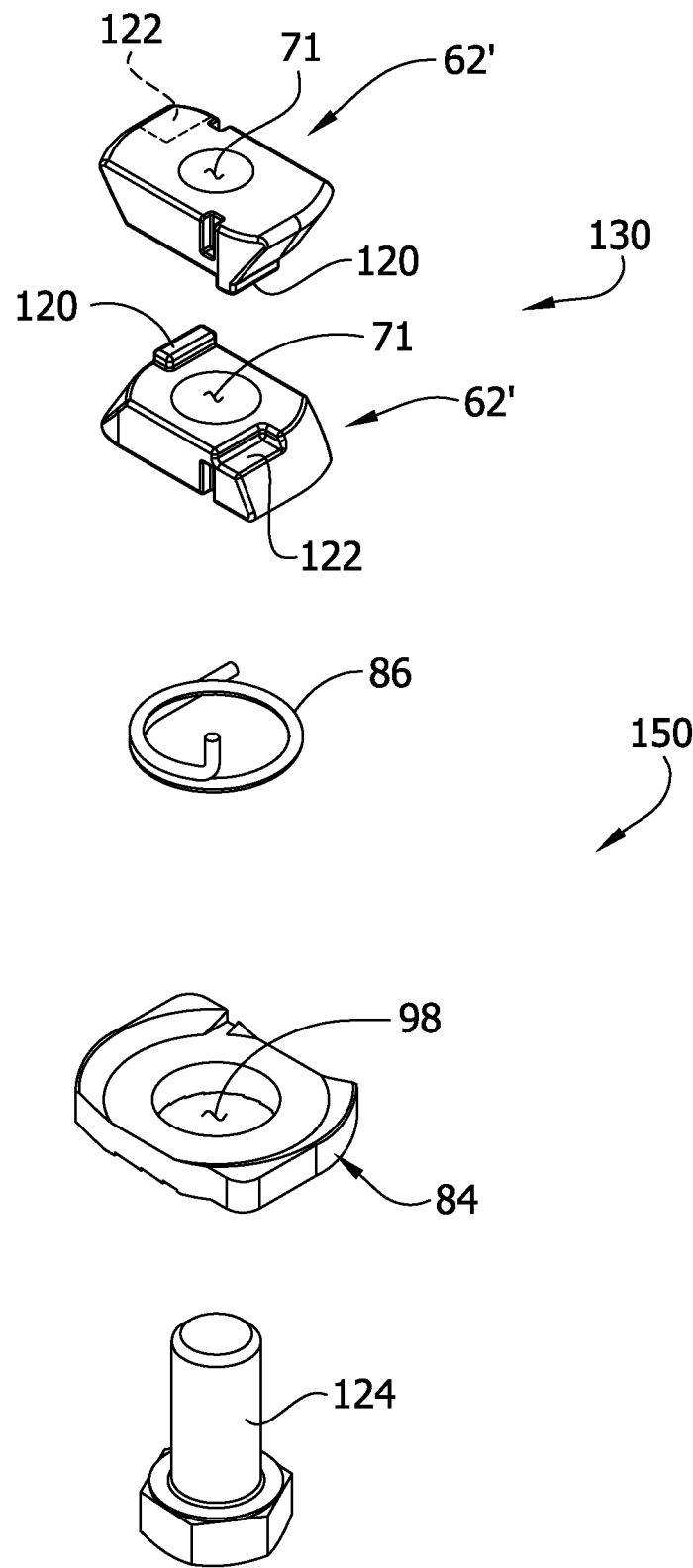
FIG. 24A is an exploded view of FIG. 24.

In the illustrated embodiment, the resiliently deformable element 86 comprises a spring and, in particular, a coil extension spring. (The same spring is also illustrated in FIG. 24A.) In the illustrated embodiment, the spring 86 is a circular coil spring having helical winds, but it will be understood that the coil may have a shape other than circular (e.g., rectangular or square or oval). As see in FIG. 17, the coil spring 86 may have a lower extended portion 99 firmly fixed (e.g., staked) in one of a pair of linear grooves 100 (see also FIG. 12) in the outside face 66 of the coupling component 62 and extending toward the inside face 64 of the coupling component. Further, as seen in FIGS. 17 and 19 the spring 86 may have an upper extended portion 101 firmly fixed (e.g., staked) in linear groove 102 in the washer 84, or otherwise secured to the washer. The portions 99, 101 of the spring 86 may be firmly (preferably immovably) fixed to the washer 84 and the coupling component 62, respectively, by adhesive, welding, brazing, or other means. Other configurations are possible. The spring 86 is made of suitable wire, such as 1.25 mm wire formed from a zinc-coated ASTM 1566 metal alloy having a Rockwell hardness in the range of 45-50 C. Other materials may be used.

Figure 20:
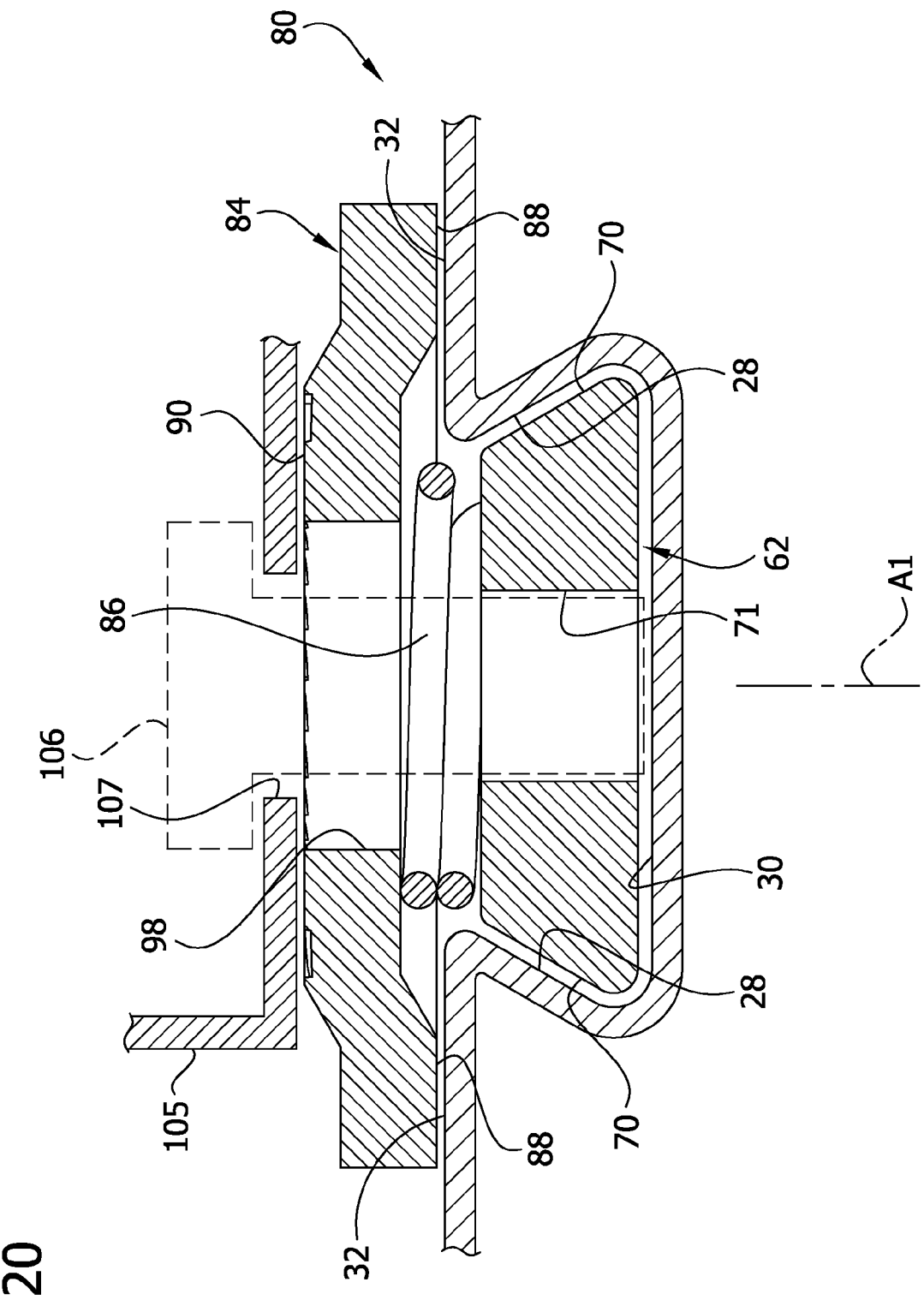
FIG. 20 is a fragmentary cross section of the fastener assembly of FIG. 17 securing a component to the channel framing.

The spring 86 allows relative movement between the coupling component 62 and the washer 84 generally along an axis A1 (e.g., an axis of the spring; see FIGS. 18 and 20). The spring 86 also provides a biasing force urging the coupling component 62 and the washer 84 toward one another. As explained in detail below, this extension of the spring 86 generates a force which clamps the washer 84 and coupling component 62 against respective outside faces 32 of the corresponding side 14, 16, 18 and the side walls 28 of the corresponding fitting groove 26 to hold the nut-washer assembly 80 in the desired or selected position on the framing 10 until an object (e.g., threaded rod 83 or other component) is secured to the assembly.

Figure 15:
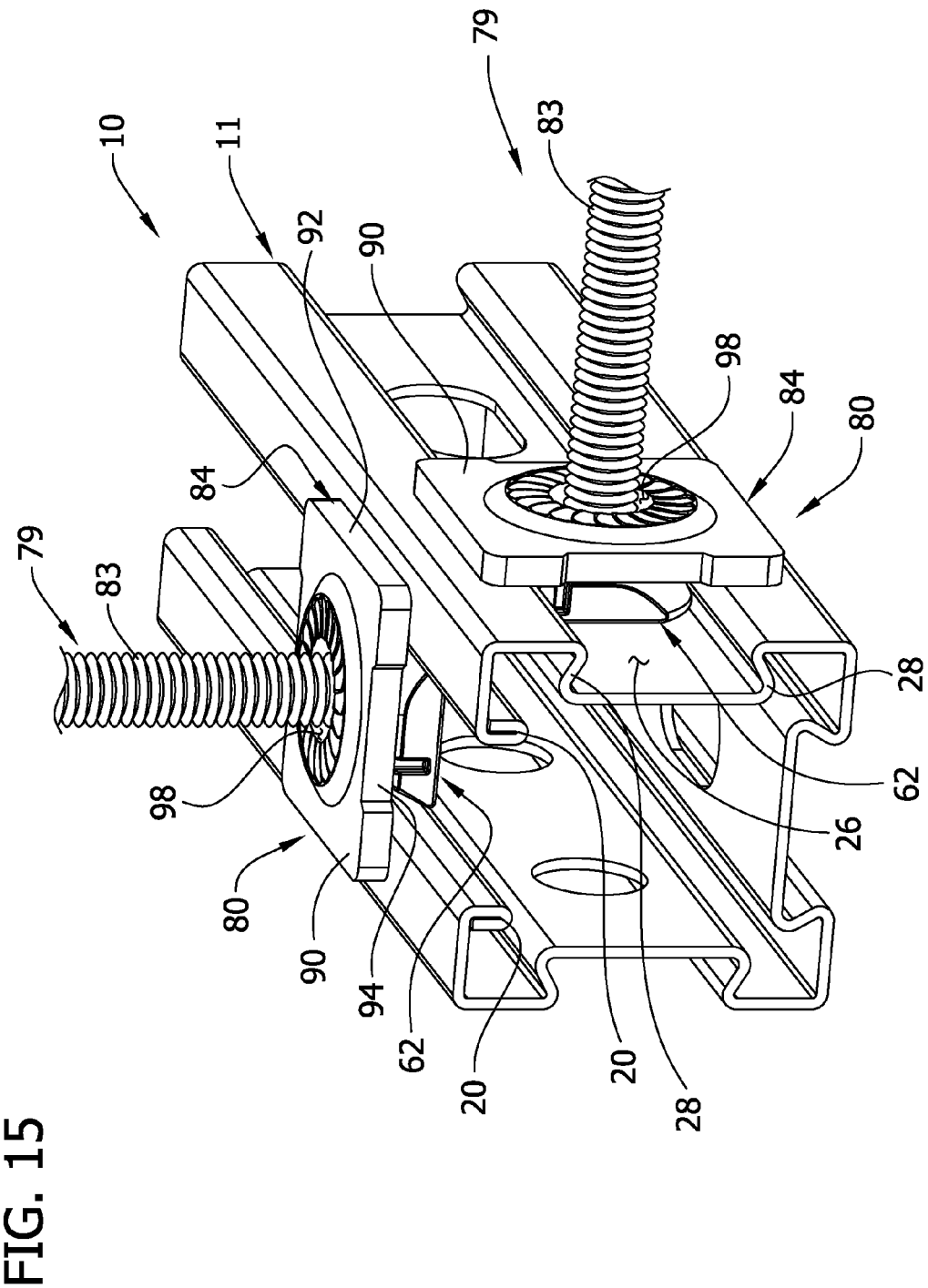
FIG. 15 is a perspective of another embodiment of a fitting comprising a rod hanger assembly installed on upper and right sides of the channel framing.
Figure 16:
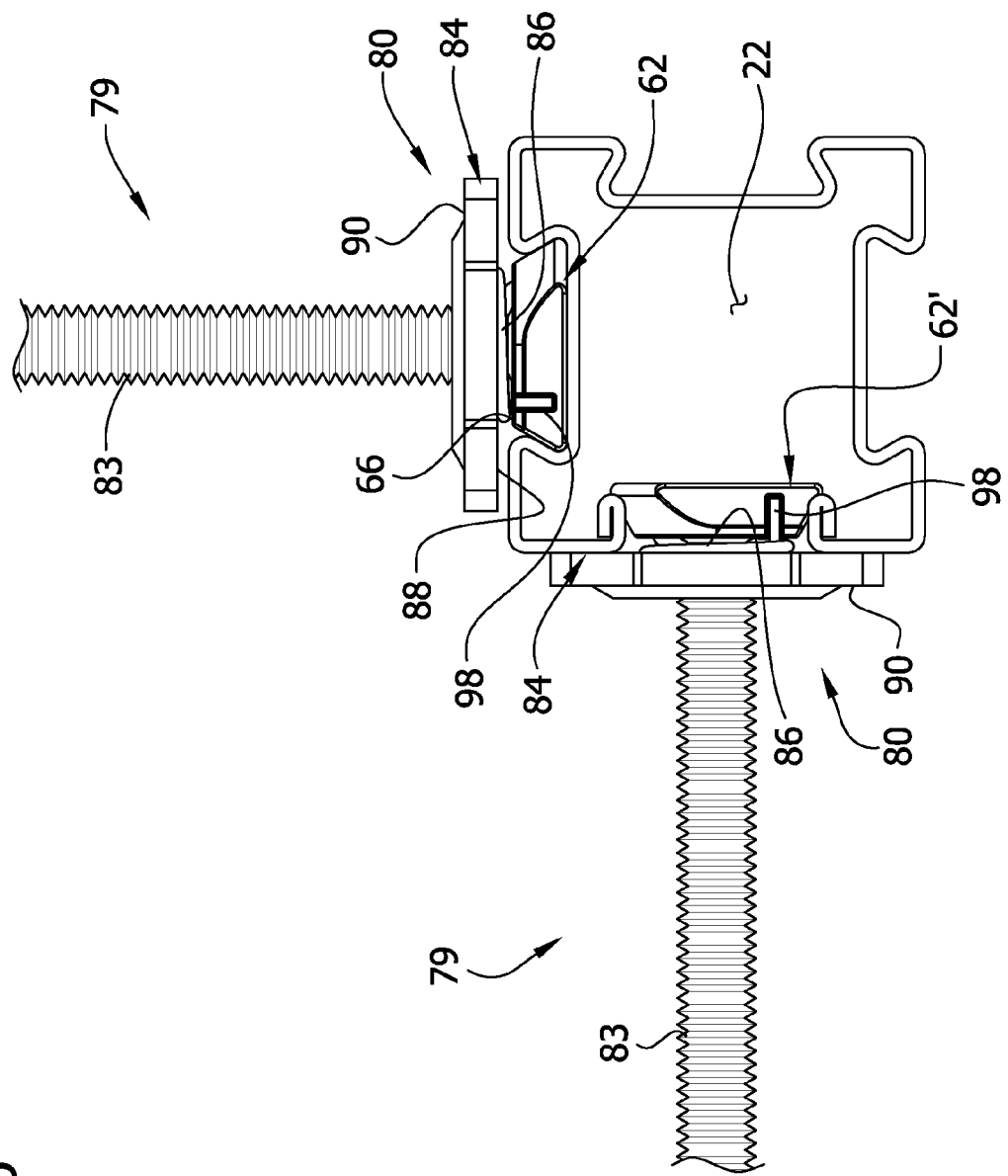
FIG. 16 is a front elevational view of FIG. 15.

Referring to FIGS. 15 and 16, to install the nut-washer assembly 80 on the channel framing 10, the coupling component 62 is aligned with, entered into and passed through fitting groove 26 from the outside to the inside thereof until portions of the inside face 88 of the washer 84 adjacent opposite sides thereof contact (or nearly contact) the outside surface 32 of corresponding side 14, 16, 18 of the framing. Once the coupling component 62 is at the bottom 30 of the fitting groove 26, the nut-washer assembly 80 is then turned (rotated) in a first direction (e.g., clockwise), suitably using the washer 84 as a handle, to bring the rounded, beveled corners 74 (e.g., ramps) of the coupling component 62 into contact with the flared side walls 28 of the fitting groove 26. Applying a further rotational force on the coupling component 62 will cause the spring 86 to extend and the flared side walls 28 to ride up respective beveled, rounded corners 74 (e.g., ramps) of the coupling component 62, thereby increasing the distance between the opposing faces 66, 88 of the coupling component 62 and the washer 84, respectively. Rotation of the coupling component 62 is continued in the same direction through about 90 degrees (e.g., about a quarter turn) until the coupling component extends crosswise relative to the fitting groove 26 and the beveled ends 70 are in abutting relation with the opposing side walls 28 defining the fitting groove and the inside face 64 of the coupling component is at the bottom 30 of the fitting groove. The beveled, rounded corners 74 of the coupling component 62 facilitate rotation of the coupling component to this crosswise position, with further rotation being prevented by the unreduced (squared off) corners 76 which assist in holding the coupling component against further turning. After the coupling component 62 has been turned to this crosswise position, the washer 84 is released by the user. The extended spring 86 exerts a force which urges the washer 84 and coupling component 62 toward one another to bring the beveled sides 70 of the coupling component into clamping engagement with the flared side walls 28 of the fitting groove 26 and portions of the inside face 88 of the washer 84 into clamping engagement with the outside surfaces 32 of the corresponding side 14, 16, 18. The nut-washer assembly 80 may be quickly and easily removed from the framing 10 (as for reuse) by simply reversing the steps as set out above.

After the nut-washer assembly 80 is installed on the channel framing 10, a component (e.g., the rod 83) can be secured to the nut-washer assembly (or alternatively, the component may be secured to the nut-washer assembly before the nut-washer assembly is installed on the channel framing). In the illustrated example, the rod 83 is inserted through the opening 98 in the washer 84 and threaded into the opening 71 in the coupling component 62. The coupling component 62 is prevented from turning relative to the framing 10 by contact of the square (unreduced) corners 76 of the coupling component with the flared side walls 28.

Referring to FIG. 20, in another example a different component 105 (e.g., a bracket) can be secured to the framing 10 using the nut-washer assembly 80. In one embodiment, the nut-washer assembly 80 is inserted in the fitting groove 26 in the manner described above. A threaded fastener 106 (e.g., a bolt) is inserted through an opening 107 in the component 105 and the opening 98 in the washer 84 and threaded the opening 71 in the coupling component 62. The threaded fastener 106 is tightened to bring an opposing surface of the component 105 into frictional clamping engagement with serrations 111 (or other rough formations; see FIG. 18) on the outside face 90 of the washer 84, and to bring the coupling component 62 and the washer into an even more forceful clamping engagement with the framing 10.

As shown in FIGS. 15 and 16, in one embodiment the nut-washer assembly 80 may also be configured for attachment to the upper side 12 of the framing 10. That is, the nut-washer assembly 80 is configured for insertion in the continuous slot 19 and for clamping engagement with the lips 20. The method of attaching the nut-washer assembly 80 to the upper side 12 of the framing 10 may be substantially the same as attaching the nut-washer to the other sides 14, 16, 18, with the exception that the corners 76 will not inhibit over-rotation of the coupling component 62 (i.e., will not inhibit rotation of the coupling component past 90 degrees or a quarter turn).

Figure 21:
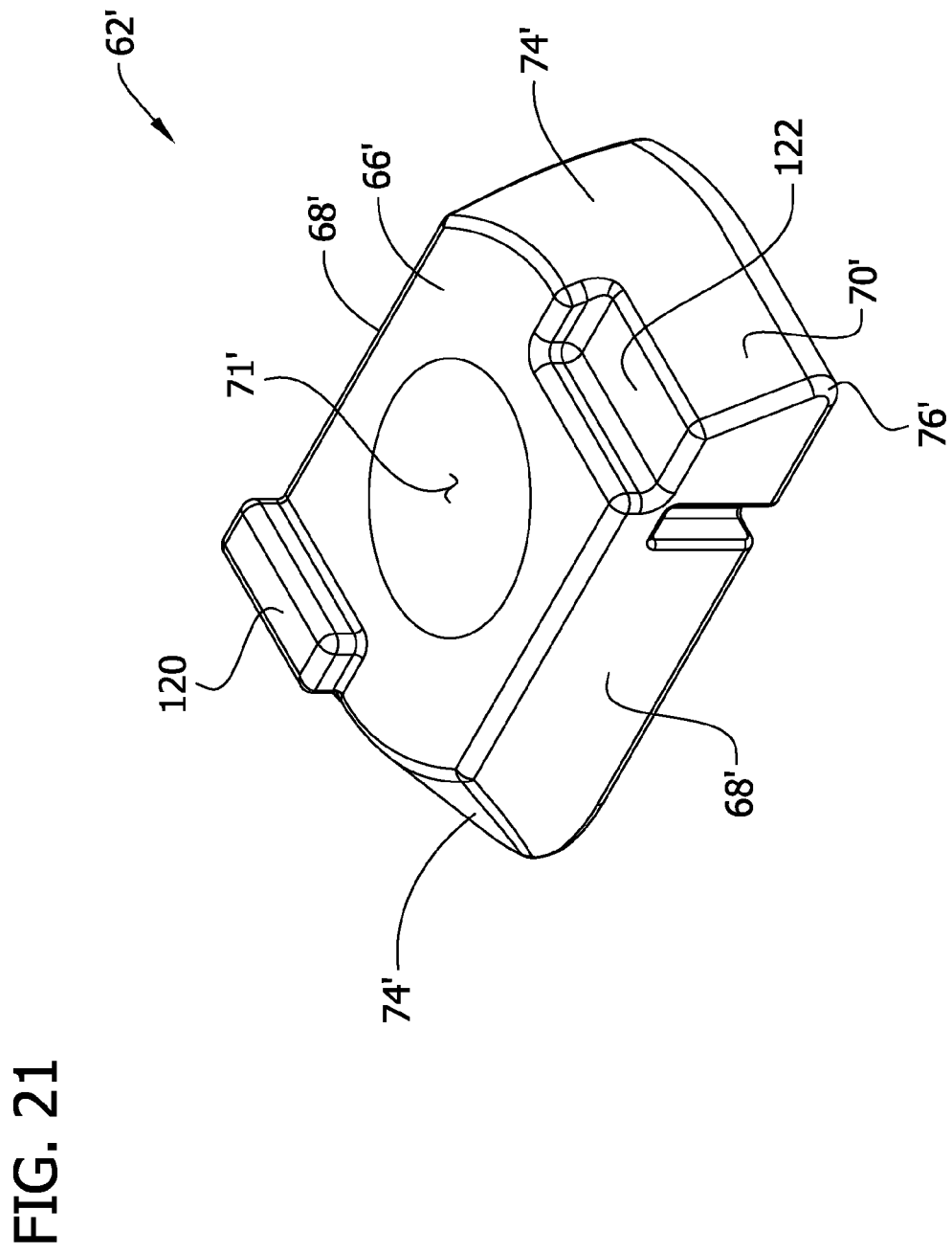
FIG. 21 is an enlarged perspective of another embodiment of a coupling component for a fitting for use with the channel framing.
Figure 22:
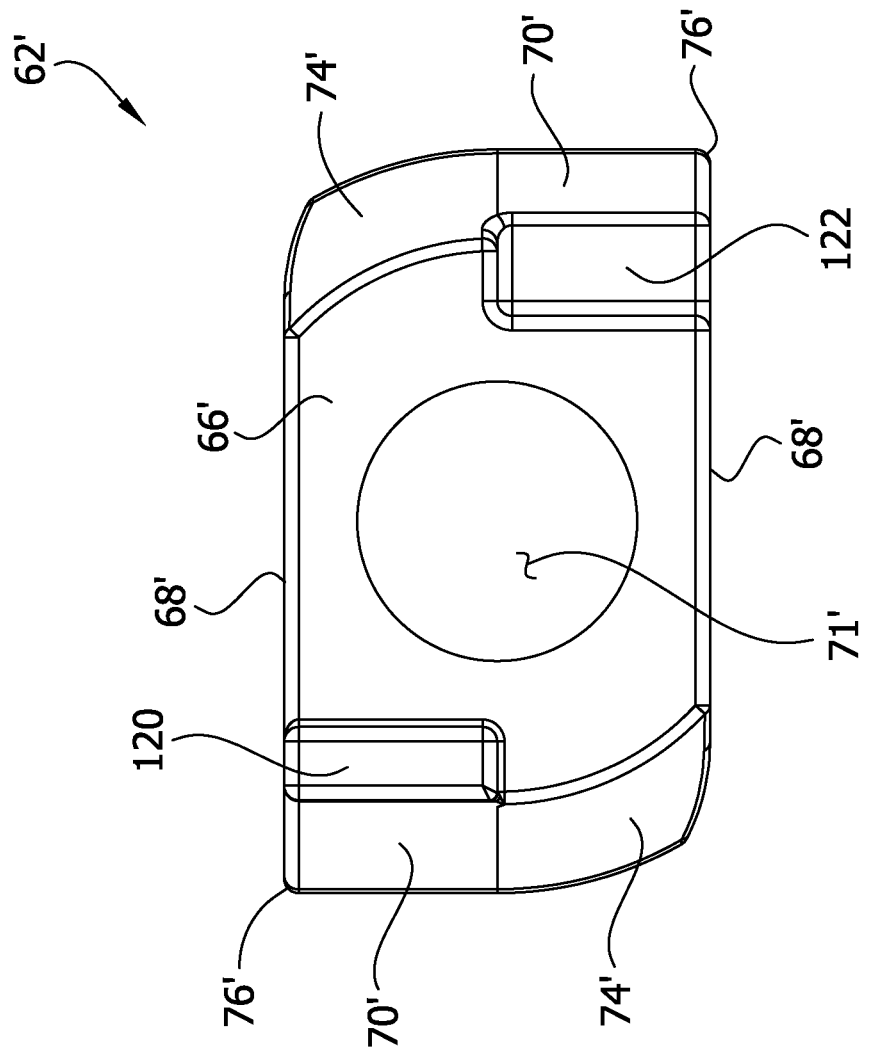
FIG. 22 is a top plan view of the coupling component of FIG. 21.
Figure 23:
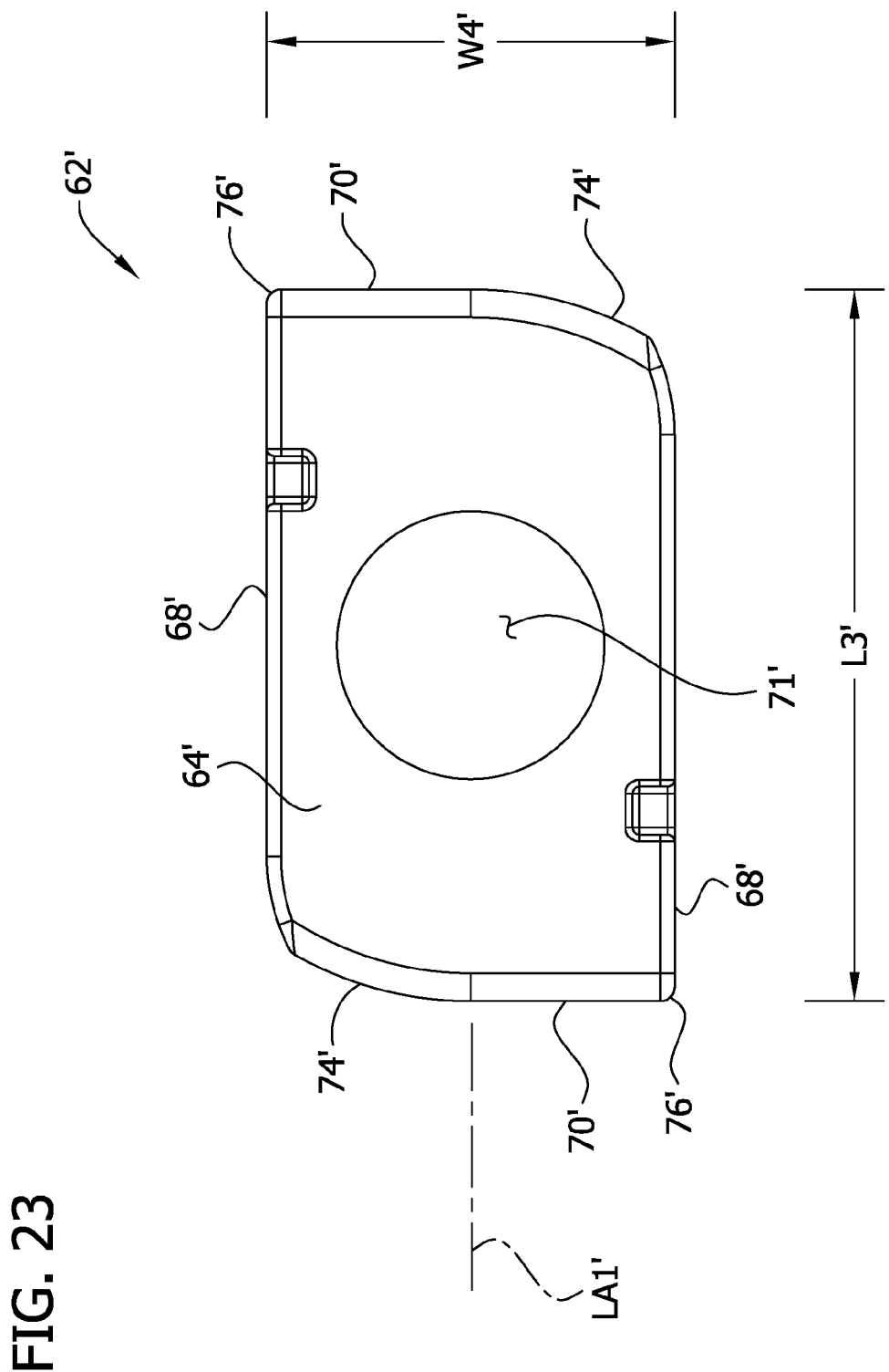
FIG. 23 is a bottom plan view of the coupling component.

Referring to FIGS. 21-23, another embodiment of coupling component is generally indicated at 62'. This coupling component 62' is similar to the coupling component 62, with like and/or identical structures indicated by corresponding reference numerals plus a prime symbol. In particular, the coupling component 62' has a length L3', a longitudinal axis LA1', and a width W4'. The coupling component 62' includes an inside (lower) face 64', an outside (upper) face 66', opposite sides 68', and opposite ends 70'. While the length L3' of the coupling component 62' is greater than the first widths W2 of the fitting grooves 26 at the outer surfaces 32 of the respective sides 14, 16, 18, the width W4' of the coupling component is less than the first widths W2 of the fitting grooves so that the coupling component may be inserted in and installed on the any of the fitting grooves in a manner to be hereinafter described. Diagonally opposite first and second corners 74' of the coupling component 62' at opposite ends 70' of the coupling component are rounded for facilitating such installation. Diagonally opposite third and fourth corners 76' are preferably substantially squared off (i.e., not rounded) to facilitate locking of the coupling component 62' in the fitting groove 26. Further, the opposite ends 70' and the first and second corners 74' of the coupling component 62' are beveled or chamfered outwardly from the upper face 66' toward the lower face 64'. The beveled, rounded corners 74' facilitate turning the coupling component 62' to a crosswise position relative to the fitting groove 26, while the beveled opposite ends 70' have a shape corresponding generally to the shape of the space between the side walls 28 and the bottom wall 30 of the fitting groves 26, as will be described in more detail later. The coupling component 62' has a central threaded opening 71' extending completely through the component from its inside face 64' to its outside face 66', thus making it a "nut," as disclosed above. The coupling component 62' may be formed by a stamping operation or other suitable operation. The coupling component 62' may be formed from metal, such as a zinc-coated, heat treated, AISI 1018 steel having a Rockwell hardness of 30-50 C and more preferably 40-45 C. Other materials may be used.

Unlike the first embodiment of the coupling component 62, the present coupling component 62' includes a projection 120 extending outwardly from the upper face 66' and a recess 122 in the upper face. The projection 120 extends from adjacent one of the corners 76' along the corresponding one of the opposite ends 70', and the recess 122 extends from adjacent the other diagonally opposite corner 76' along the other opposite end 70'. As seen in FIGS. 24 and 24A, two of the coupling components 62' may be stacked so that the respective outside faces 66' are opposing and in engagement with one another to form a double or dual coupling component assembly, generally indicated at 130. In this configuration, the projections 120 on the respective the coupling components 62' are received in the corresponding recesses 122 of the coupling components.

The dual coupling component assembly 130 can be combined with a washer (e.g., washer 84), a resilient member (e.g., spring 86), and a fastener (e.g., bolt 124) to form another embodiment of a fitting, generally indicated at 150 in FIGS. 24 and 24A. The washer 84, the spring 86, and the bolt 124 may be identical to the like components in the embodiment shown in FIG. 17 and described above. The spring 86 is secured to an upper one of the coupling components 62' and the washer 84, such as in ways described above, to interconnect the upper coupling component and the washer. The bolt 124 is inserted through the opening 98 in the washer 84 and thread into the aligned threaded openings 71' of the two coupling components 62' of the dual coupling component assembly 130 to hold the fitting 150 in an assembly.

Figure 25:
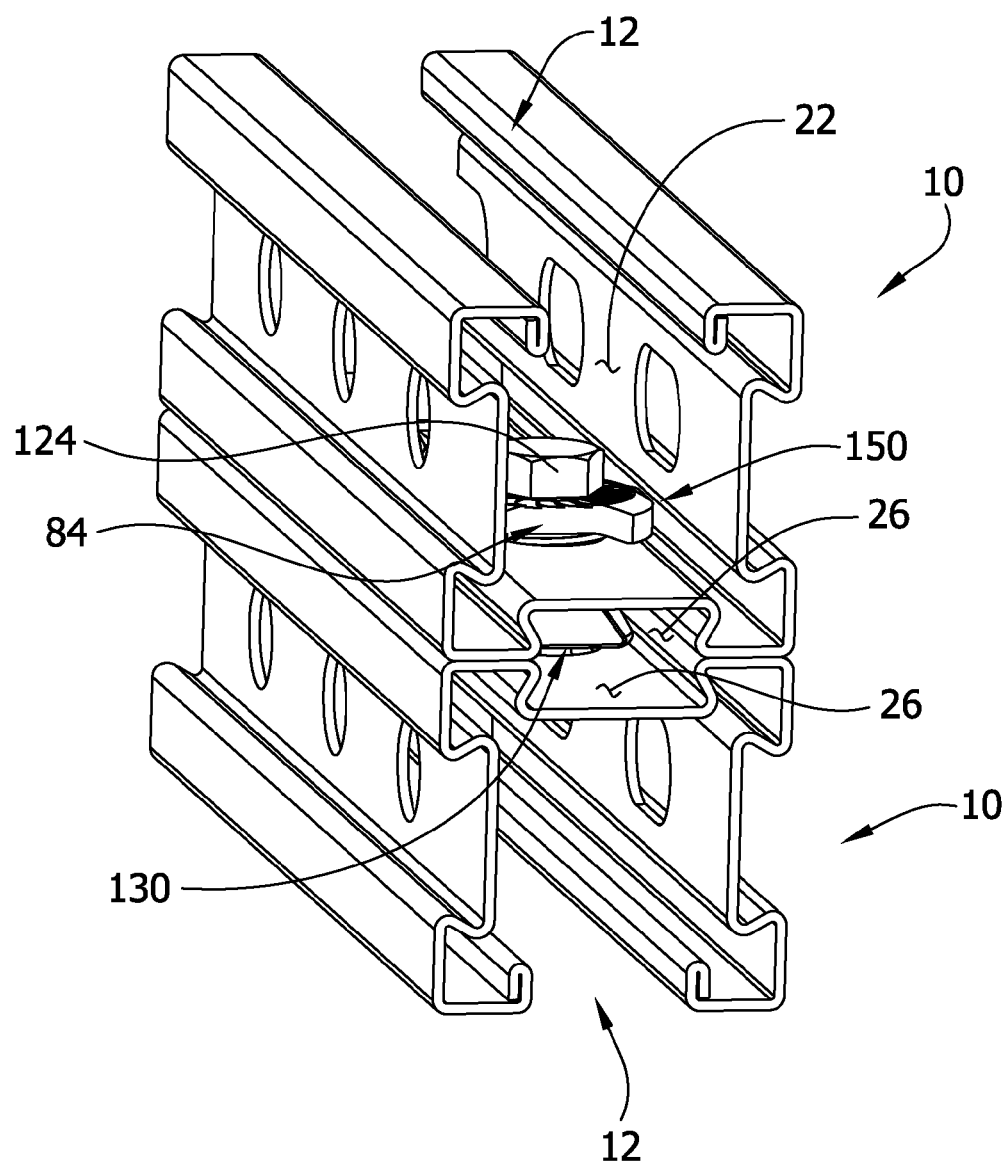
FIG. 25 is a perspective of two pieces of channel framing connected to one another in a side-by-side arrangement by the fitting of FIG. 24.
Figure 26:
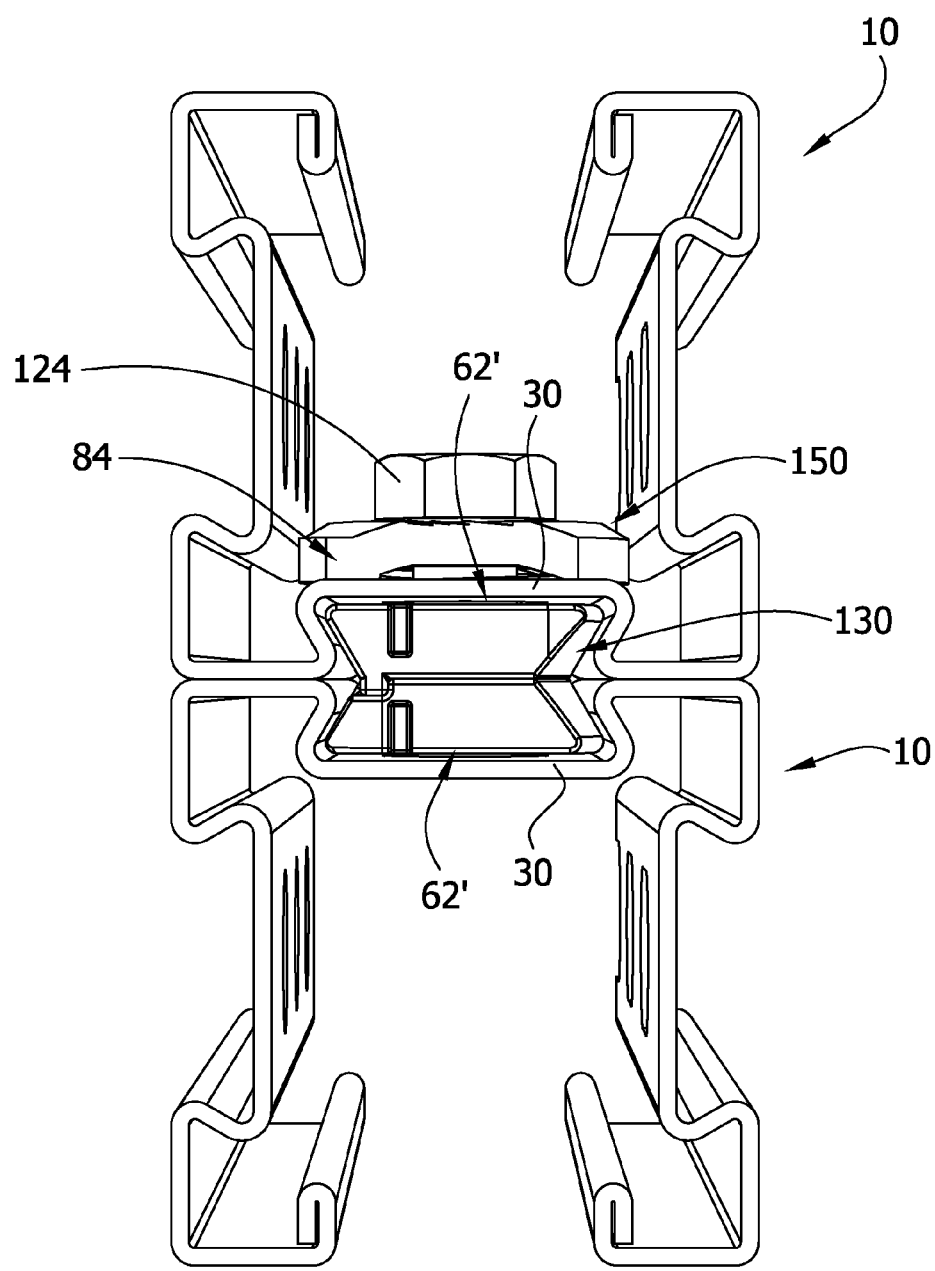
FIG. 26 is a front elevational view of FIG. 25.
Figure 27:
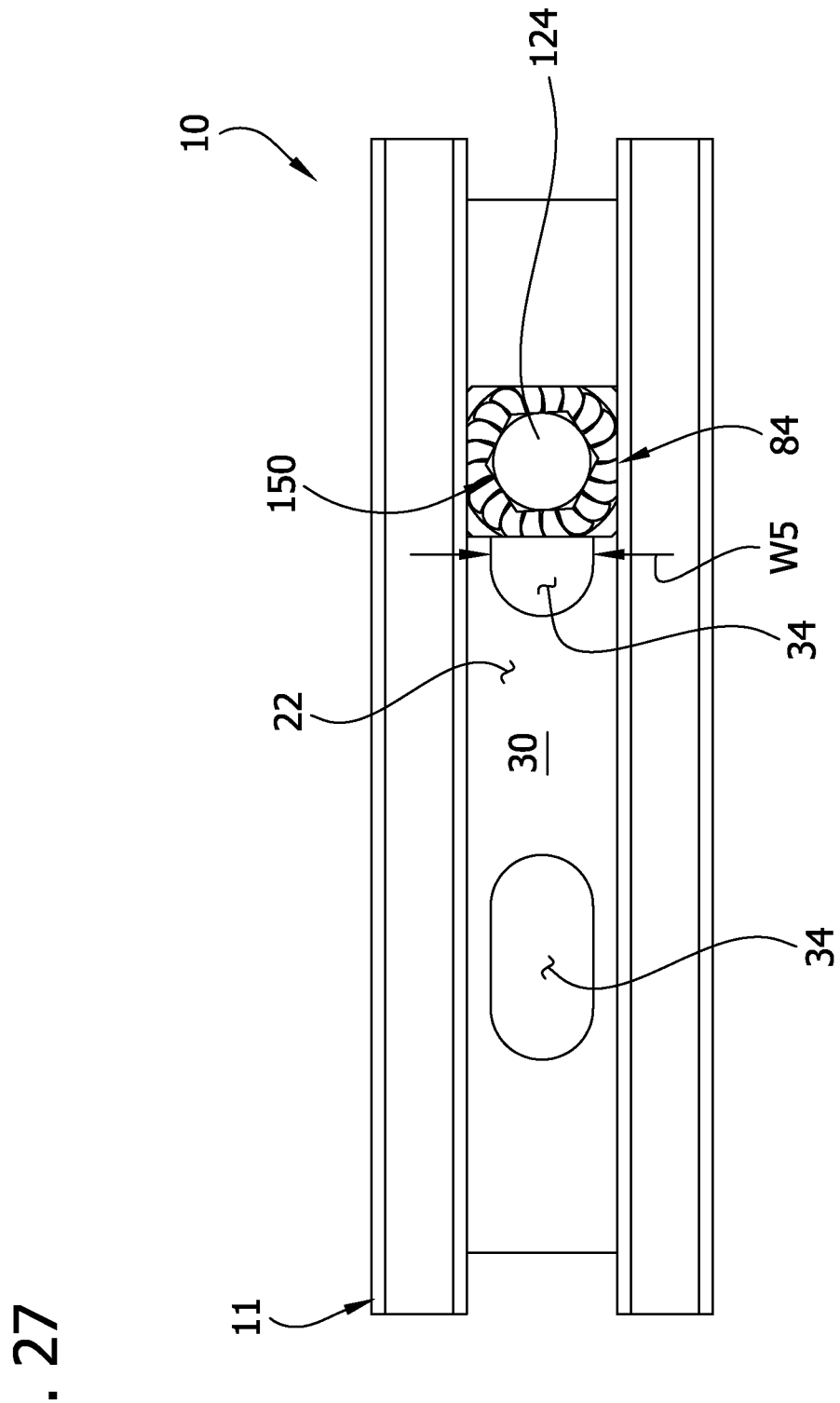
FIG. 27 is a top plan view of FIG. 25.

In one method, the fitting 150 can be used to connect two pieces of channel framing 10 to one another in a side-by-side configuration, as shown in FIGS. 25-27. It is understood that the fitting 150 can be used to secure any one of the sides 14, 16, 18 of a first channel framing 10 to any one of the sides 14, 16, 18 of another channel framing. Moreover, more than two pieces of channel framing 10 may be secured together. In an exemplary method, the fitting 150 is inserted into the interior 22 of a first one of the channel framings 10, such as by inserting the fitting through the continuous slot 19 defined in the upper side 12. The dual coupling component assembly 130 of the fitting 150 is then inserted in one of the fitting grooves 26 through one of the slot-shaped openings 34 extending through the bottom 30 of the corresponding fitting groove. The widths W4' of the coupling components 62' (together defining the width of the dual coupling component assembly 130) are less than the width W5 of the slot-shaped opening 34 in the bottom wall 30 and the widths W2, W3 of the fitting groove 26 so that dual coupling component assembly can be inserted through the slot-shaped opening and into the fitting groove from the interior 22 of the channel framing 10. In particular, the first coupling component 62' will be received in the fitting groove 26 and the second coupling component 62' will extend out of the groove. In one embodiment, the washer 84 is dimensioned (i.e., has suitable length and width) so that the washer will not enter the slot-shaped opening 34 after the dual coupling component assembly 130 is inserted therethrough. Upon inserting the dual coupling component assembly 130 in the fitting groove 26 of the first channel framing 10, a second channel framing 10 can be brought into side-by-side arrangement with the first piece of channel framing, whereupon the second coupling component 62' enters the fitting groove 26 of the second channel framing 10. With the pieces of channel framing in a side-by-side arrangement and the dual coupling component 130 received in both fitting grooves 26, the fitting 150 is turned about 90 degrees (i.e., about a quarter turn) to simultaneously lock each of the coupling components 62' in respective fitting grooves 26 in the same manner as described above with respect to coupling component 62. The bolt 124 is then tightened to clamp the bottom wall 30 between the washer 84 and the dual coupling component 130, which also imparts friction between the washer and the bottom wall to inhibit rotation of the fitting 150 relative to the channel framing 10. As a result, the first and second coupling components 62' are inhibited from rotating relative to the respective fitting grooves 26 to inhibit the coupling components 62' from inadvertently disengaging from the respective channel framings 10.

Figure 28:
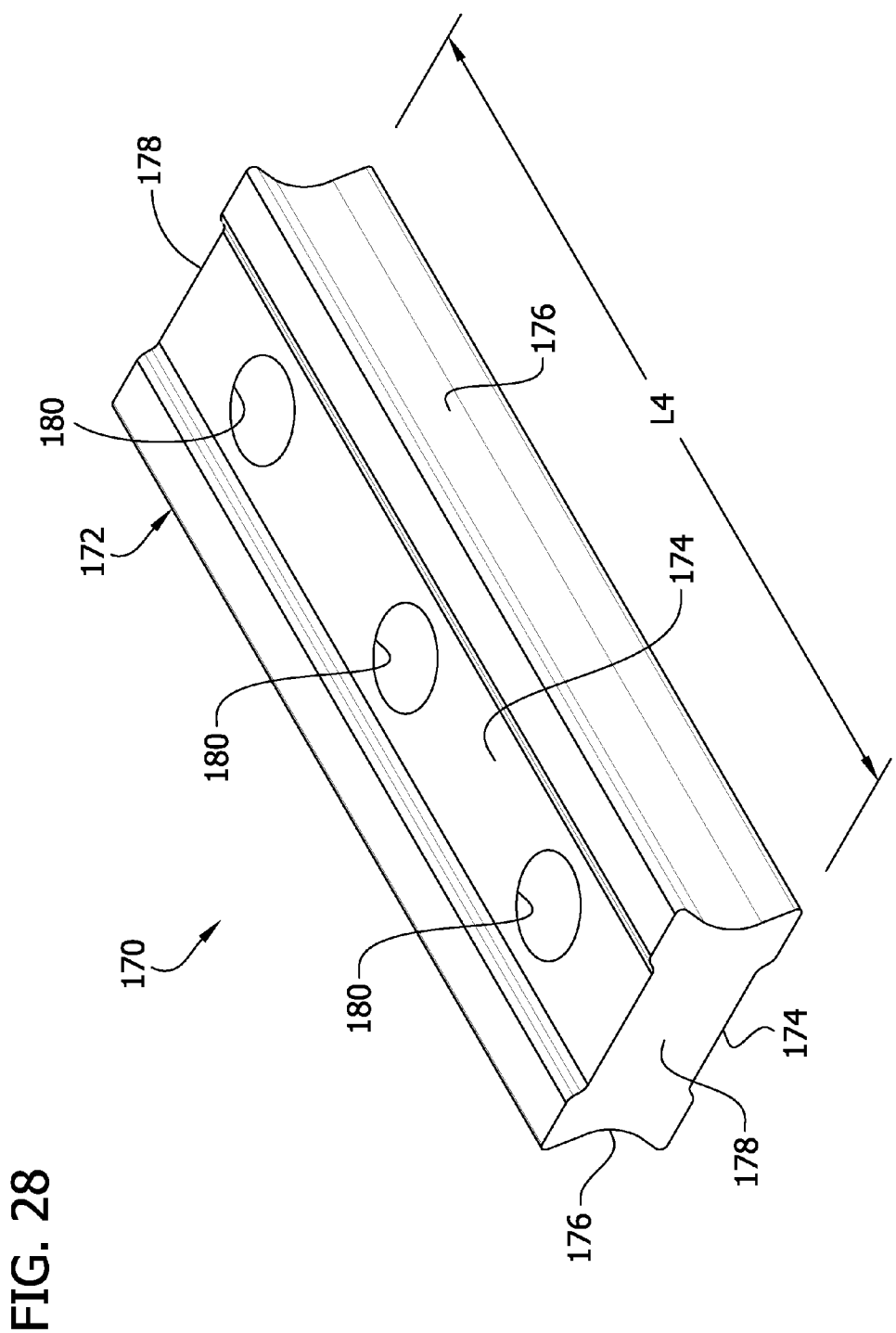
FIG. 28 is a perspective of another embodiment of a fitting comprising a coupling block for use with the channel framing.
Figure 29:
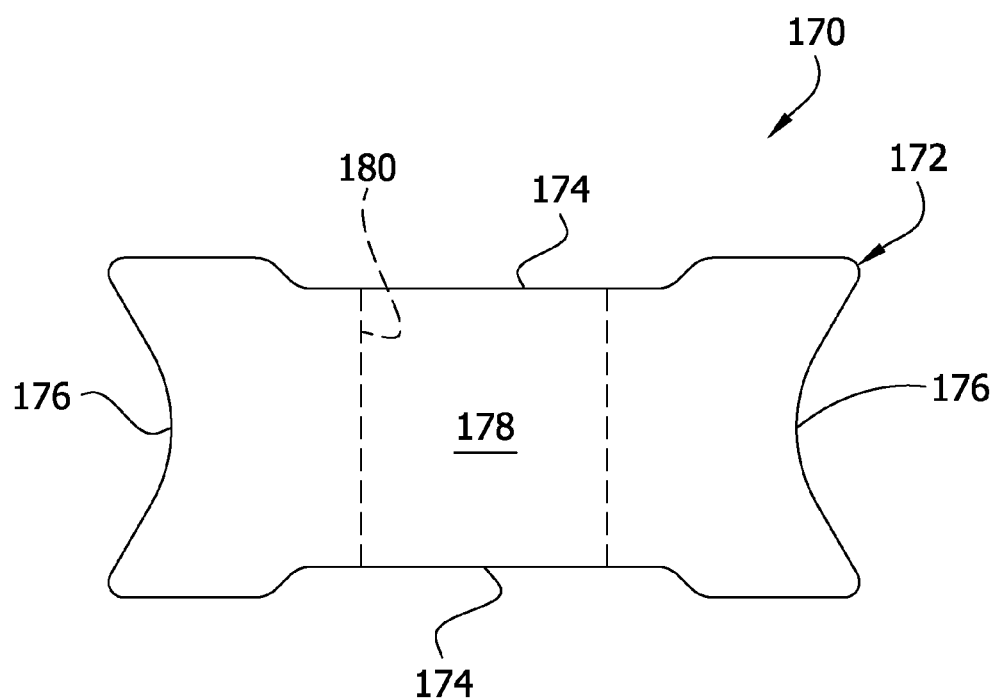
FIG. 29 is a front elevational view of the fitting of FIG. 28.
Figure 30:
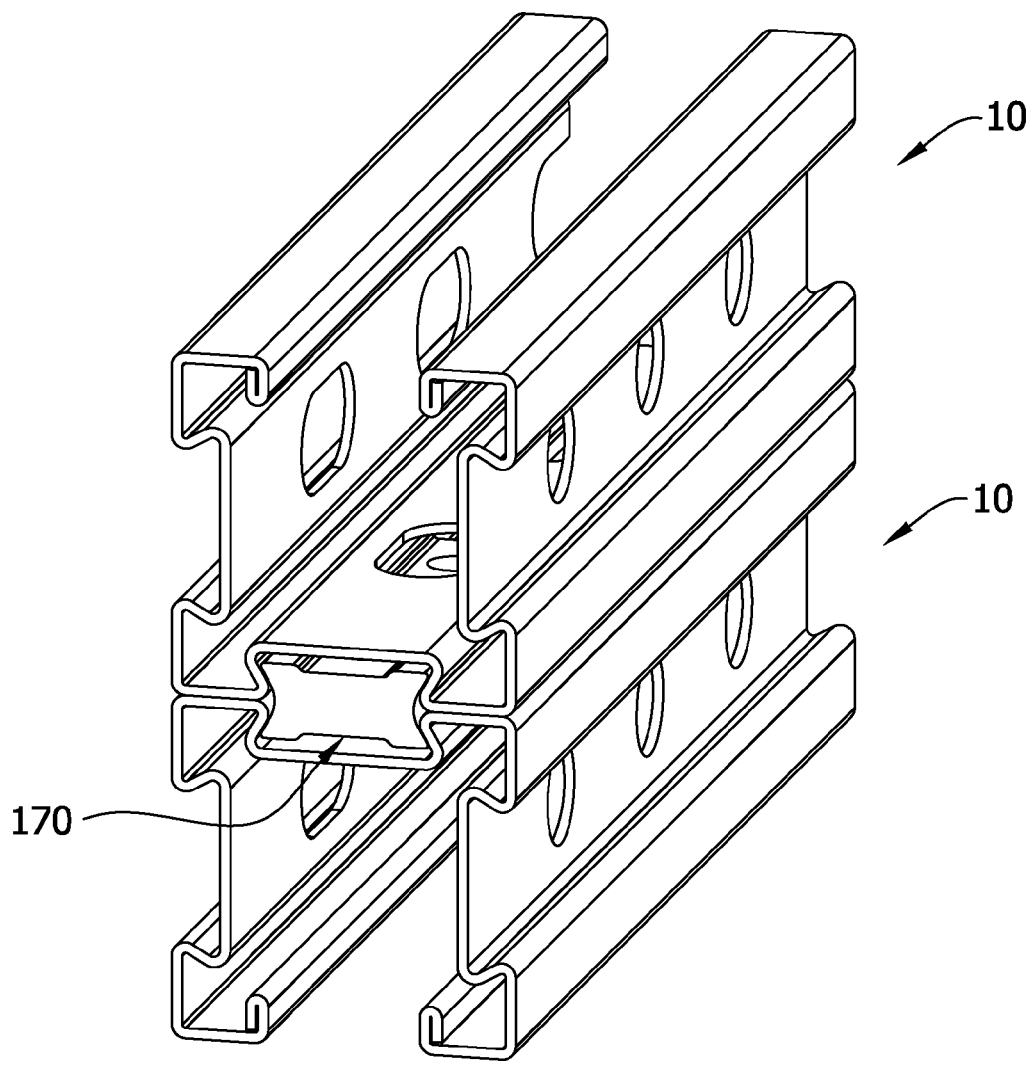
FIG. 30 is a perspective of two pieces of channel framing connected to one another in a side-by-side arrangement by the fitting of FIG. 28.
Figure 31:
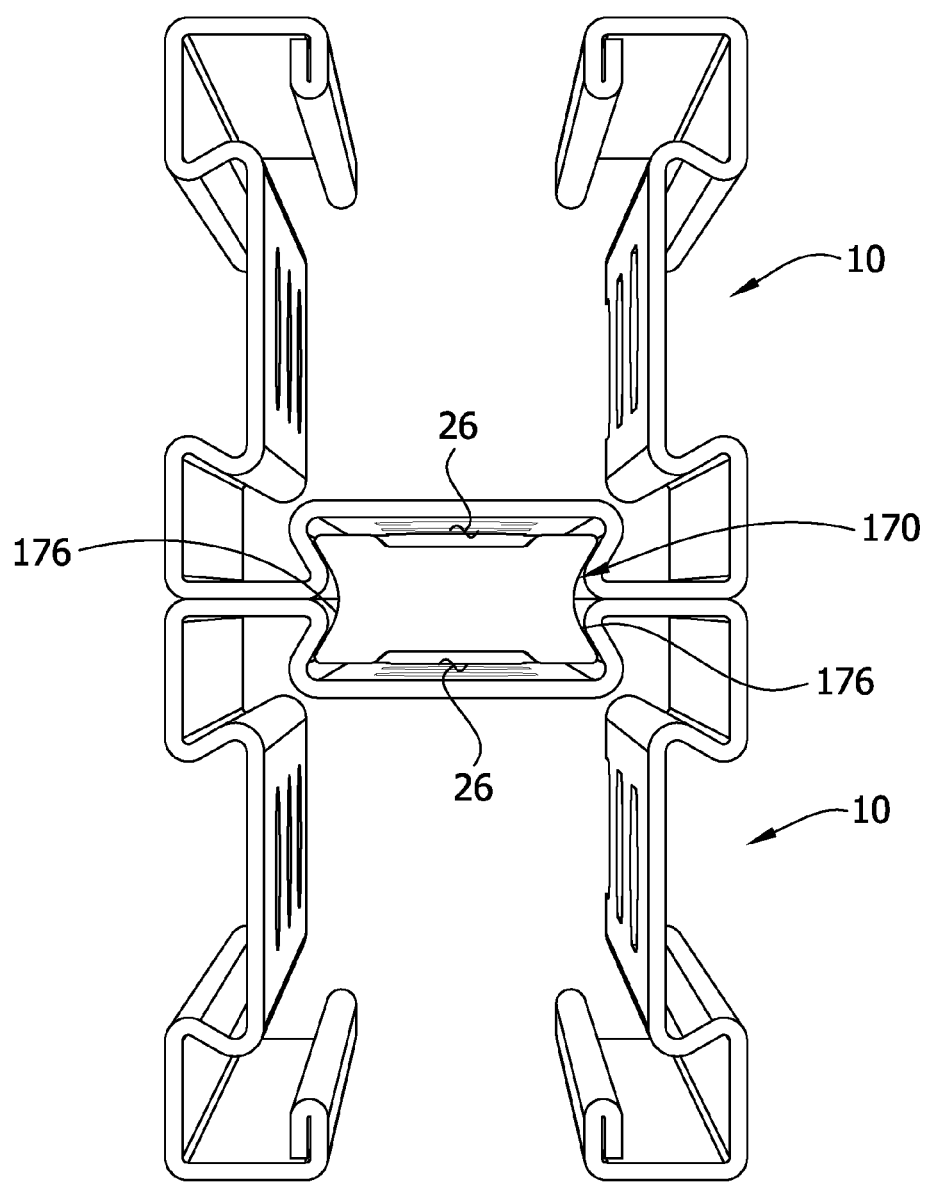
FIG. 31 is a front elevational view of FIG. 30.
Figure 32:
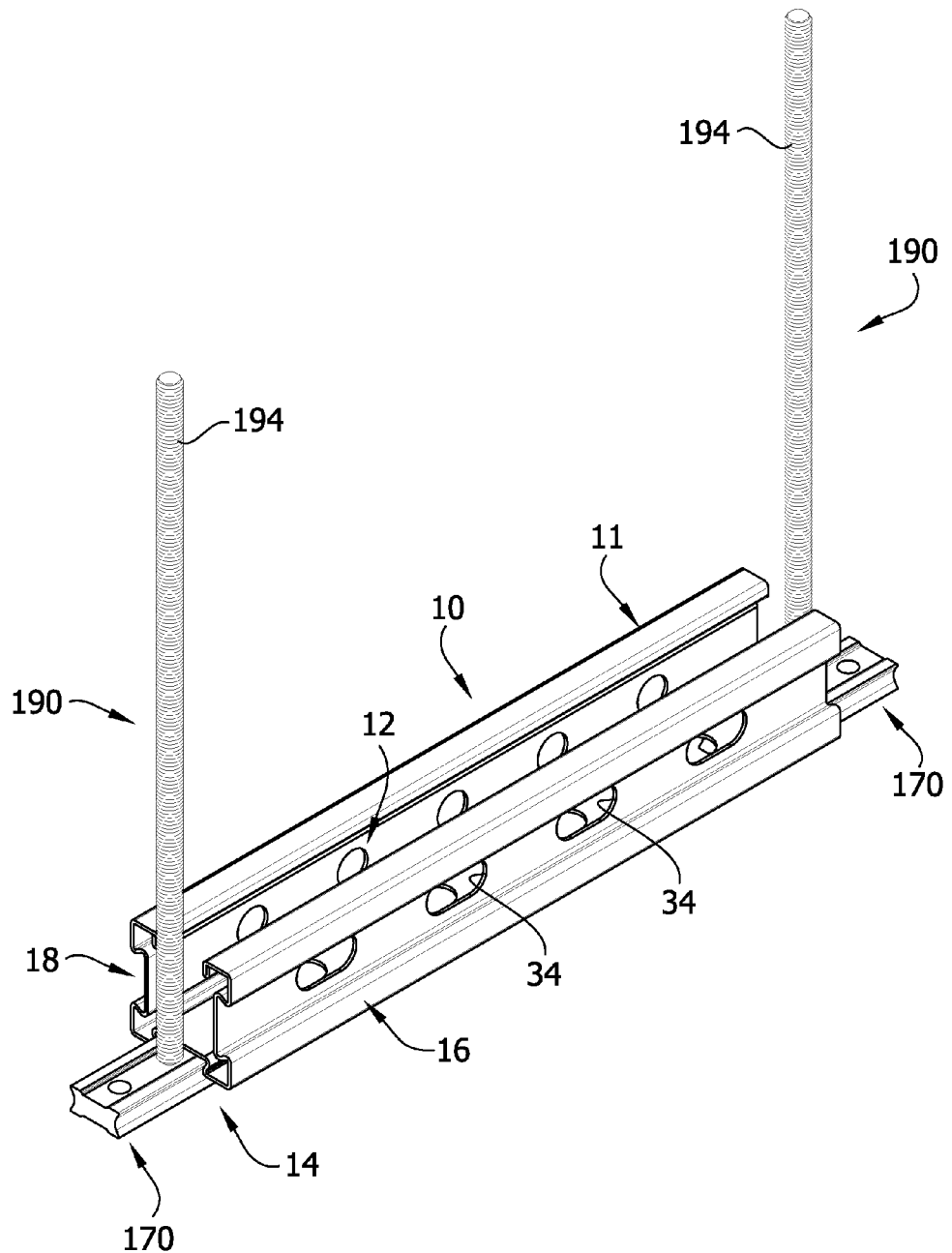
FIG. 32 is a perspective of the channel framing and another embodiment of a fitting comprising a rod hanger assembly which uses the fitting of FIG. 28 as a coupling component installed on the channel framing.

Referring to FIGS. 28 and 29, another embodiment of a coupling component, which itself may be a fitting, is generally indicated at 170. The coupling component 170 comprises an elongate body, generally designated 172, that is generally in the form of a block. The body 172 has opposite faces 174, opposite sides 176, and a length L4 extending between opposite ends 178. The body 172 has double or dual dovetail cross-sectional shape corresponding generally to the shape of opposing fitting grooves 26 when two pieces of channel framing 10 are arranged side-by-side, as shown in FIGS. 30 and 31, for example. In particular, the body 172 is sized and shaped for sliding in an open end of the fitting groove(s) 26 at the ends of the channel framings 10. One or more openings 180 (e.g., three openings in the present embodiment) extend through the opposite faces 174. These openings 180 may be threaded, for reasons explained in more detail below. In the illustrated embodiment, a plurality of openings 180 are spaced apart along the length L4 of the body 172.

Referring to FIGS. 30 and 31, in one embodiment the coupling component 170 is used as an insert to connect two pieces of channel framing 10 side-by-side. The coupling component 170 is inserted into two opposing fitting grooves 26 of two side-by-side pieces of channel framing 10. Additional pieces of channel framing 10 may be connected using one or more additional similar coupling components 170. The openings 34 (e.g., slot-shaped openings) in the bottom walls 30 of the corresponding fitting grooves 26 and one of the openings 180 in the body 172 may be aligned so that a fastener (e.g., a bolt, not shown) may be inserted through the aligned openings. A head of the bolt may engage one of the bottom walls 30 inside the interior 22 of one of the corresponding framing 10, and a nut (not shown) may be threaded on the terminal end of the bolt in engagement with the other bottom wall 30 inside the interior of the other piece of framing 10. In another embodiment, the openings 180 may be threaded and fasteners (e.g., a bolt, not shown) may be threaded into one or more of the openings 180 to secure the pieces of channel framing 10 to the coupling component 170. Other ways of securing the framing 10 to the coupling component 170 do not depart from the scope of the present invention.

Figure 33:
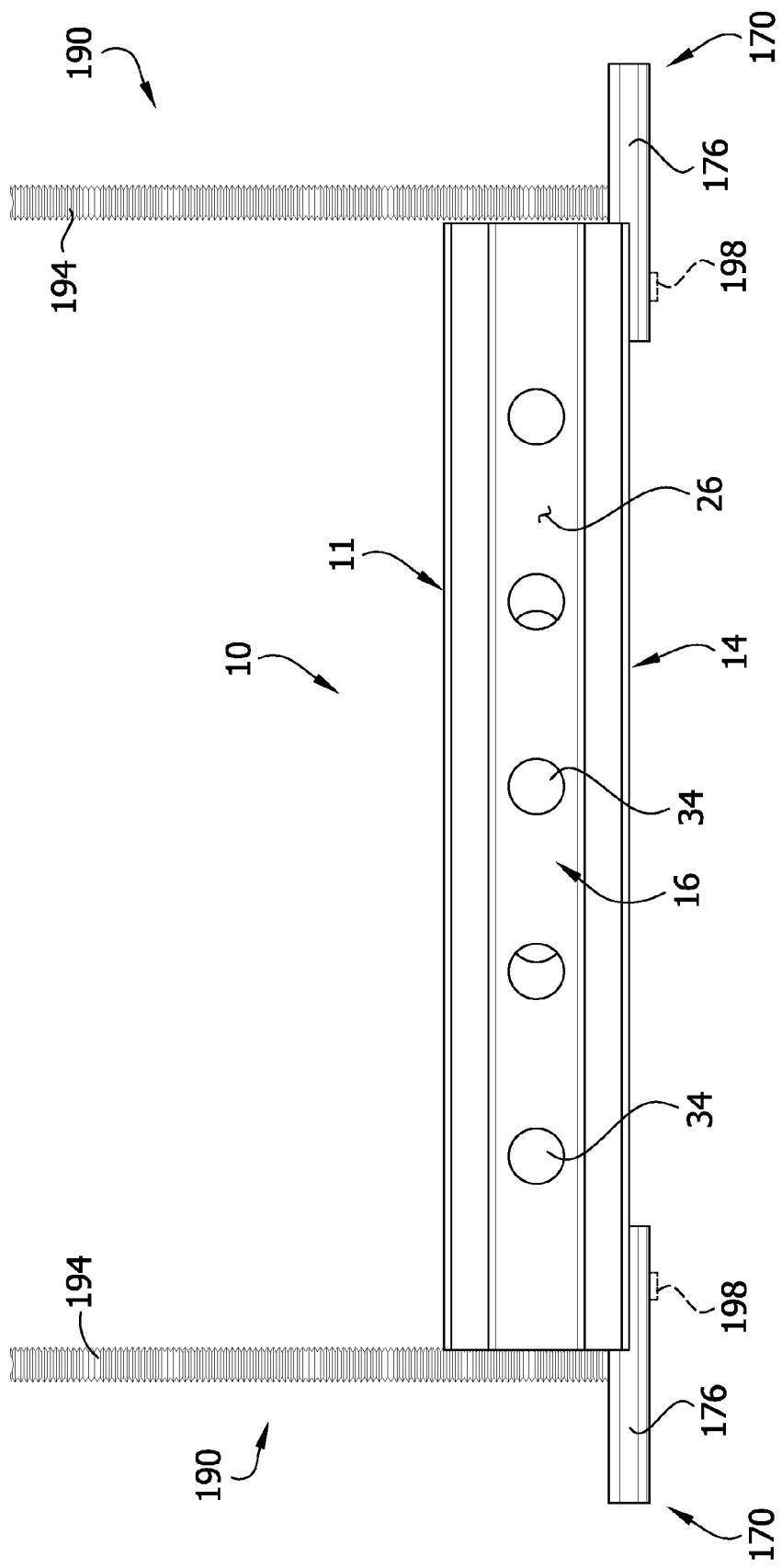
FIG. 33 is a right elevational view of FIG. 32.
Figure 34:
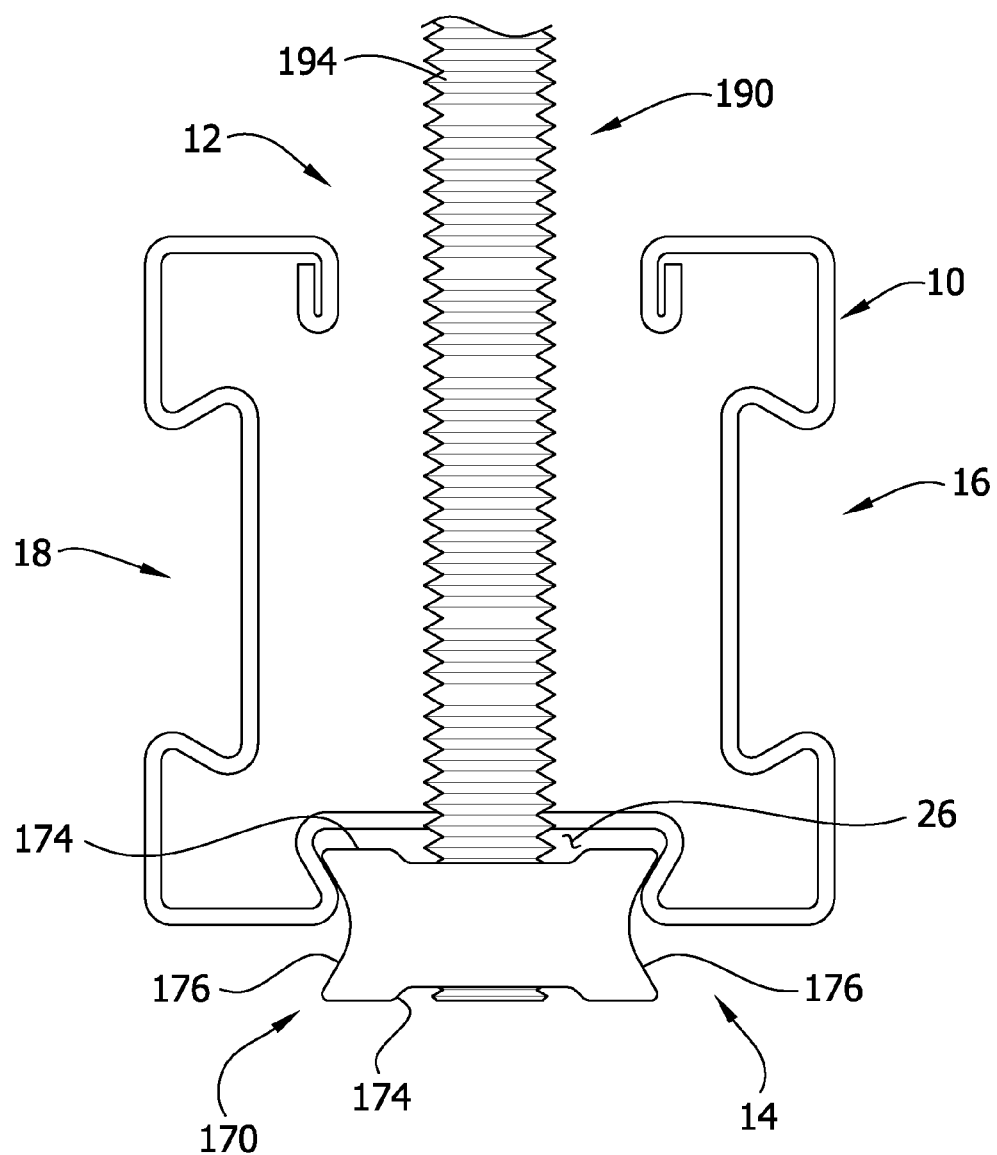
FIG. 34 is a front elevational view of FIG. 32.
Figure 35:
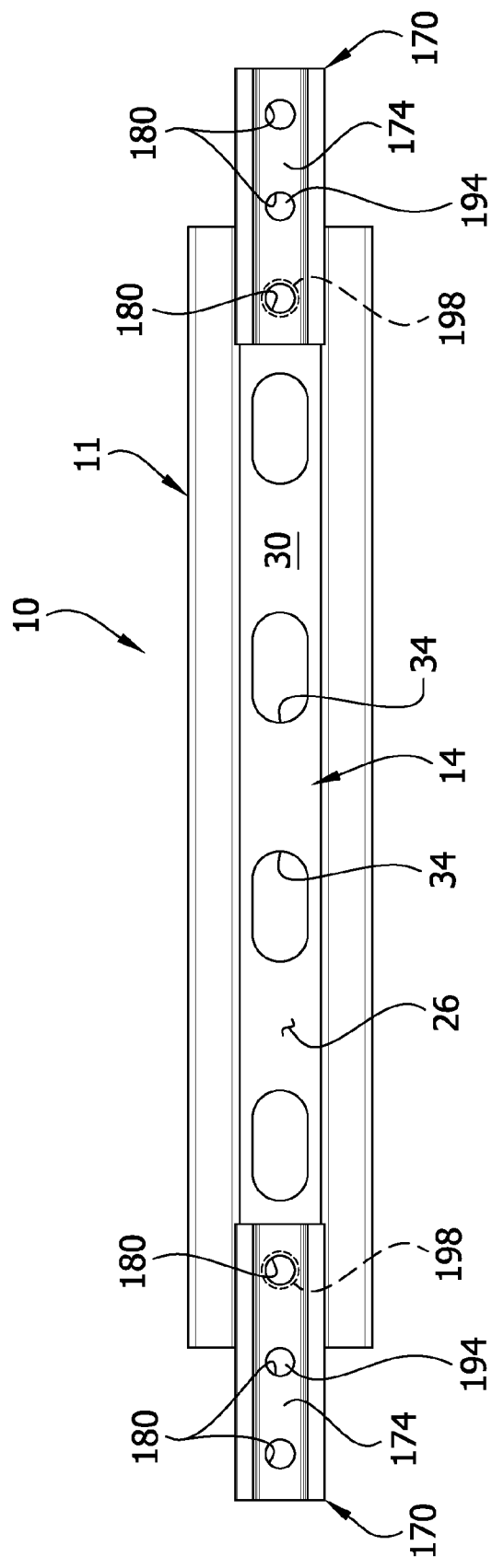
FIG. 35 is a bottom plan view of the FIG. 32.

In another embodiment, the coupling component 170 may be used as the coupling component of another embodiment of a rod hanger assembly. Referring to FIGS. 32-35, a pair of rod hanger assemblies (broadly, fittings), each of which is generally indicated at reference numeral 190, suspends a framing 10 from a ceiling or other elevated structure. Each rod hanger assembly 190 comprises a coupling component 170, as described above, and a threaded rod 194 threaded in one of the openings 180 (i.e., threaded openings) in the body 172 of the coupling component 170. Each coupling component 170 is inserted into one of the open ends of one of the fitting grooves 26 of the framing 10. A fastener 198 (e.g., a set screw or bolt) may be threaded through one of the openings 180 (an innermost opening) of each coupling component 170, as illustrated in FIG. 33, and engage a bottom wall 30 of the respective groove 26 to inhibit lengthwise movement of the coupling component 170 in the groove. The rods 194 are threaded into openings 180 (an intermediate opening) in the coupling components 170.

In one embodiment, a method of hanging the channel framing 10 from a ceiling or other elevated structure includes inserting a single coupling component 170 or a pair of coupling components into one of the fitting grooves 26 so that ends of the coupling component(s) 170 extend outward from open ends of the grooves, and in particular, so at least one opening 180 in each coupling component is accessible. Next, the coupling component(s) 170 may be secured to the channel framing 10 using the fasteners 198. Then, the rods 194 can be threaded into the accessible openings 180 on either end of the channel framing 10. Other ways of hanging the channel framing 10 using the rod hanger assemblies 190 do not depart from the scope of the present invention.

Figure 36:
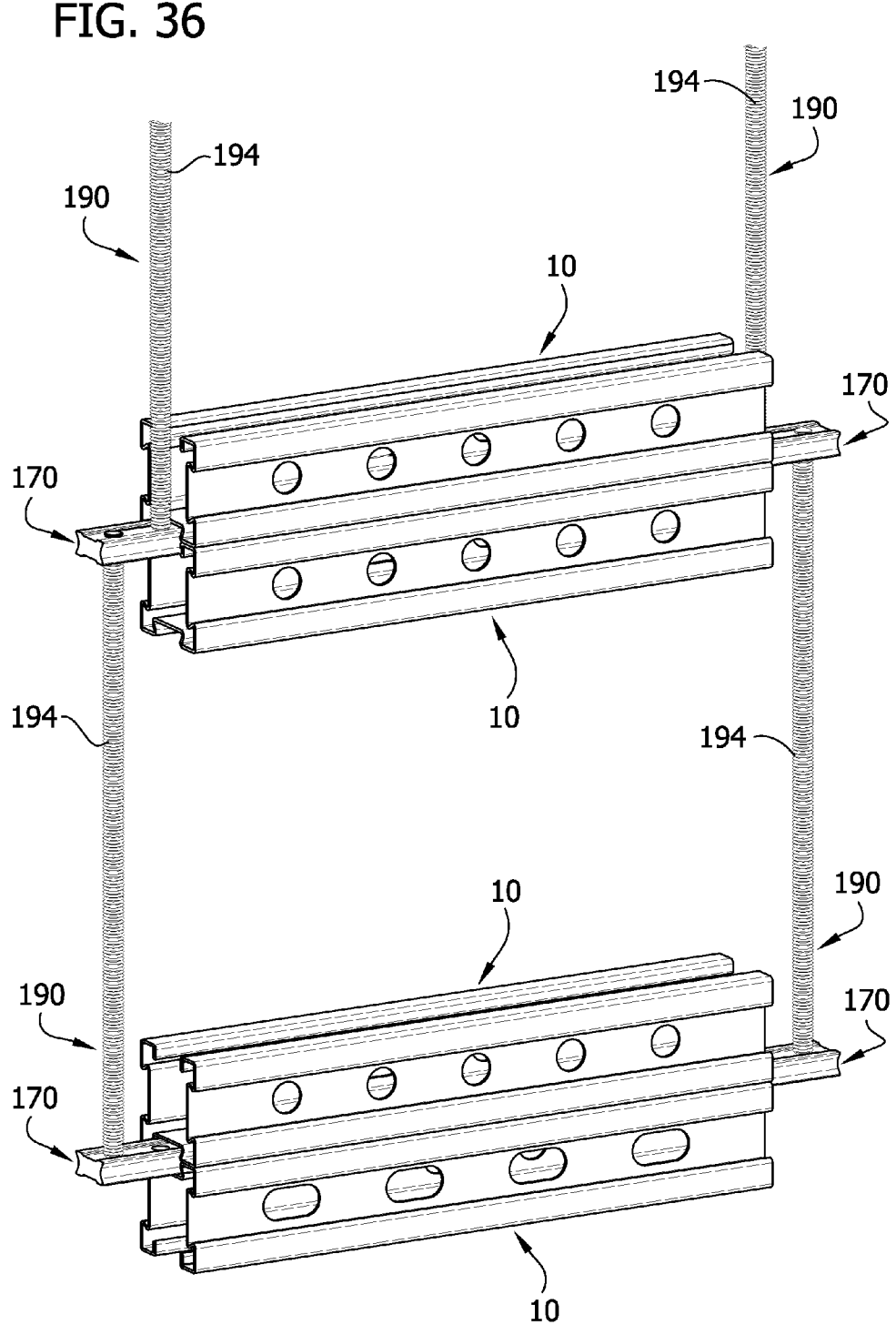
FIG. 36 is an assembly of two rod hanger assemblies of FIG. 32, with a lower rod hanger assembly depending from an upper rod hanger assembly and each rod hanger assembly includes two pieces of channel framing secured thereto.
Figure 37:
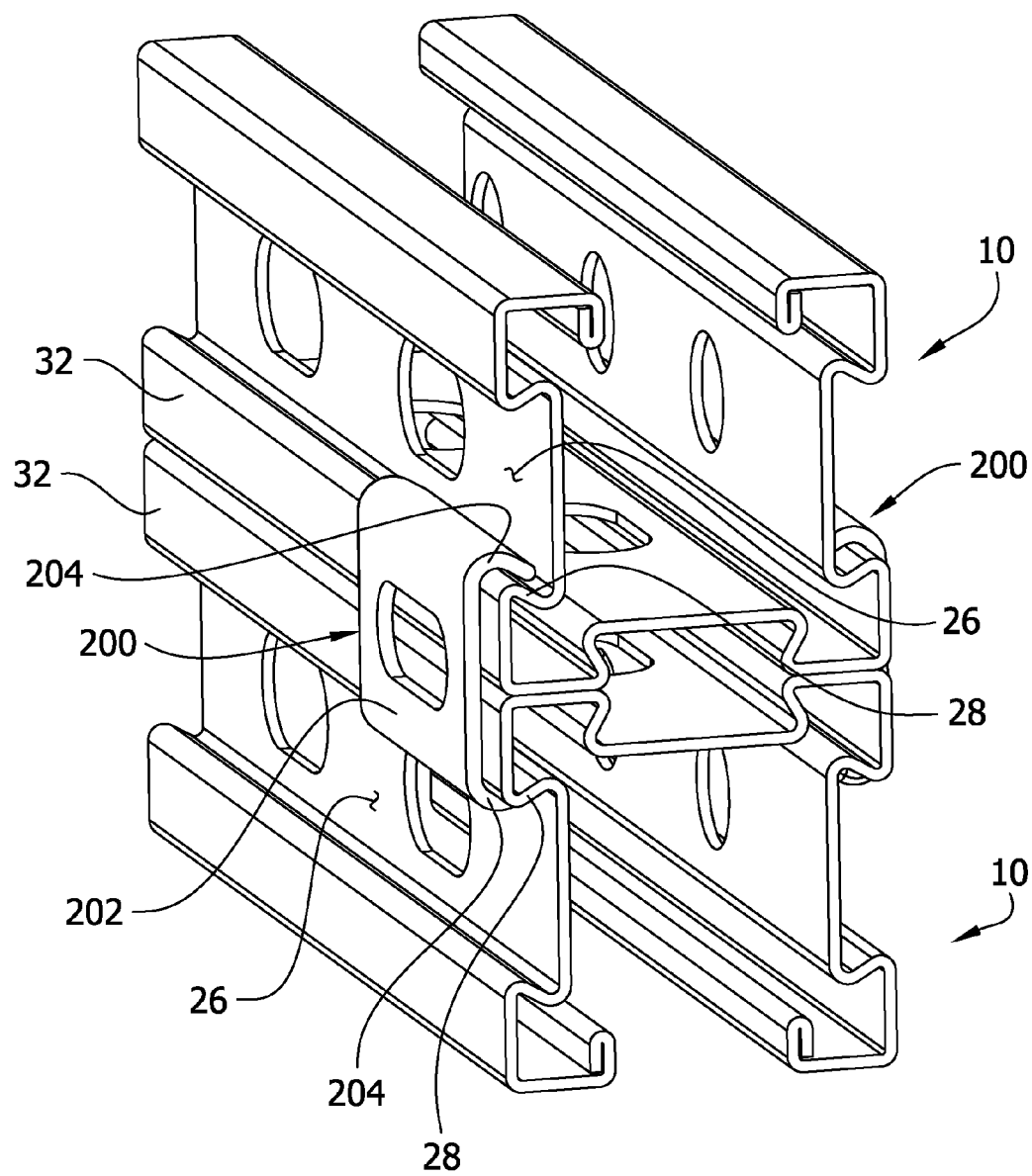
FIG. 37 is a perspective of two pieces of channel framing connected to one another in a side-by-side arrangement by another embodiment of a fitting.

As can be seen in FIG. 36, another piece of channel framing 10 can be connected to the coupling component(s) 170 so that two pieces of channel framing are hung from the rod hanger assemblies 190. Further, additional rod hanger assemblies 190 can depend from the first rod hanger assemblies by threading the rods 194 of the additional rod hanger assemblies into the available threaded openings 180 in the coupling components 170. As a result, additional pieces of channel framing 10 can be positioned within the same vertical plane, as seen in FIG. 36.

Figure 38:
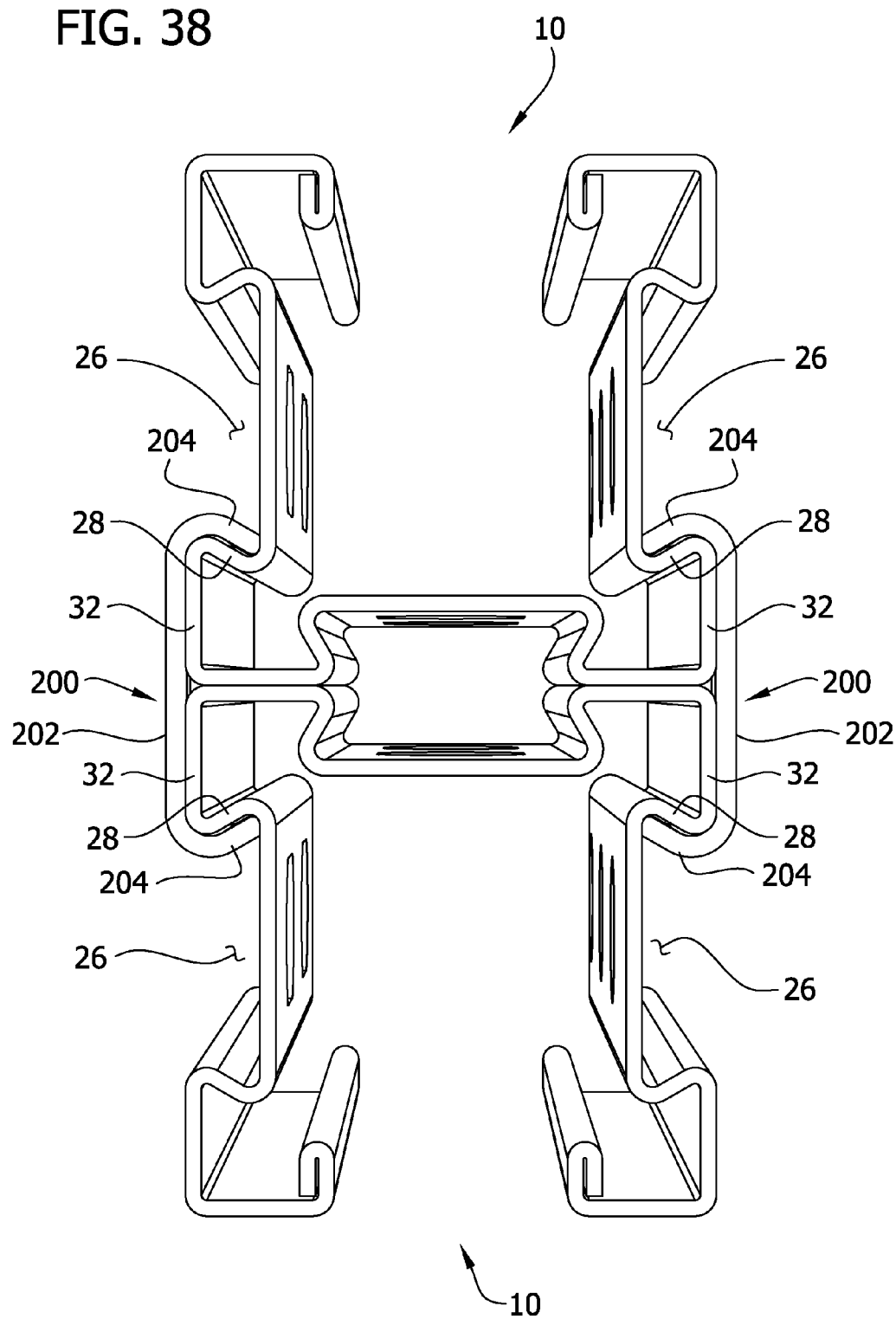
FIG. 38 is a front elevational view of FIG. 37.
Figure 39:
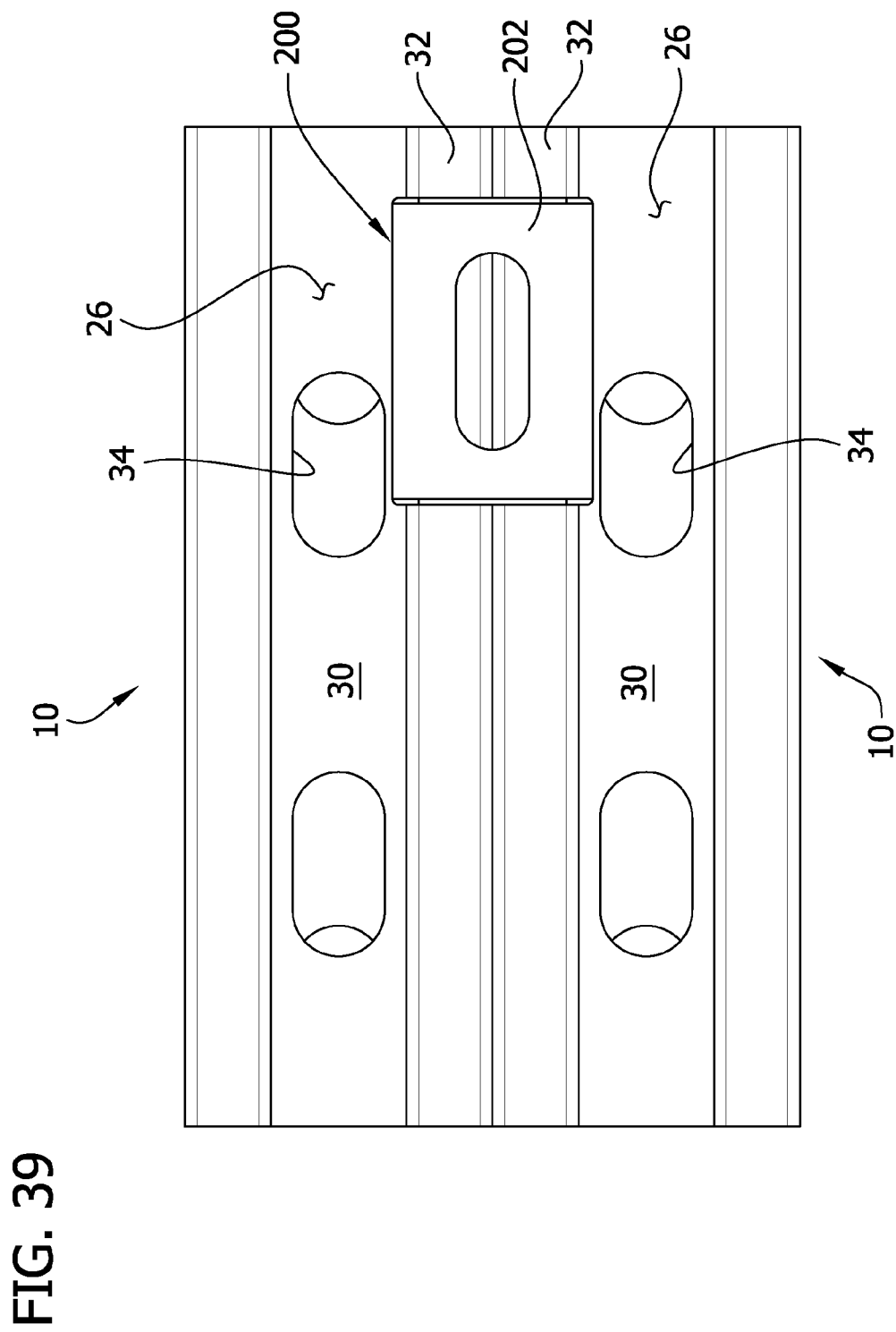
FIG. 39 is a left elevational view of FIG. 37.
Figure 40:
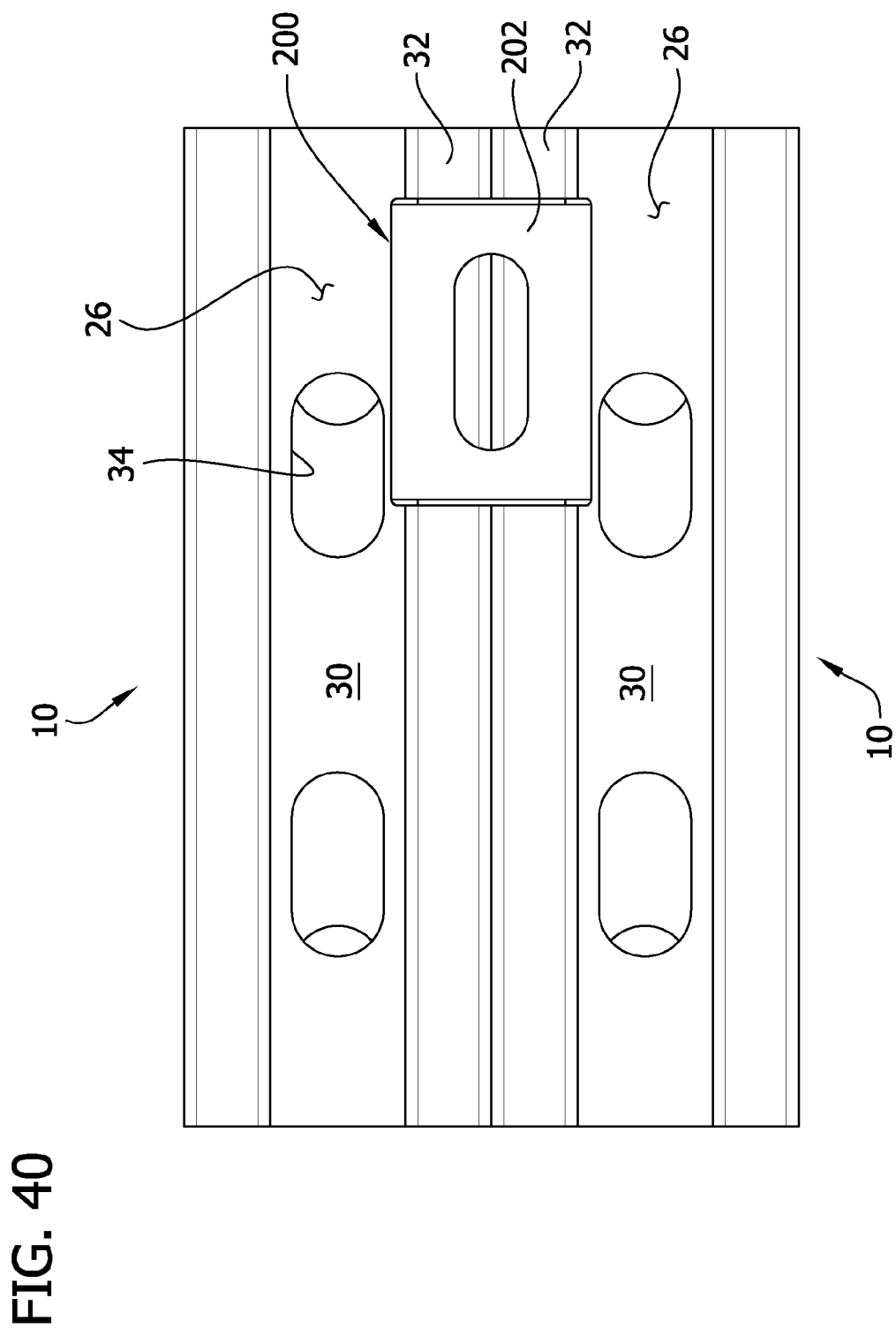
FIG. 40 is a right elevational view of FIG. 37.
Figure 41:
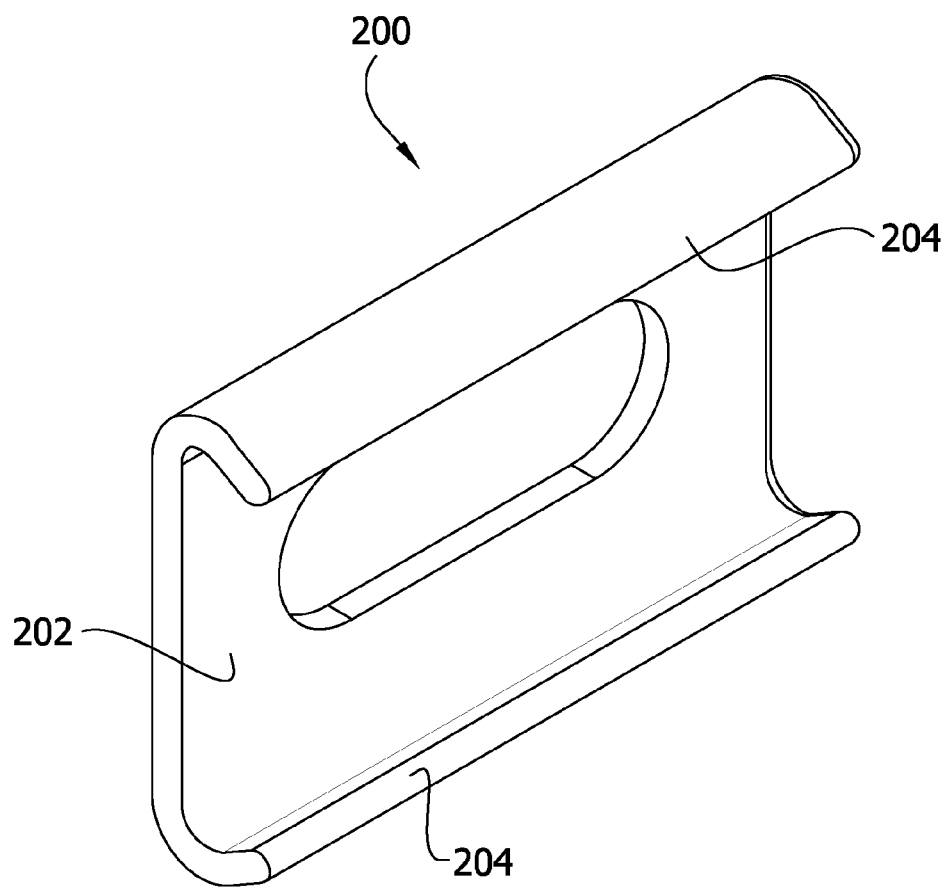
FIG. 41 is an enlarged perspective of the fitting of FIG. 37.

Another embodiment of a fitting for use with the channel framing 10 is generally indicated at reference numeral 200 in FIGS. 37-41. The fitting 200 is generally in the form of a clip that is adapted to connect two pieces of channel framing 10 to one another in a side-by-side arrangement. The illustrated embodiment comprises two fittings 200 on opposite sides (e.g., right and left sides 16, 18) of the respective pieces of framing 10. As seen in FIG. 41, each fitting 200 comprises an elongate body having a central portion 202, and two clip arms or jaws 204 (broadly, coupling components) extending outward from opposite sides of the body. The clip arms 204 are configured to engage respective flared side walls 28 of adjacent fitting grooves 26 of the two pieces of channel framing 10, as seen in FIG. 38. In particular, the clip arms 204 clip or hook into the adjacent fitting grooves 26 of the two adjacent framings 10 and the central portion 202 spans across the corresponding outside surfaces 32 of the framings between the adjacent fitting grooves to hold the pieces of framing 10 in the side-by-side arrangement.

In one example, the fitting 200 may be configured to slide on side-by-side pieces of framing 10 by inserting the fitting 200 into the grooves 26 at the open ends of the grooves at the ends of the framings. In another example, the fitting 200 may be resiliently deflectable and configured as a snap-fit component so the arms 204 can be snapped directly into the fitting grooves 26 at an intermediate point between the ends of the channel framings 10 without accessing either end of the framings. In another embodiment, the fitting 200 may be snapped into position on side-by-side pieces of framing 10 at an intermediate point between the ends thereof by inserting one of the clip arms 204 into one of the fitting grooves 26. A force in the direction of outside surfaces 32 of the side-by-side pieces of framing 10 is then applied to central portion 202, whereupon the free clip arm 204 and the central portion are resiliently deflected in a direction away from the outside surfaces of the pieces of framing. A continued application of force results in the free clip arm 204 sliding past the edge between the corresponding outside surface 32 and the flared side wall 28 defining the fitting groove 26, whereupon the fitting 200 rebounds to its non-deflected configuration, and the corresponding clip arm 204 snaps into the fitting groove. The fitting 200 may be formed from metal, such as steel, spring steel, or aluminum, or from other materials.

Figure 47:
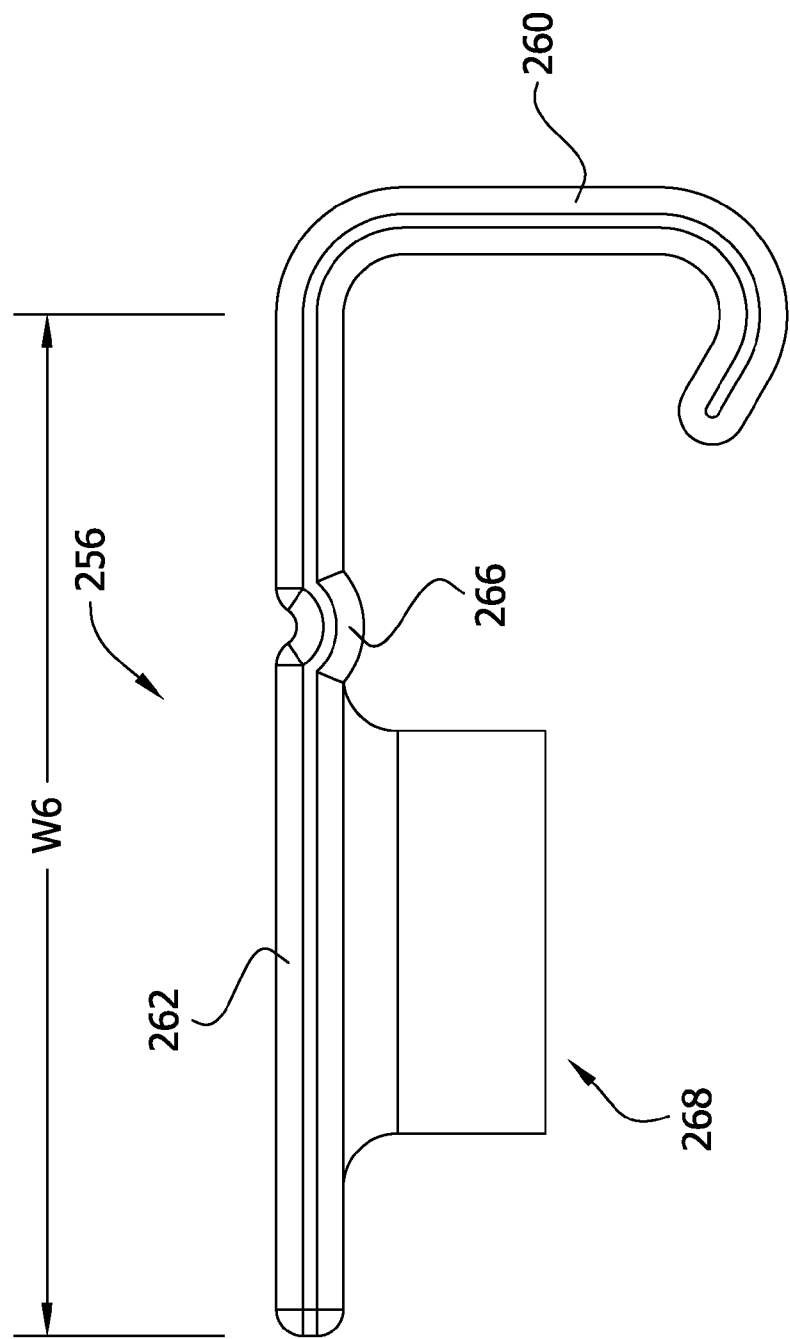
FIG. 47 is a front elevational view of the lower (or inner) component of the FIG. 46.
Figure 48:
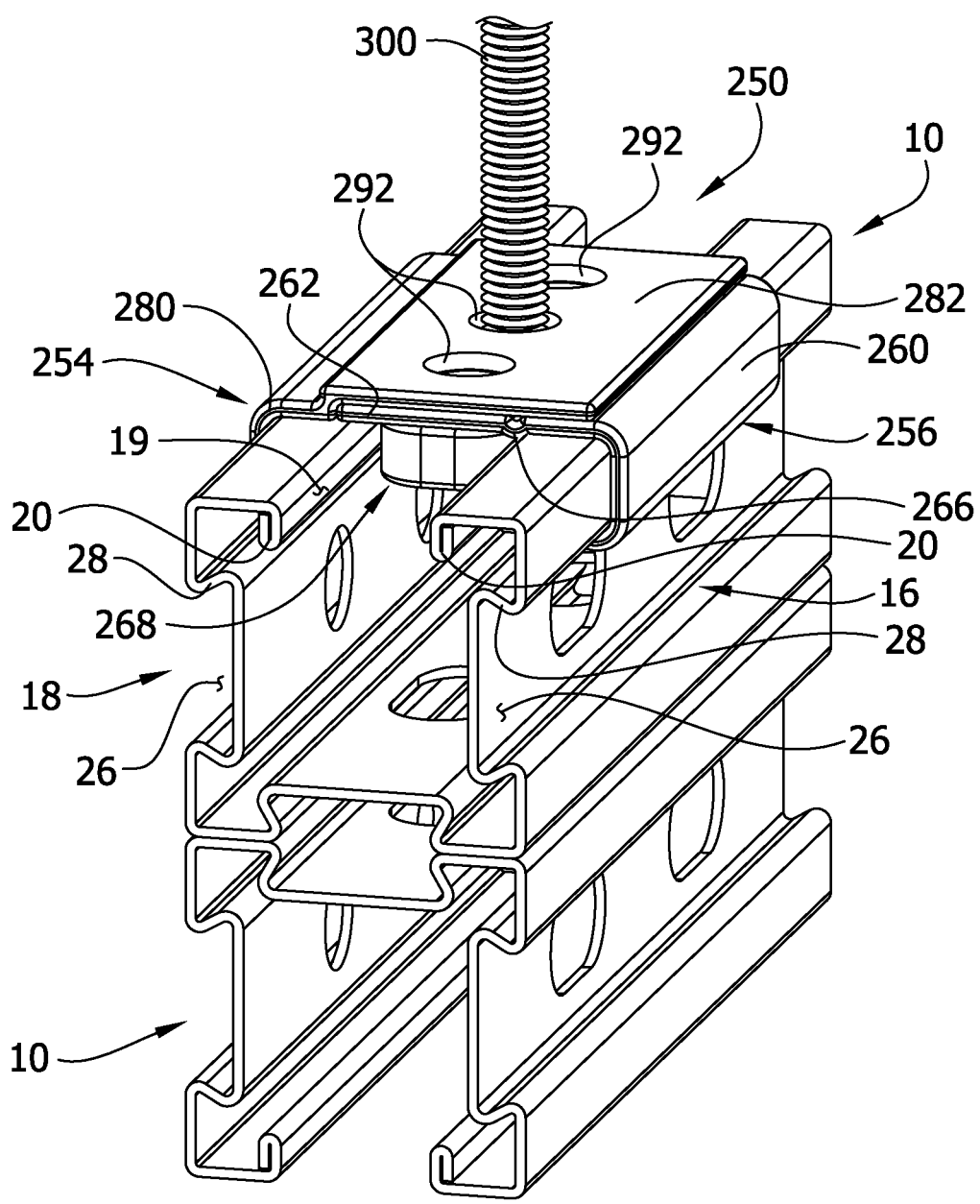
FIG. 48 is a right side perspective of two pieces of channel framing connected to one another in a side-by-side arrangement by the fitting of FIG. 42.
Figure 49:
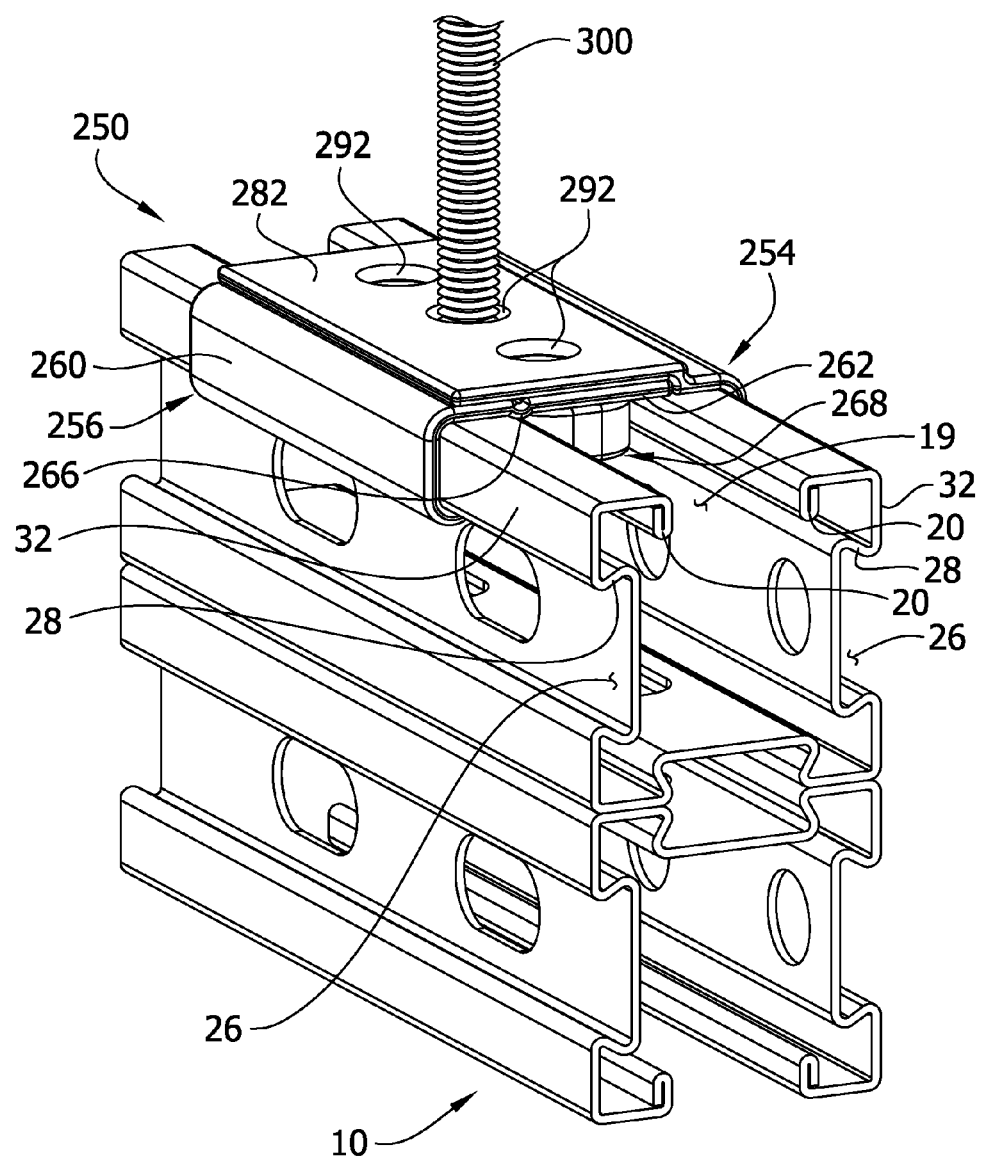
FIG. 49 is a left side perspective of two pieces of channel framing connected to one another in a side-by-side arrangement by the fitting of FIG. 42.

Referring to FIGS. 42-49, another embodiment of a fitting for the channel framing 10 is generally indicated at reference numeral 250. As shown in FIGS. 48-49, the fitting 250 is configured for securement to the side 12 of the framing 10 defining the continuous slot 19 so that the fitting spans across the slot. As explained in more detail below, the fitting 250 may be used to add rigidity to the framing 10 and/or to provide additional fastening members for securing components to the slot side 12 of the framing.

Figure 42:
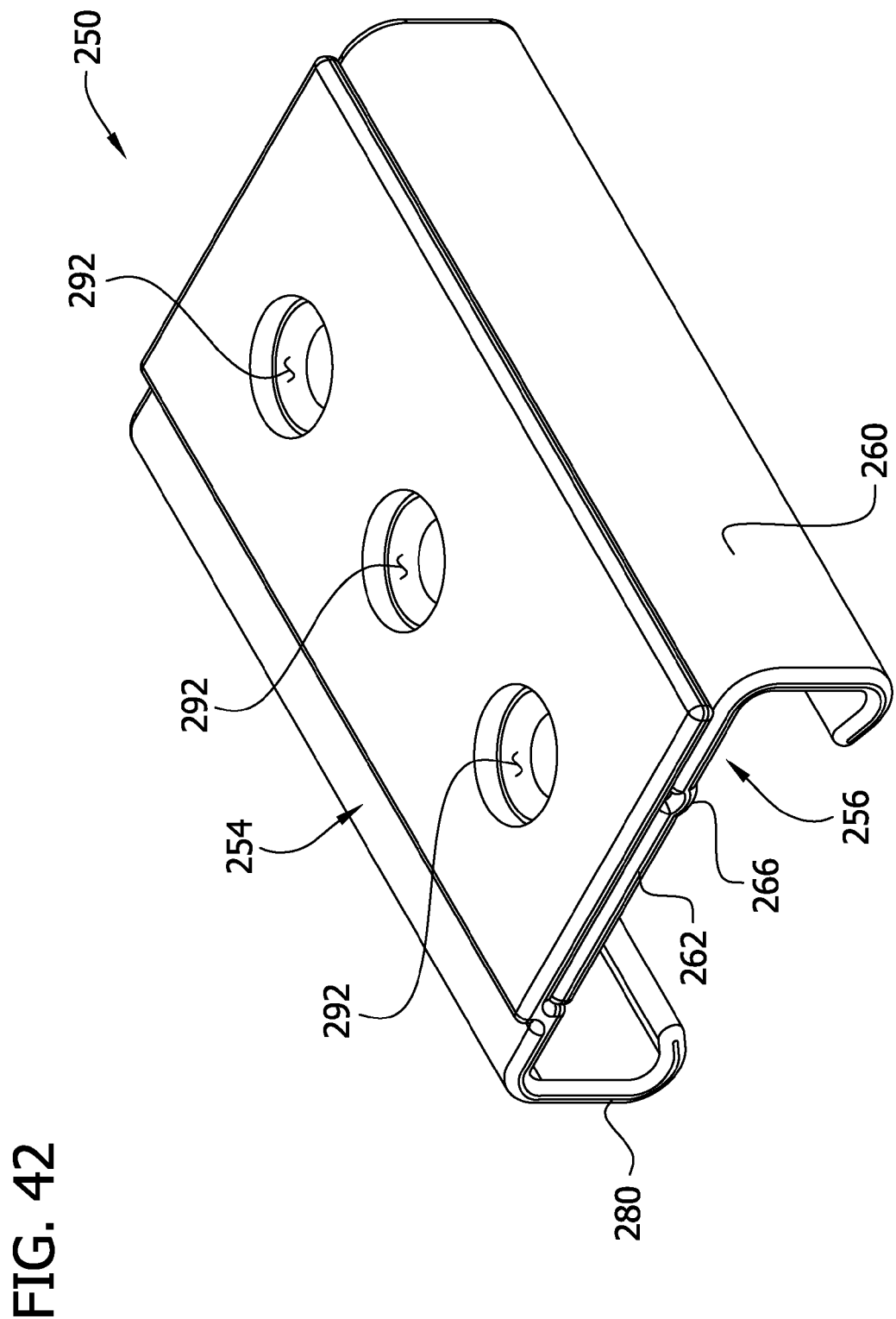
FIG. 42 is a perspective of another embodiment of a fitting for use with the channel framing.
Figure 43:
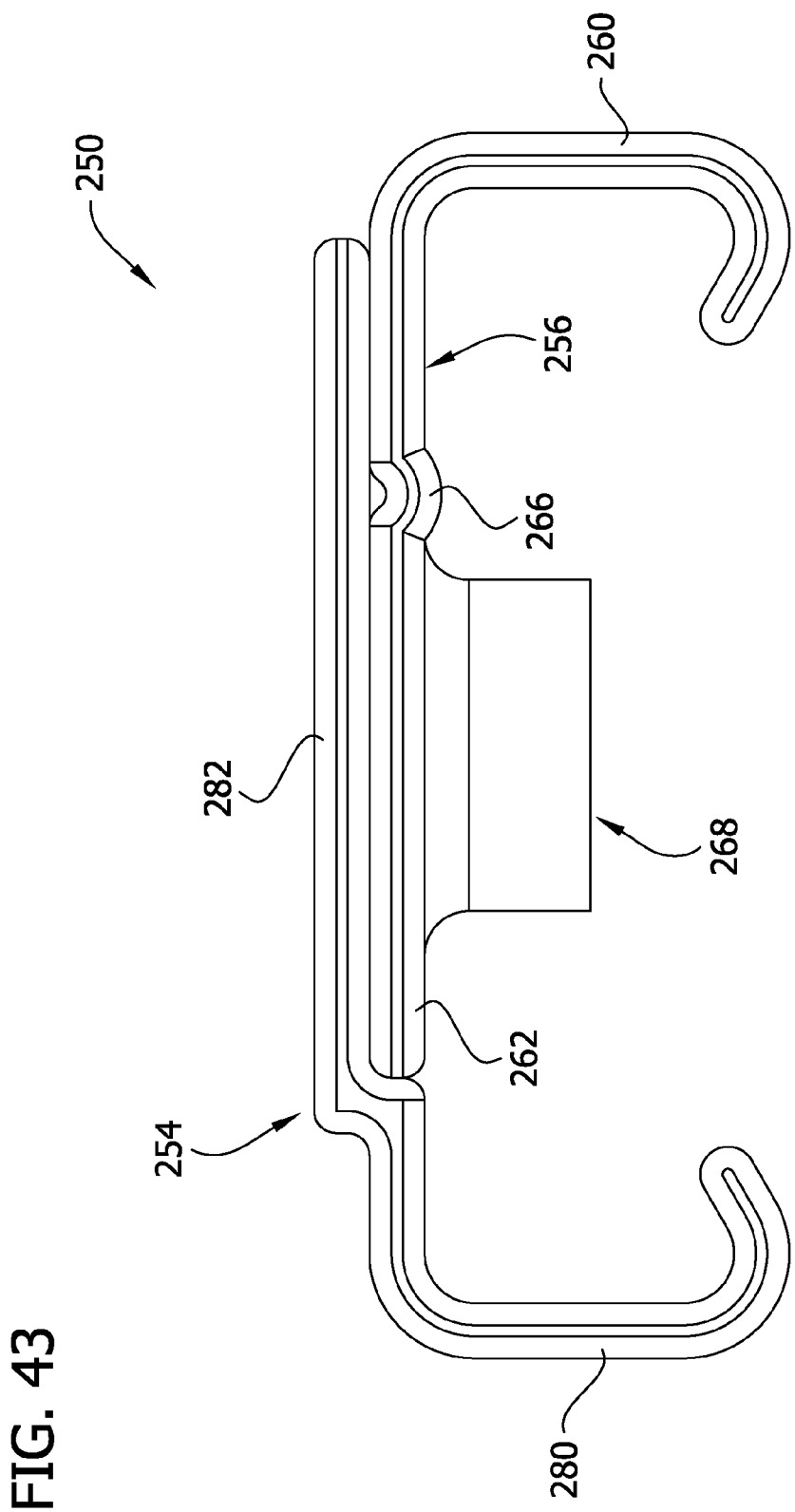
FIG. 43 is a front elevational view of the fitting of FIG. 42.

Referring to FIGS. 42 and 43, the fitting 250 comprises separate upper (or outer) and lower (or inner) components, generally indicated at 254, 256, respectively, each of which is configured for attachment (e.g., snap-fit attachment) to one of the right and left sides 16, 18 of the framing 10 and for spanning across the slot 19. Referring to FIGS. 47 and 48, the lower component 256 includes a clip arm or jaw 260 (broadly, a coupling component) for attachment within the groove 26 of one of the right and left sides 16, 18 of the framing 10, and an extension member 262 extending outward from the clip arm for spanning at least part of the way across the slot 19. The clip arm 260 is configured to engage or hook around the outer surface 32 into the fitting groove 26 (e.g., adjacent one of the flared side walls 28) on one side (e.g., side 16 as illustrated), as seen in FIG. 48, and extend from the fitting groove along the corresponding outer surface 32 toward the slotted side 12 of the channel framing 10. The extension member 262 has a width W6 (FIG. 47) sufficient to span at least part way across the slot 19 of the side 12. As illustrated, for instance, the width W6 is sufficient to span all the way across the slot 19. The illustrated extension member 262 has a rib 266 extending lengthwise that is adapted for reception in the slot 19 generally adjacent one of the lips 20 of the side 12 adjacent the clip arm 260 to inhibit disengagement of the clip arm 260 from the channel framing 10. In addition, in the illustrated embodiment the lower component 256 includes a fastening member, generally indicated at 268 (e.g., one or more nuts), on an inner face (i.e., a side facing the channel framing 10) of the extension member 262. The one or more fastening members 268 are aligned with openings 270 extending through the extension member 262. The fastening member 268 may be formed integrally with the lower component 256, or as a separate component. The one or more fastening members 268 extend into the slot 19 of the side 12 when the fitting 250 is secured to the framing 10.

Figure 44:
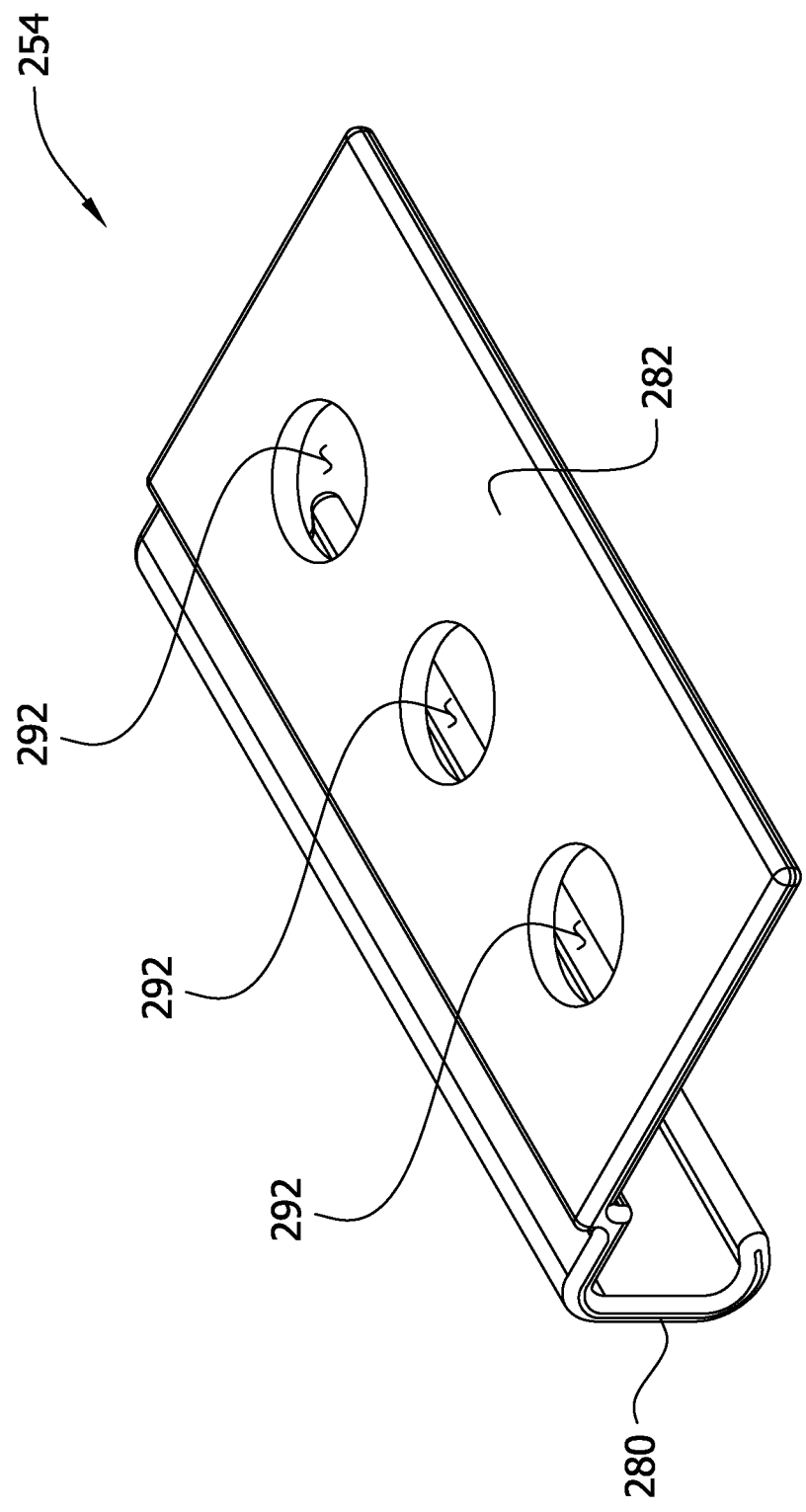
FIG. 44 is a perspective of an upper (or outer) component of the fitting of FIG. 42.
Figure 45:
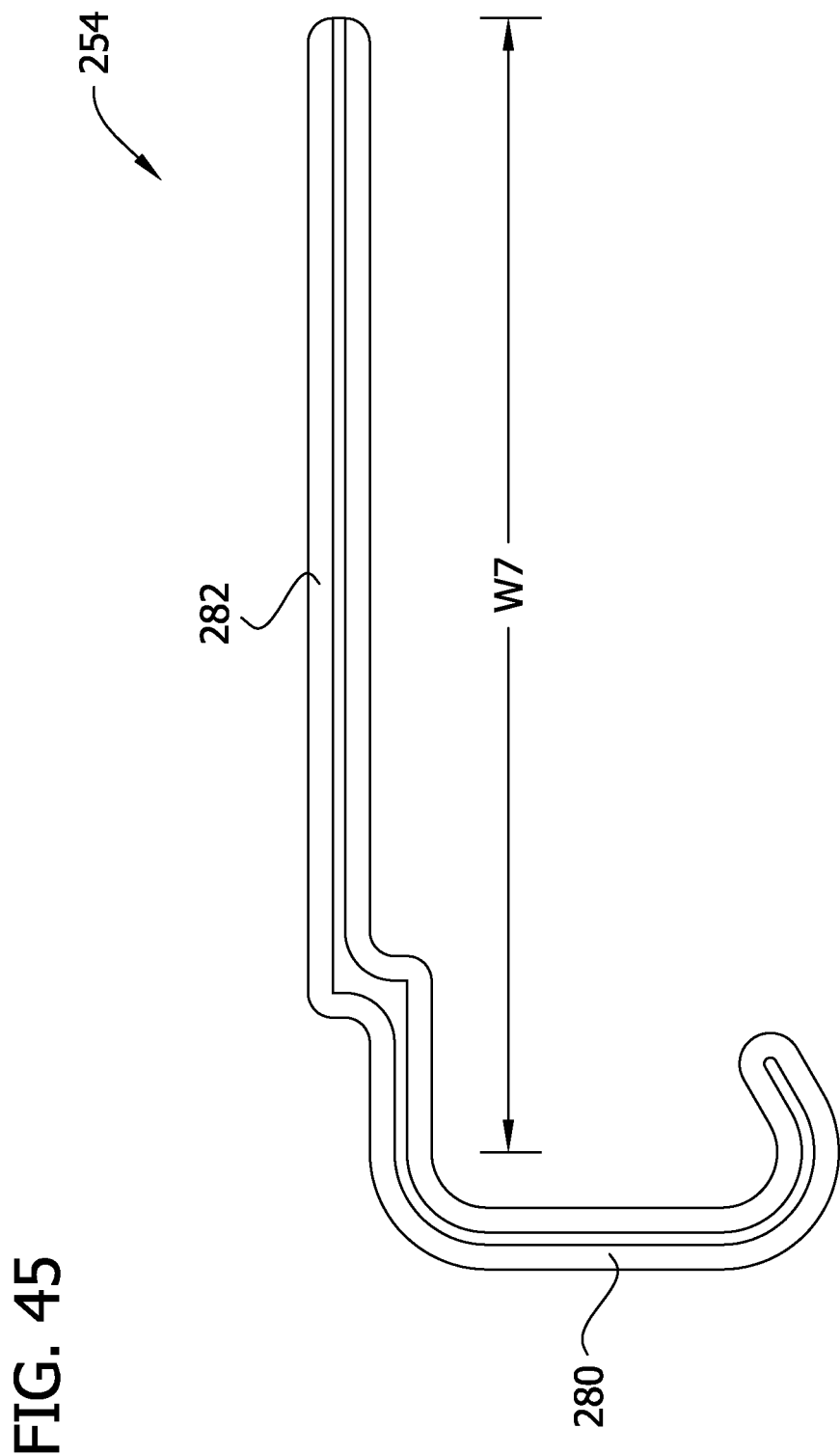
FIG. 45 is a front elevational view of the upper (or outer) component of FIG. 44.
Figure 46:
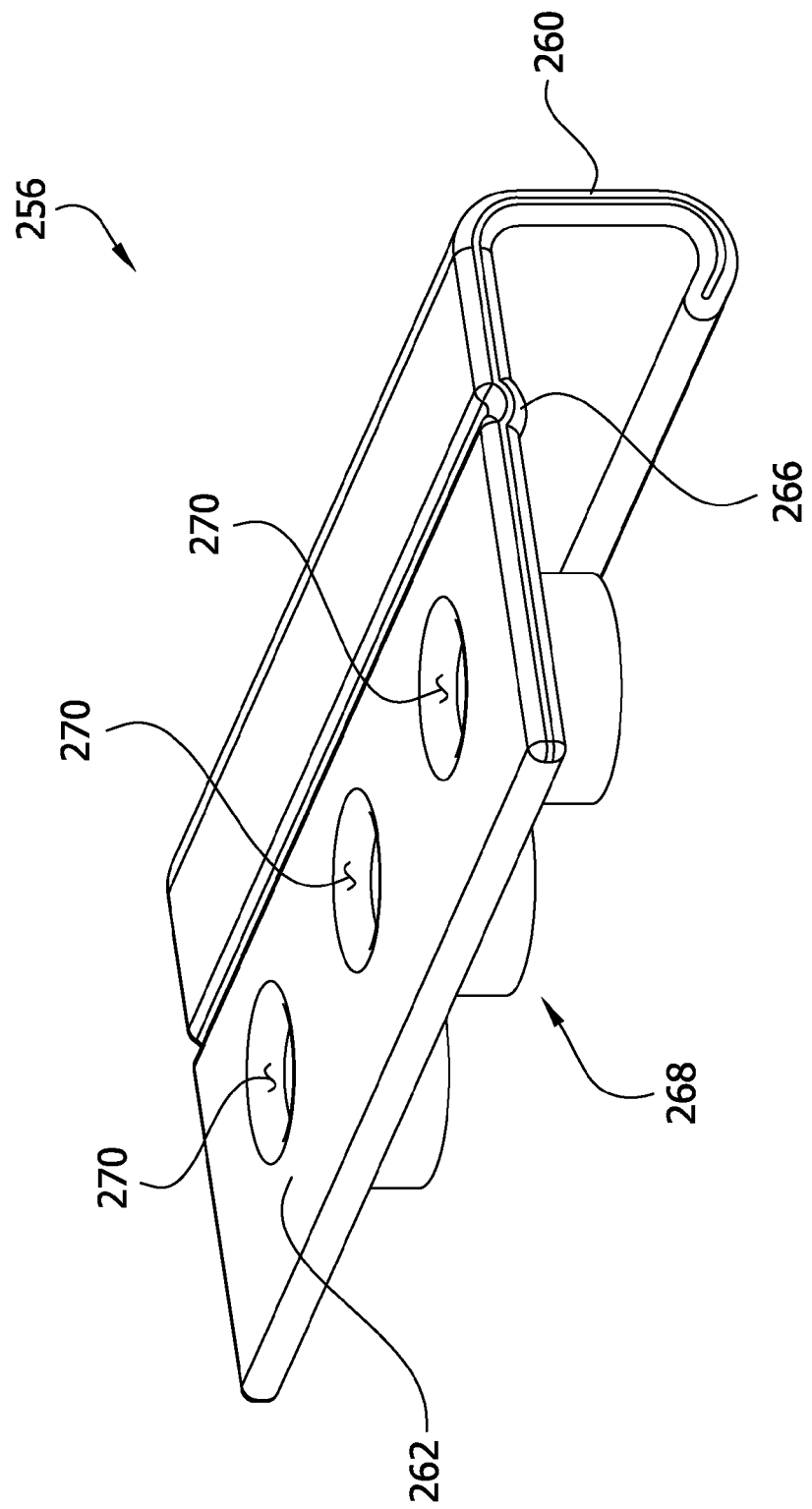
FIG. 46 is a perspective of a lower (or inner) component of the fitting of FIG. 42.

Referring to FIGS. 44 and 45, the upper component 254 includes a clip arm or jaw 280 (broadly, a coupling component) for attachment within the groove 26 of one of the right and left sides 16, 18 of the framing 10, and an extension member 282 extending outward from the clip arm for spanning at least part of the way across the slot 19. The clip arm 280 is configured to engage or hook around the outer surface 32 into the corresponding fitting groove 26 (e.g., adjacent the one of the flared side walls 28), as seen in FIG. 49, and extend from the fitting groove along the corresponding outside surface 32 of the side (e.g., the left side 18) toward the slotted side 12 of the channel frame 10. The extension member 282 has a width W7 sufficient to span across the slot 19 of the side 12. For instance, in the illustrated embodiment, the width W7 is sufficient to span all the way across the slot 19. The extension member 282 is stepped outwardly from the clip arm 280 (e.g., the extension member has a stepped portion) to allow nesting of the extension members 262, 282 of the lower and upper components 256, 254, respectively, over the slot 19. As a result, the upper and lower members 282, 262 of the lower and upper components 256, 254, respectively, define a generally planar inner surface, generally indicated at 290, of the fitting 250 that lies generally flat on the outer surfaces 13 of the slotted side 12. The extension member 282 defines at least one opening 292. When the fitting 250 is assembled on the framing 10, the at least one opening 292 is aligned generally with the one or more openings 270 and the one or more fastening members 268 of the lower component 256.

The upper and lower components 254, 256 of the fitting 250 may be formed from metal, such as spring steel, or other metals, or from other material. The components 254, 256 may be cold formed using a rolling mill or may be formed in other ways. For example, the strut channel 10 may be rolled from 12 gauge (2.6 mm), or 14 gauge (1.9 mm), or 16 gauge (1.5 mm) sheet metal.

In one embodiment, the fitting 250 is installed on the framing 10 by snap-fitting the upper and lower components 254, 256 on respective sides 16, 18. In one example, the lower component 256 is first snap-fitted or clipped on the side 16 by inserting the clip arm 260 into the fitting groove 26 so that the clip arm engages the flared side wall 28 adjacent the side 12. With the clip arm 260 hooked on the flared side wall 28, the extension member 262 is moved (i.e., pivoted) toward the slot 19 of the side 12, whereupon the clip arm 260 deflects and then rebounds (e.g., snaps) to its non-deflected configuration after the clip arm substantially clears the edge between the outside surface of the side 12 and the outside surface 32 of the side 16. After the lower component 254 is installed, the upper component 256 is installed in a similar manner by hooking the clip arm 280 on the flared side wall 28 of the left side 18 and then moving (i.e., pivoting) the extension member 282 toward the slot 19 of the side 12, whereupon the clip arm 280 deflects and then rebounds (e.g., snaps) to its non-deflected configuration after the clip arm substantially clears the edge between the outside surface of the side 12 and the outside surface 32 of the side 18. When both components 254, 256 are installed, the respective extension members 282, 262 are generally nested or stacked over the slot 19. A component, such as a rod or a bolt (not shown), can be inserted through the aligned openings 292, 270 in the components 254, 256 and threaded into the fastening member(s) 268 to secure the component to the framing 10.

Referring to FIGS. 50-55, another embodiment of a fitting for use with the channel framing 10 is generally indicated at reference numeral 300. The fitting 300 is generally in the form of a clip that is adapted to connect two pieces of channel framing 10 to one another in a side-by-side arrangement. The clip 300 is substantially identical to the clip 200 described above except as noted. The clip 300 is configured to facilitate snapping the clip into the fitting grooves 26 of each of the adjacent channel framings 10. This makes it easier to install the clip 300 without accessing the ends of the channel framings 10 and sliding the clip along the fitting grooves 26 thereof. For example, the arms 302 of the clip 300 extend inward (e.g., for extending around the edge of the surfaces 32 into the fitting grooves 26) to a lesser extent at one end 306 of the clip than the other 308. Tapered lead-ins 310 at the truncated end 306 of the clip extend progressively farther inward as they extend away from the truncated end of the clip. For example, the length L52A of the tapered lead-ins is suitably in the range of about ⅓ to about ¼ the length of the total length L52B of the arms 302, although ratios outside this range are also possible. The taper angle A53 (FIG. 53) of the tapered lead-ins is suitably in the range of 5-15 degrees (e.g., about 10 degrees).

Figure 55:
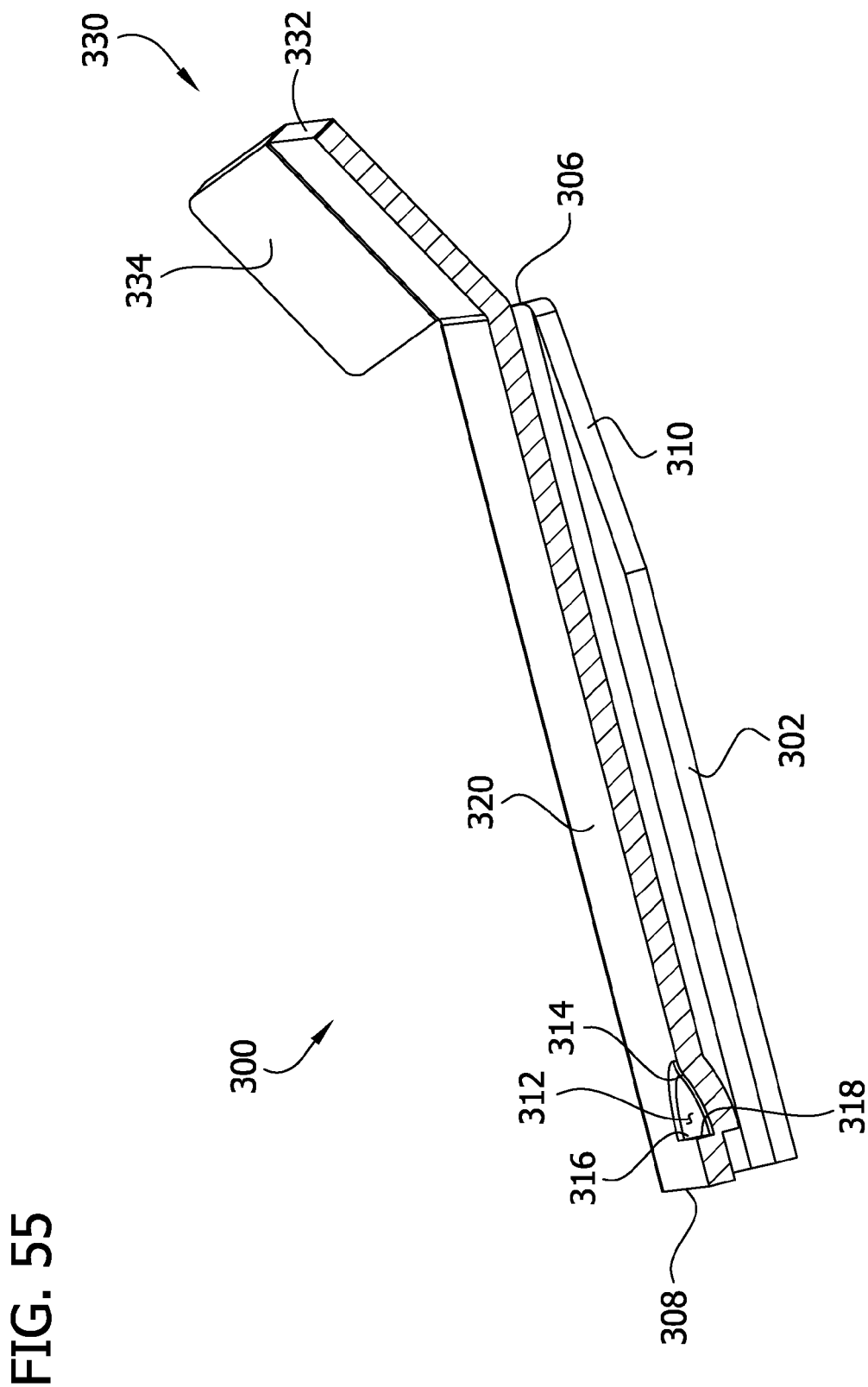
FIG. 55 is a perspective of a cross section of the fitting of FIG. 50 taken in a plane including line 55-55 on FIG. 52.
Figure 56:
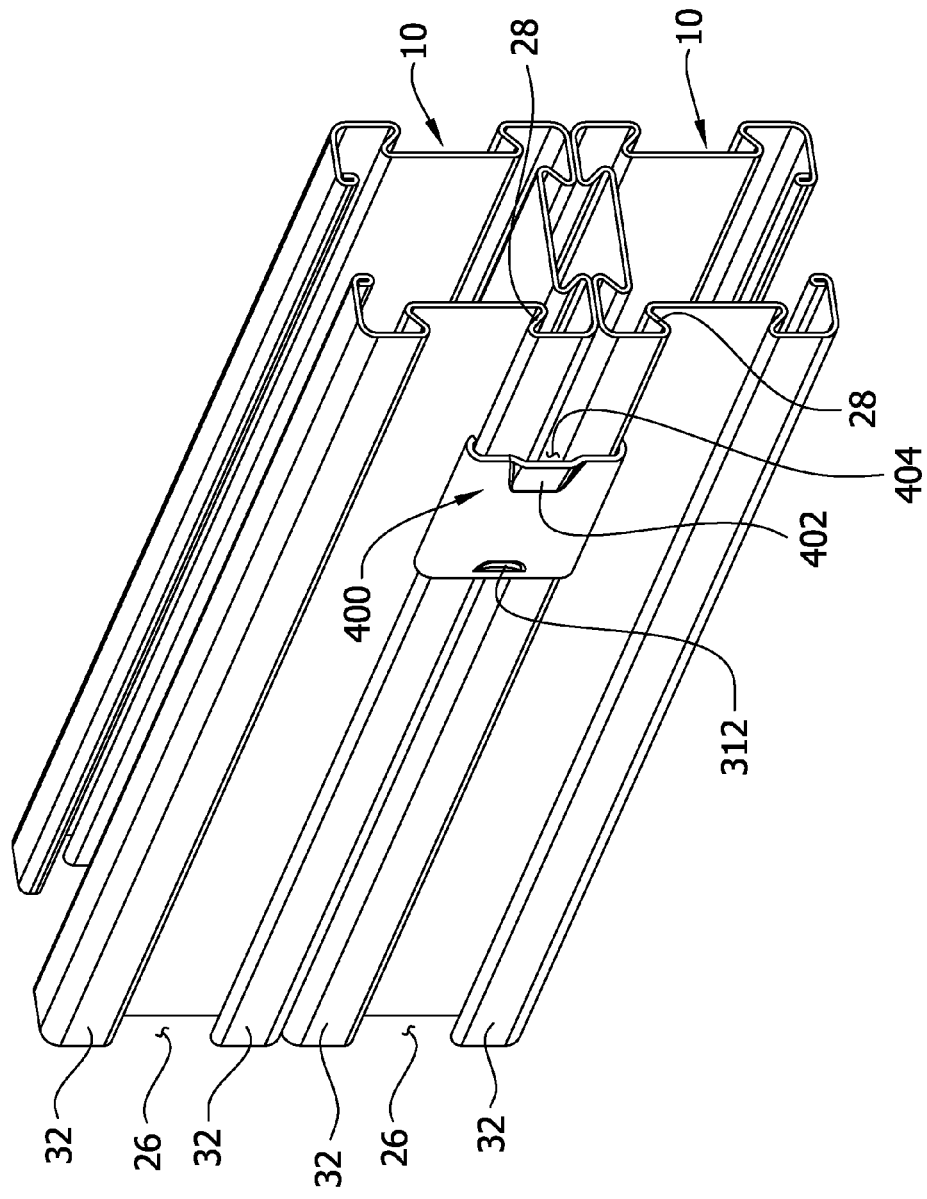
FIG. 56 is a perspective of another embodiment of a fitting holding two framing channels in side-by-side relation to one another.
Figure 57:
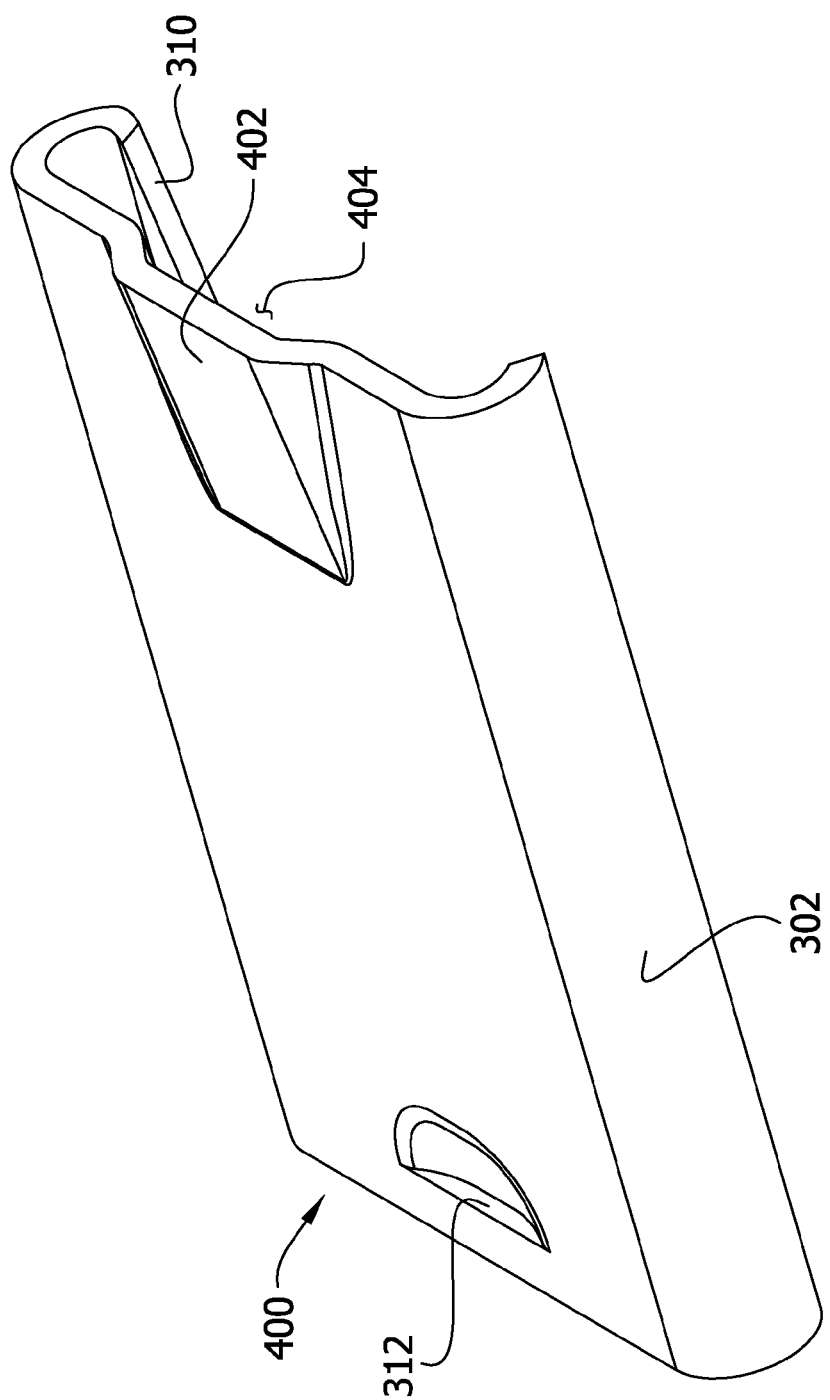
FIG. 57 is perspective of the fitting of FIG. 56.
Figure 58:
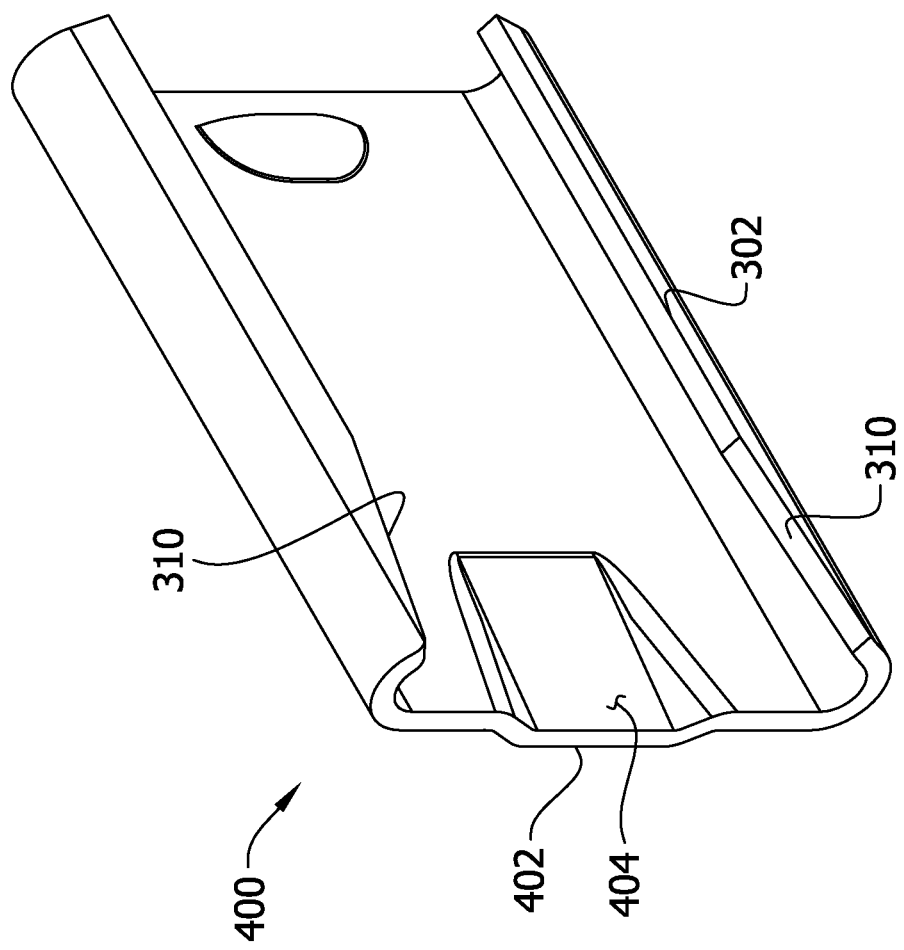
FIG. 58 is another perspective of the fitting of FIG. 56.
Figure 59:
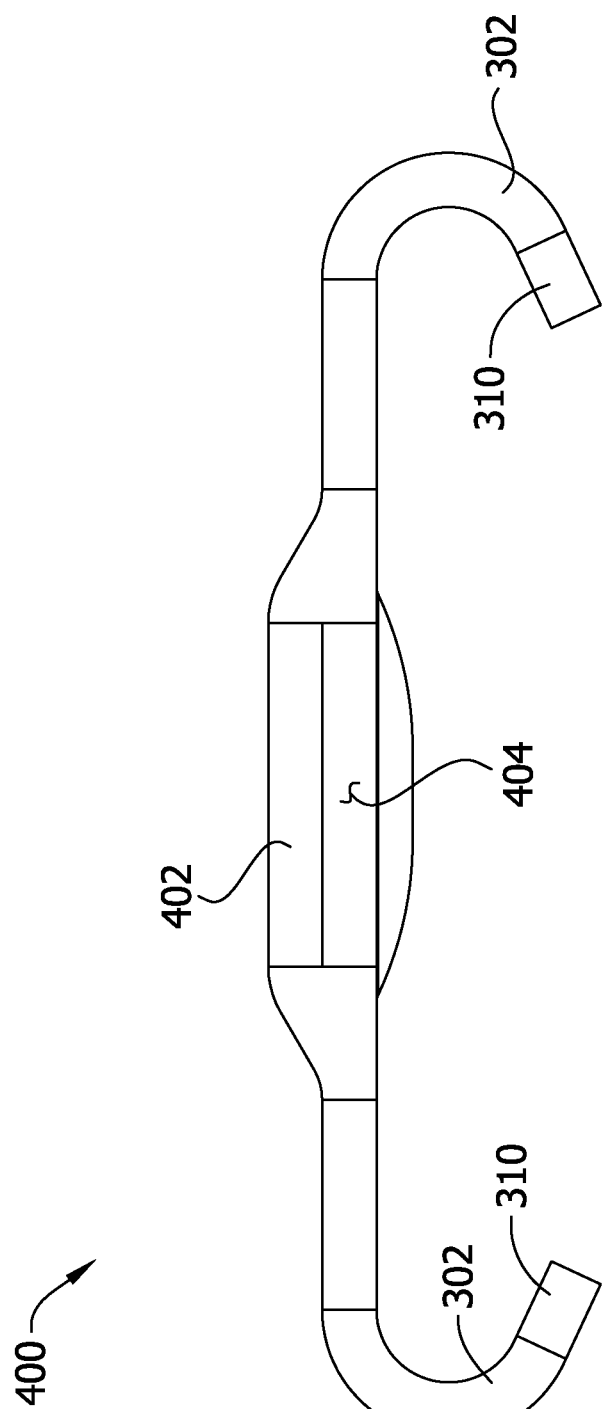
FIG. 59 is a front elevation of the fitting of FIG. 56.
Figure 60:
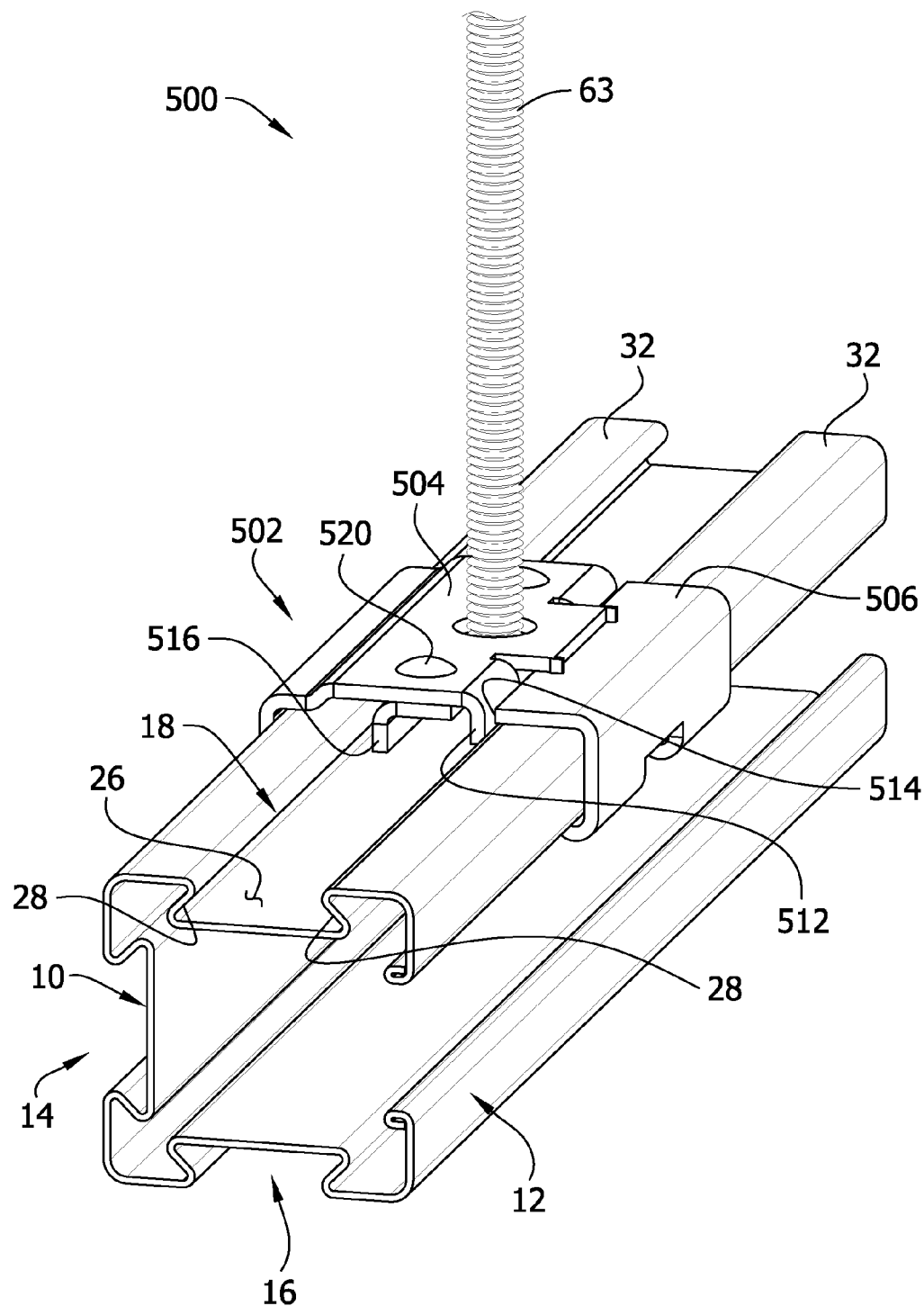
FIG. 60 is a perspective of another embodiment of a hanger assembly.
Figure 61:
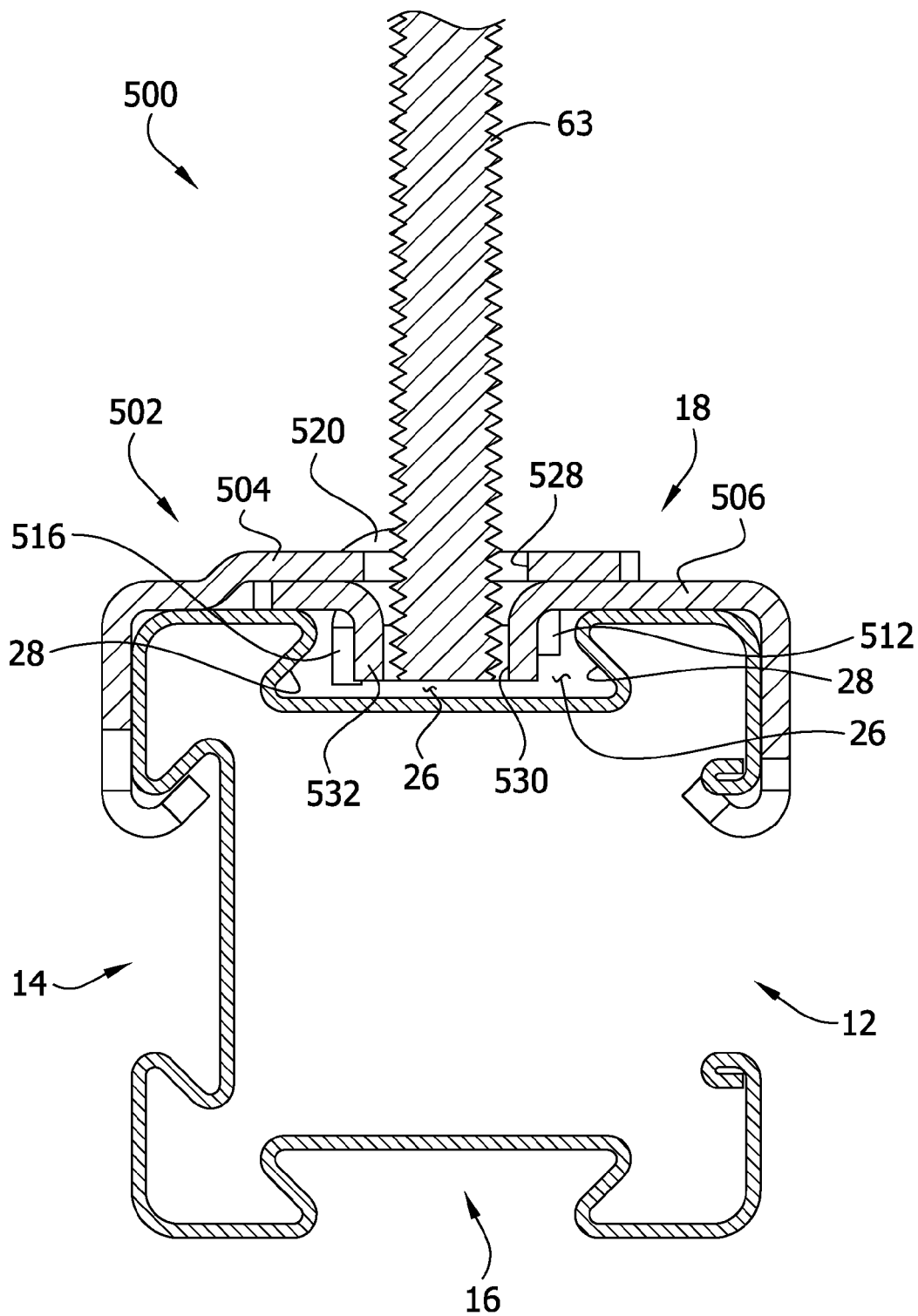
FIG. 61 is a side elevation of a cross section of the hanger assembly of FIG. 60.
Figure 62:
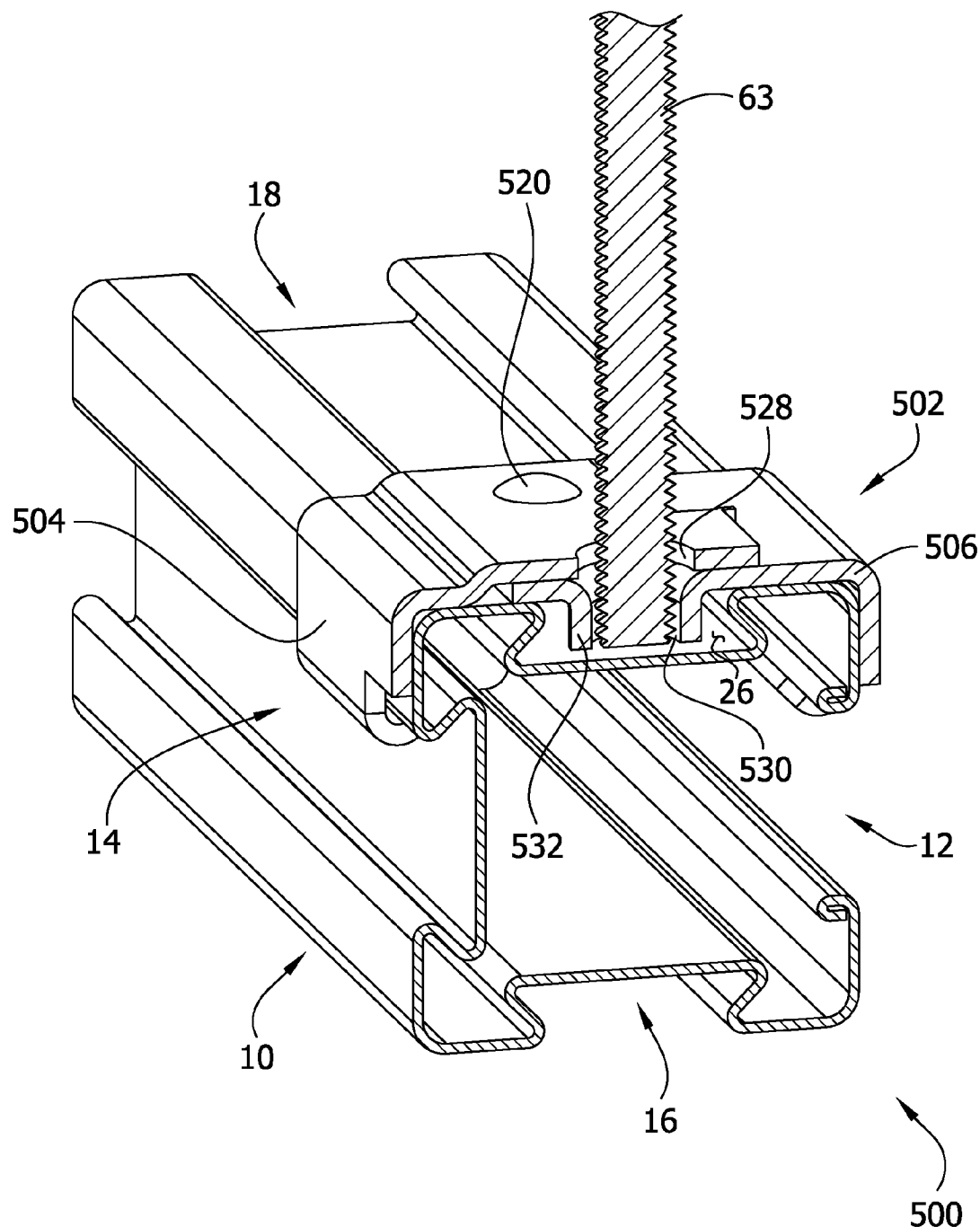
FIG. 62 is a perspective of the cross section of FIG. 61.
Figure 63:
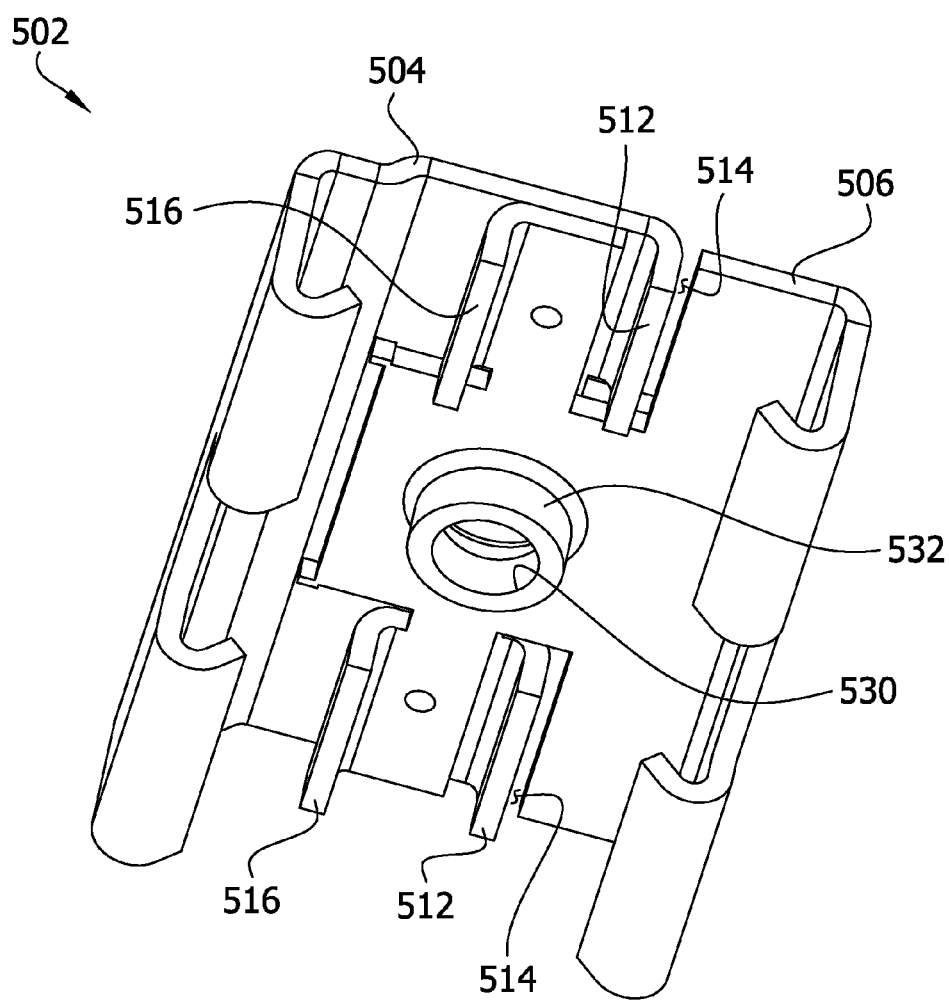
FIG. 63 is a perspective of a fitting of the hanger assembly of FIG. 60.

The clip 300 has a dimple 312 at the end of the clip opposite the tapered lead-ins. The dimple 312 is suitably sized and shaped for providing a surface 314 for catching the end of a tool, such as a flat head screwdriver. For example, as illustrated in FIG. 55, the dimple 312 has a shallow end 314 and a deep end 316. The deep end 316 is suitably closer to the end 308 of the clip 300 than the shallow end. A wall 318 at the deep end 316 of the dimple forms an abutting surface suitably for catching the tool. For example, as illustrated, the wall 318 is substantially orthogonal to the upper surface 320 of the clip 300.

Figure 51:
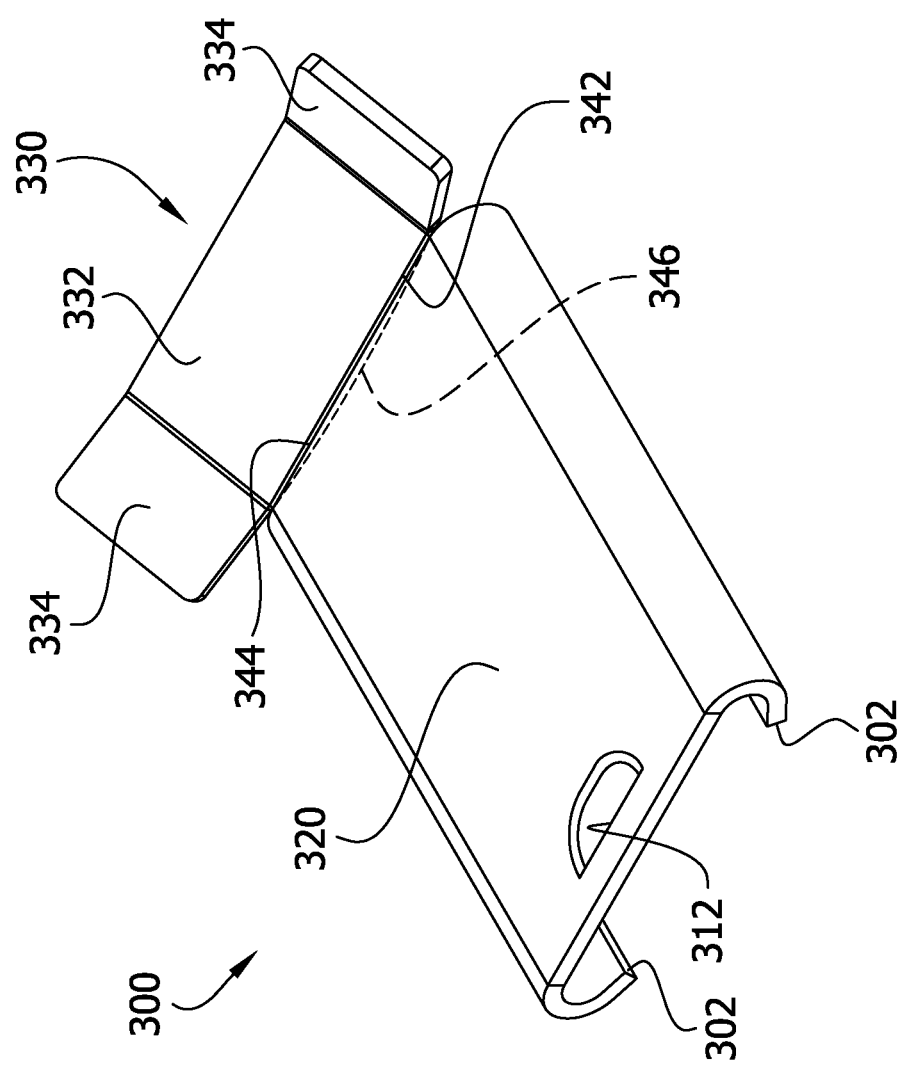
FIG. 51 is perspective of the fitting of FIG. 50.
Figure 52:
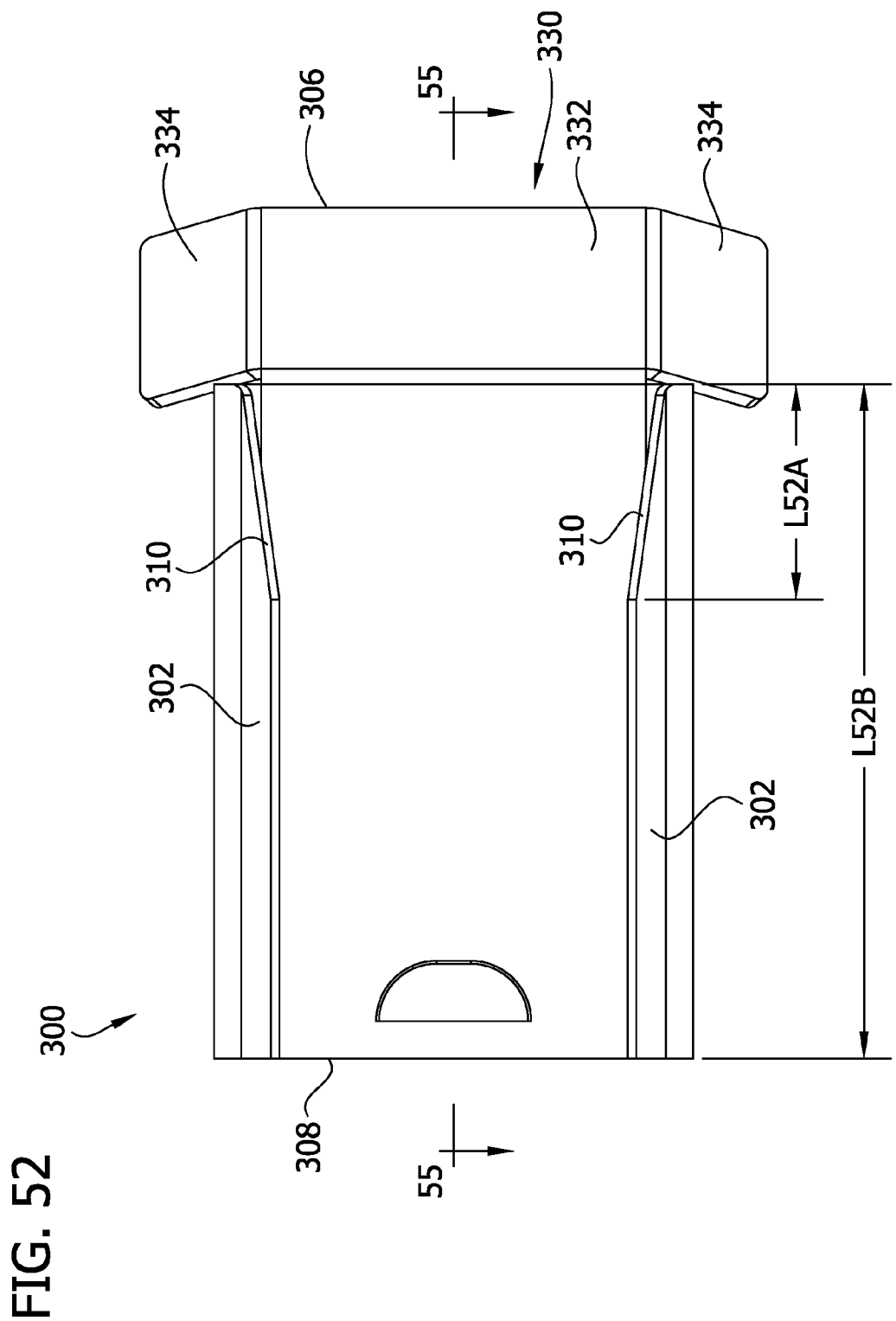
FIG. 52 is a bottom plan of the fitting of FIG. 50.
Figure 53:
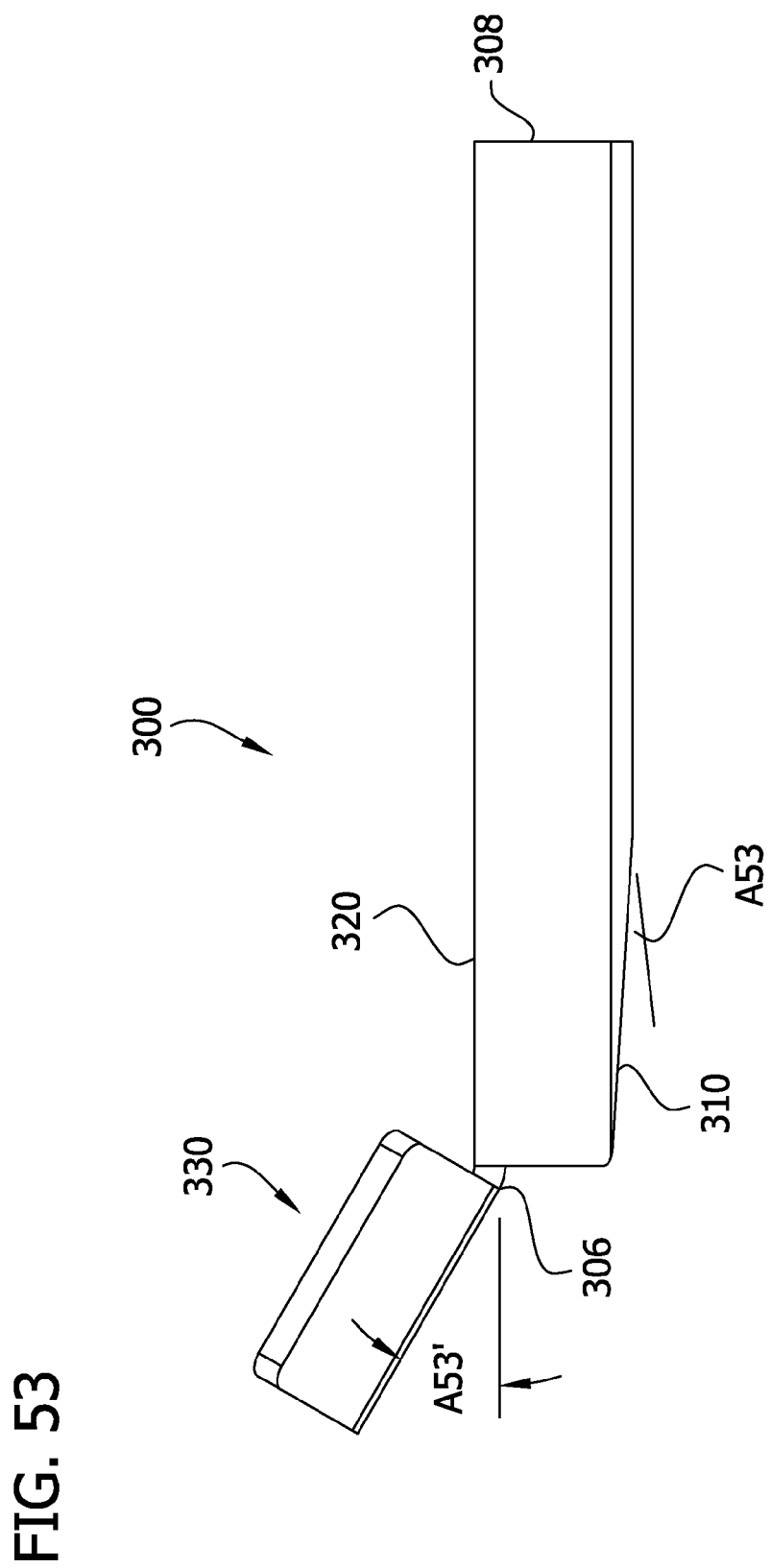
FIG. 53 is a side elevation of the fitting of FIG. 50.
Figure 54:
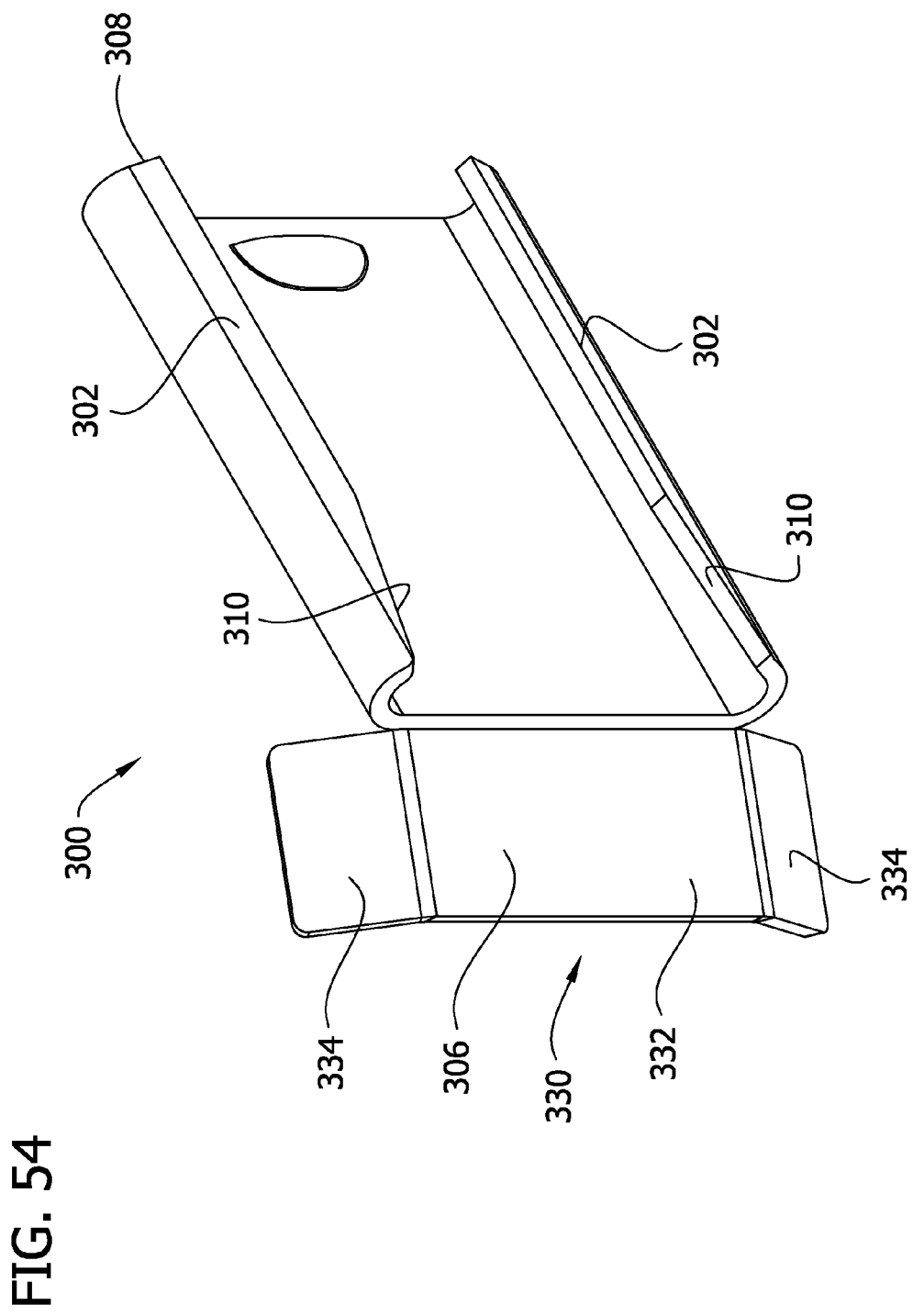
FIG. 54 is another perspective of the fitting of FIG. 50.

A handle 330 is formed at the end 306 of the clip 300 opposite the dimple 312 for manually grasping the clip to facilitate removal of the clip from the fitting grooves 26 of the channel framings 10. As illustrated in FIG. 53, the handle 330 suitably extends up from the upper surface 320 of the clip at an angle A53' (e.g., about 30 degrees). The handle 330 in the illustrated embodiment includes a pair of wings 334 on opposite sides of a central portion 332 of the handle. The width of the central handle portion 332 is suitably about equal to the width of the upper surface 320 of the clip 300 so an edge 342 of the central portion of the handle 330 is connected continuously to an edge 344 of the upper surface 320 of the clip (e.g., along a bend line 346), as illustrated in FIG. 51. The wings 334 are suitably bent back an additional amount (e.g., about 30 degrees) from the central portion 332 of the handle 330.

Figure 50:
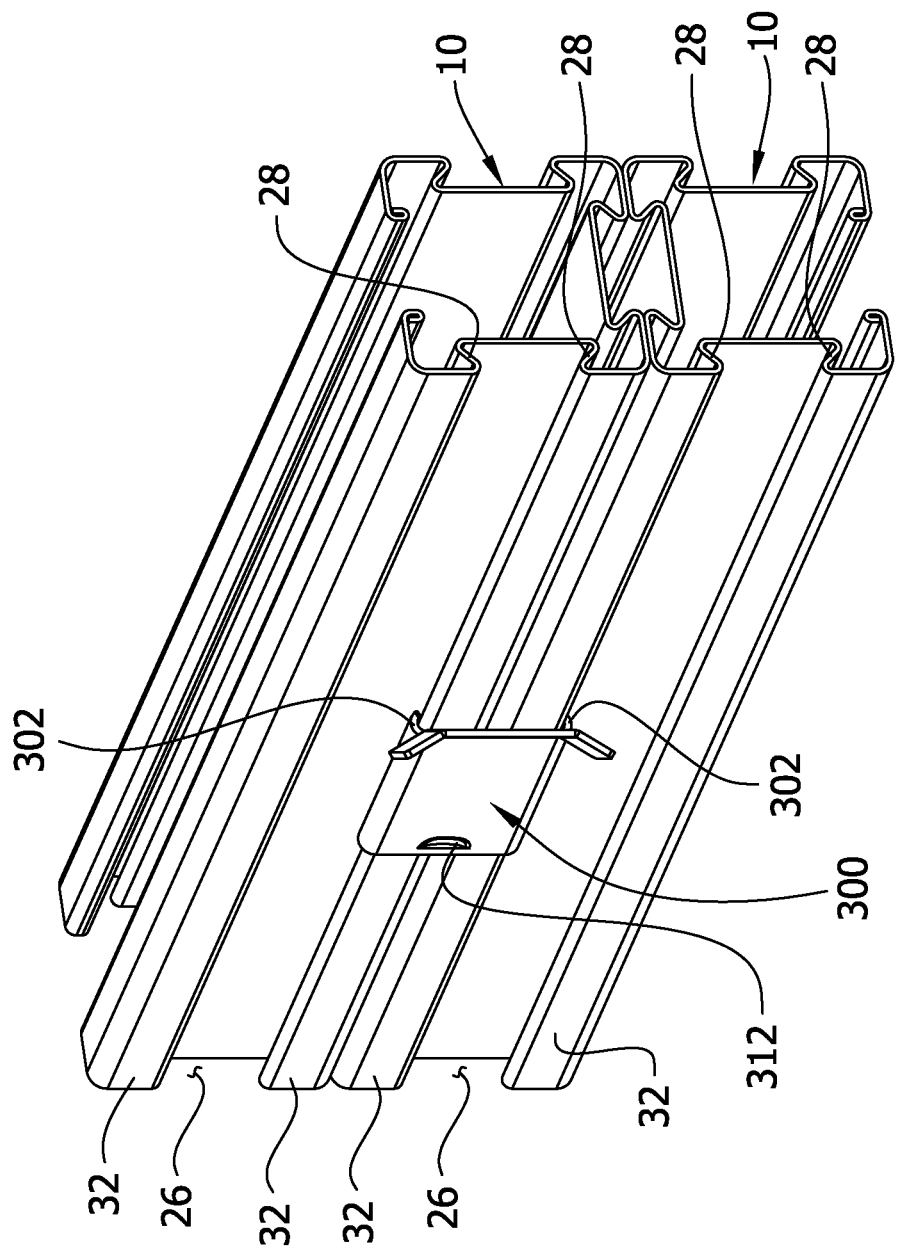
FIG. 50 is a perspective of another embodiment of a fitting holding two framing channels in side-by-side relation to one another.

To use the clip 300, a user places two channel framings 10 side-by-side as illustrated in FIG. 50. The user then uses the lead-ins 310 to position the truncated end 306 of the clip 300 over the adjacent surfaces 32 of the channel framings 10 and begins pressing the clip into the fitting grooves 26. The clip 300 is initially oriented so the end 308 of the clip having the dimple 312 thereon is spaced farther from the channel framings 10 than the lead-ins 310 so the lead-ins are the first part of the clip to engage the channel framings. As the clip 300 is progressively pressed and rotated to bring the end 308 of the clip having the dimple 312 thereon closer toward the channel framings 10 so the arms 302 of the clip extend farther into the fitting grooves 26, channel framings are drawn closer and tighter toward one another. The clip 300 is suitably designed so a significant amount of force is required to snap the clip onto the channel framings 10, and also so a significant amount of force is required to unsnap the clip to separate the channel framings. In some cases it may be desirable to use a tool (e.g., screwdriver) to help tap on the clip 300 and snap it all the way into position. The dimple 312 can be used to receive the end of such a tool and a user can tap the opposite end of the tool (e.g., using the palm of his or her hand or a hammer) while it is received in the dimple to help snap the clip 300 into place.

If it is ever desirable to remove the clip 300, a user suitably grabs the clip by the handle 330 and uses the handle to pull the clip off the channel framings 10. Because the lead-ins 310 do not extend as far into the fitting grooves 26 it can be easier to start unsnapping the clip from the end 306 having the lead-ins. For example, the user pulls the handle 330 to rotate the adjacent end 306 of the clip 300 away from the channel framings 10 to pull the lead-ins 310 out of the fitting grooves 26 first. Then, by continuing to pull on the handle 330 and/or continuing to rotate the clip 300, the rest of the clip can be progressively withdrawn from the fitting groove 26 to separate the clip from channel framings 10.

Another clip, which may be substantially identical to the clip 300 described herein can be installed on the opposite side of the channel framings 10 to hold the other sides of the channel framings together. Additional clips, which can also be substantially identical to the clip 300 described above, can be installed along different axial segments of the channel framings 10 if desired or necessary for additional support.

Referring to FIGS. 56-59, another embodiment of a fitting for use with the channel framing 10 is generally indicated at reference numeral 400. The fitting 400 is generally in the form of a clip that is substantially identical to the clip 300 described above except as noted. The clip 400 does not include any handle 330. Instead, a portion of the upper surface of the clip 400 at the end opposite the dimple 312 is raised to form a pocket 404 for receiving the end of a tool (e.g., screwdriver) to facilitate removal of the clip from the channel framings 10. The pocket 404 is suitably sized and shaped to receive the end of a flathead screwdriver. For example, the pocket 404 is suitably tapered inward from its open end to generally conform to the shape of a flathead screwdriver.

The clip 400 is suitably installed in substantially the same manner as the clip 300 described above. If it is desired to remove the clip 400 from the channel framings 10, a user suitably inserts the end of a tool (e.g., flathead screwdriver or other similar tool) into the pocket 404 and uses the tool to pry the clip off the channel framings 10.

Another embodiment of a hanger assembly, generally designated 500, is illustrated in FIGS. 60-69. The hanger assembly 500 is similar to the hanger assembly 58 described above and illustrated in FIG. 10, except that it uses a different fitting 502 instead of the coupling component 62 of the hanger 58 described earlier. The fitting 502 is similar to the fitting 250 described earlier and illustrated in FIG. 42 except as noted. In particular, the fitting has separate upper (or outer) and lower (or inner) components, generally indicated at 504, 506, respectively, each of which is configured for attachment (e.g., snap-fit attachment) to one of the sides 12, 14, 16, 18 of the framing 10 and for spanning across the fitting groove 26, or the slot 19, as the case may be in a manner generally similar to the fitting 250 described above. The inner 506 and outer 504 components also overlap one another as they span the fitting groove 26 or slot 19. Fingers 512 and 516 extend down at the ends of the outer and inner components 504, 506, respectively. The inner component 506 suitably has slots 514 for receiving the fingers 512 on the end of the outer component. For reasons that will become clear, the slots 514 are wider than the width of the fingers 512 to allow relative movement of the fingers in the slots.

Figure 64:
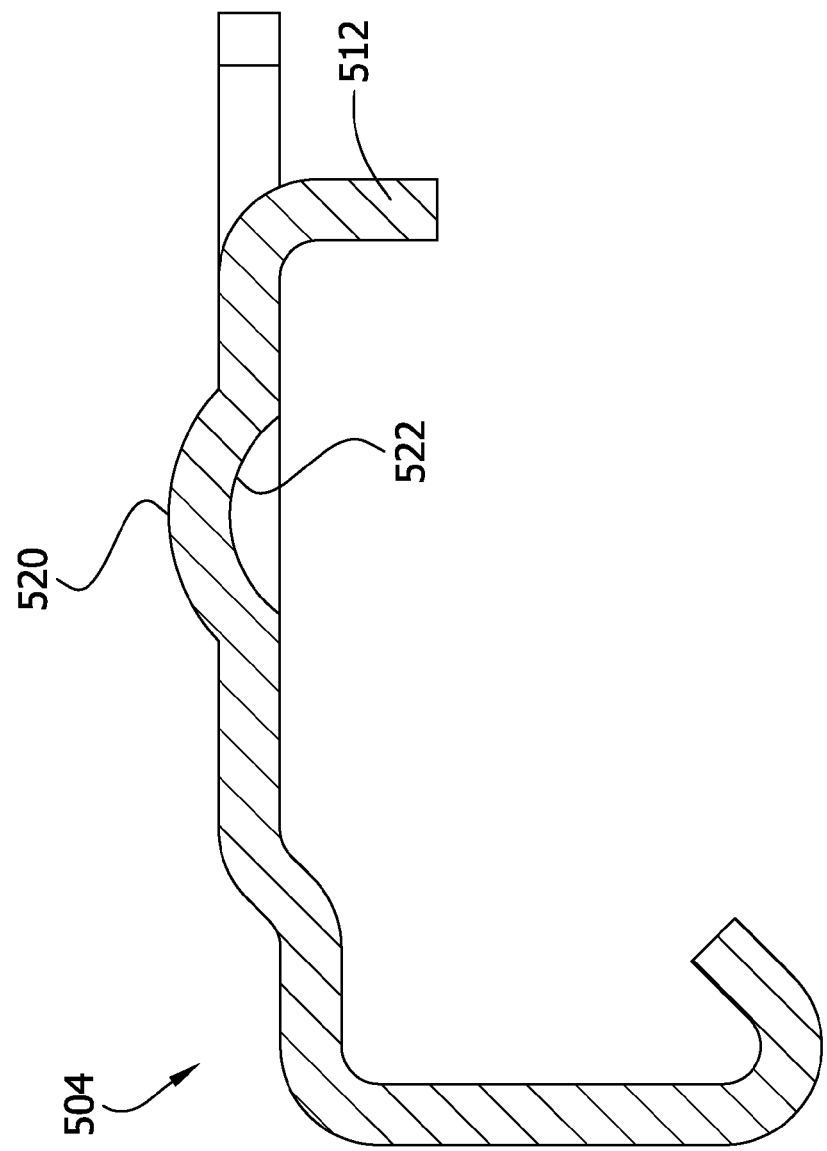
FIG. 64 is a side elevation of a cross section of one component of the fitting of FIG. 63 taken in a transverse plane including one of a pair of dimples thereon.
Figure 65:
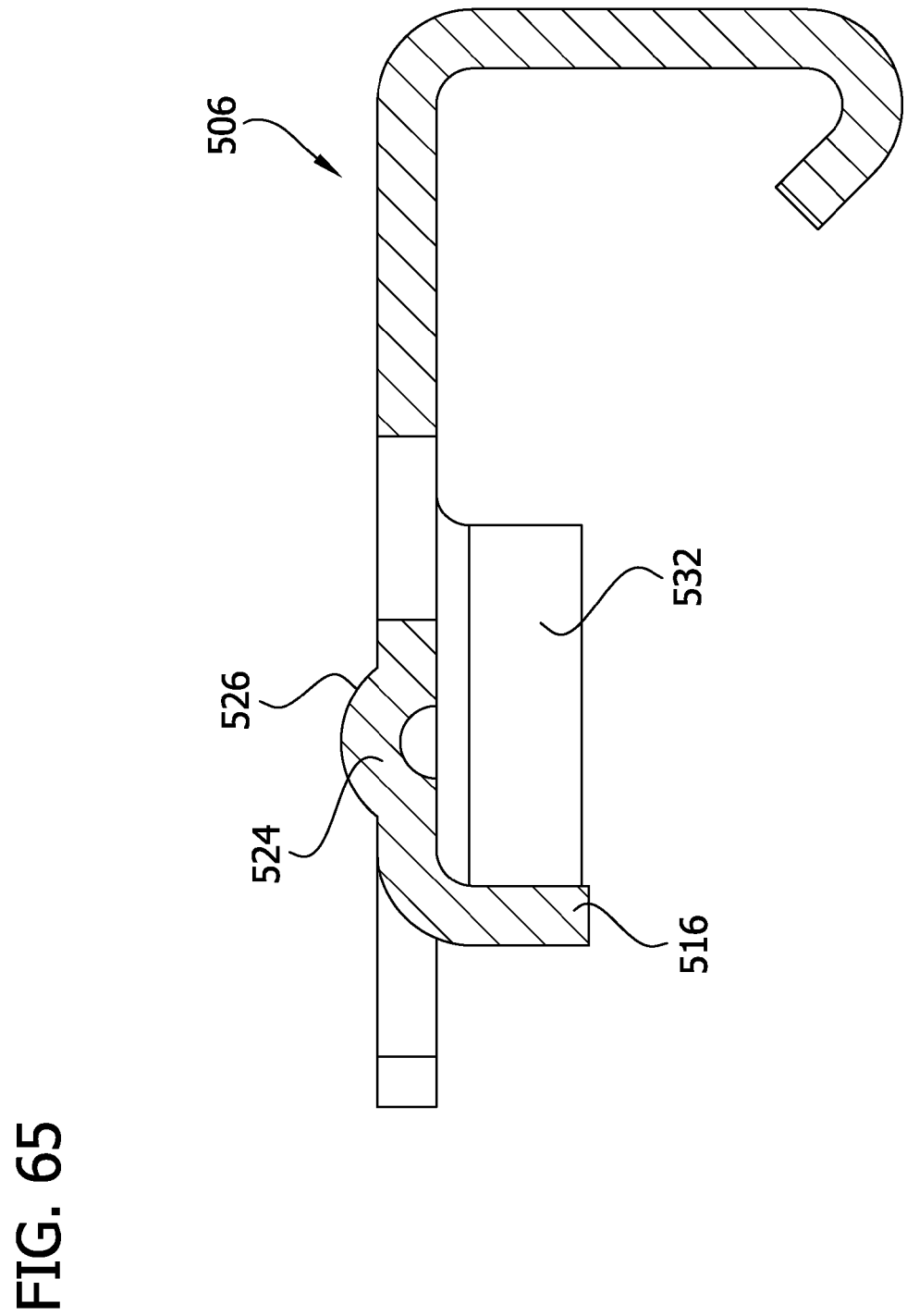
FIG. 65 is a side elevation a cross section of another component of the fitting of FIG. 63 taken in a transverse plane including one of a pair of dimples thereon.
Figure 66:
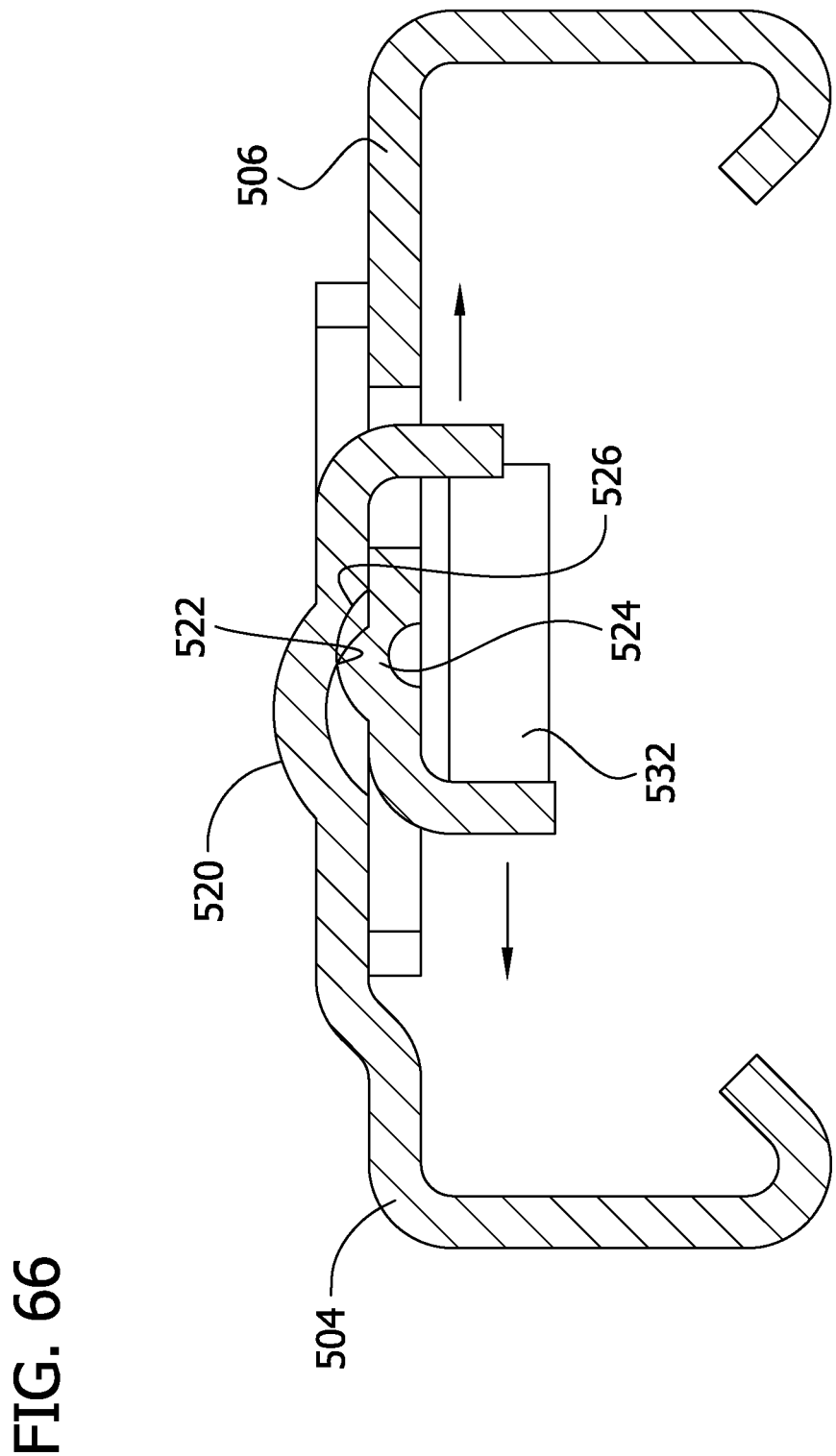
FIG. 66 is a side elevation of a cross section of the fitting of FIG. 63 taken in a plane including corresponding dimples on the components of the fitting.

An inclined surface 522 on the inner surface of the outer component 504 is positioned to engage an inclined surface 526 on the outer surface of the inner component 506, as illustrated in FIGS. 64-66. In particular, the inclined surfaces 522, 526 are arranged so when the inner and outer components 506, 504 are squeezed vertically toward one another (e.g., using a nut) reaction forces at the inclined surfaces due to the interaction of the components at the inclined surfaces tend to draw the components closer to one another laterally. In the illustrated embodiment, for example the inclined surfaces 522, 526 are produced by forming dimples 520, 524 in the outer and inner components 504, 506. It is recognized that there are other ways to form inclined surfaces within the broad scope of the invention. As illustrated, each component 504, 506 has a pair of dimples 520, 524. Referring to FIG. 66, the dimples 520 in the outer component 504 are offset laterally from the dimples 524 in the inner component 506 (e.g., 15-30 thousandths of an inch).

Figure 67:
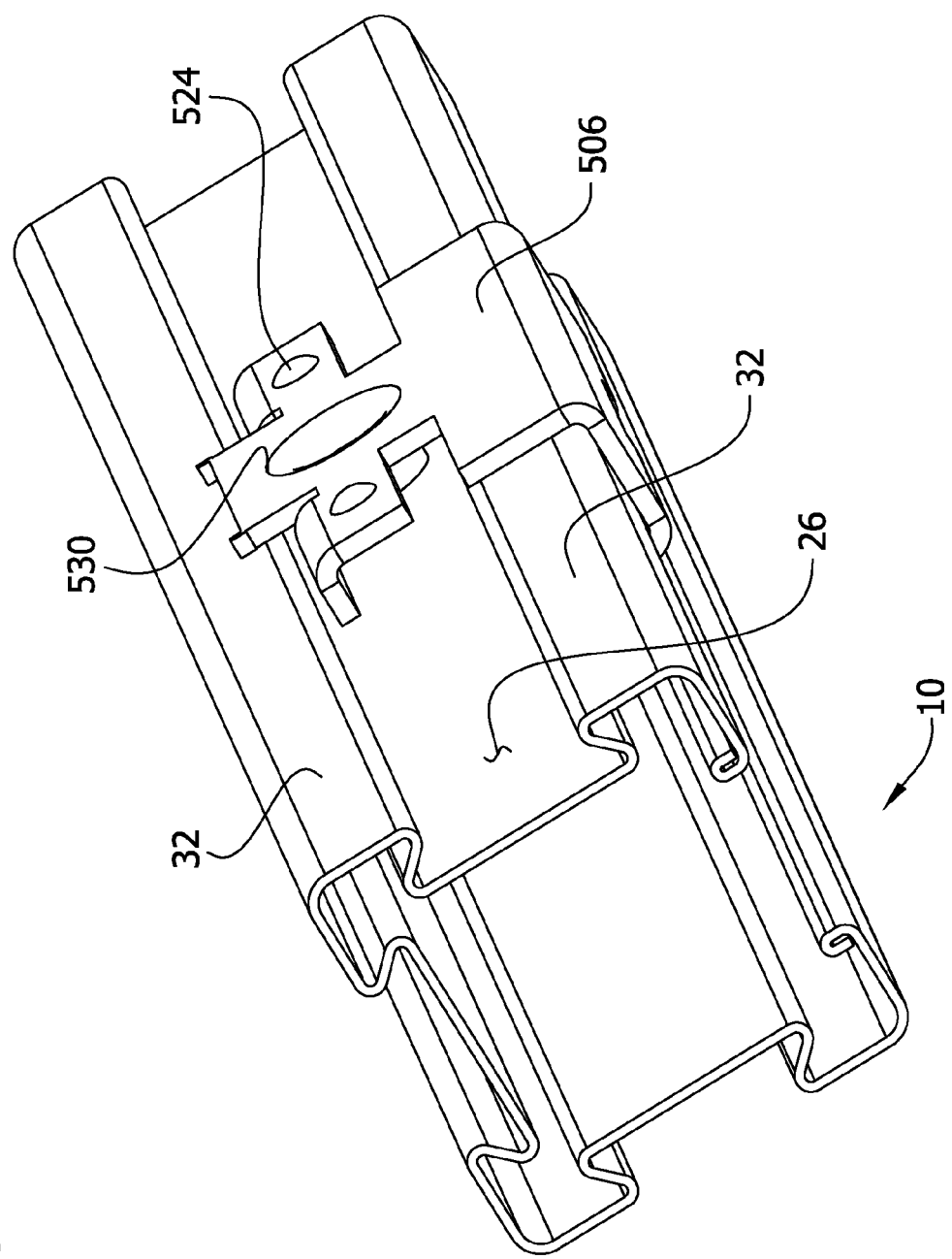
FIGS. 67-69 illustrate the steps in a sequence of securing the fitting of FIG. 63 to the channel framing.
Figure 68:
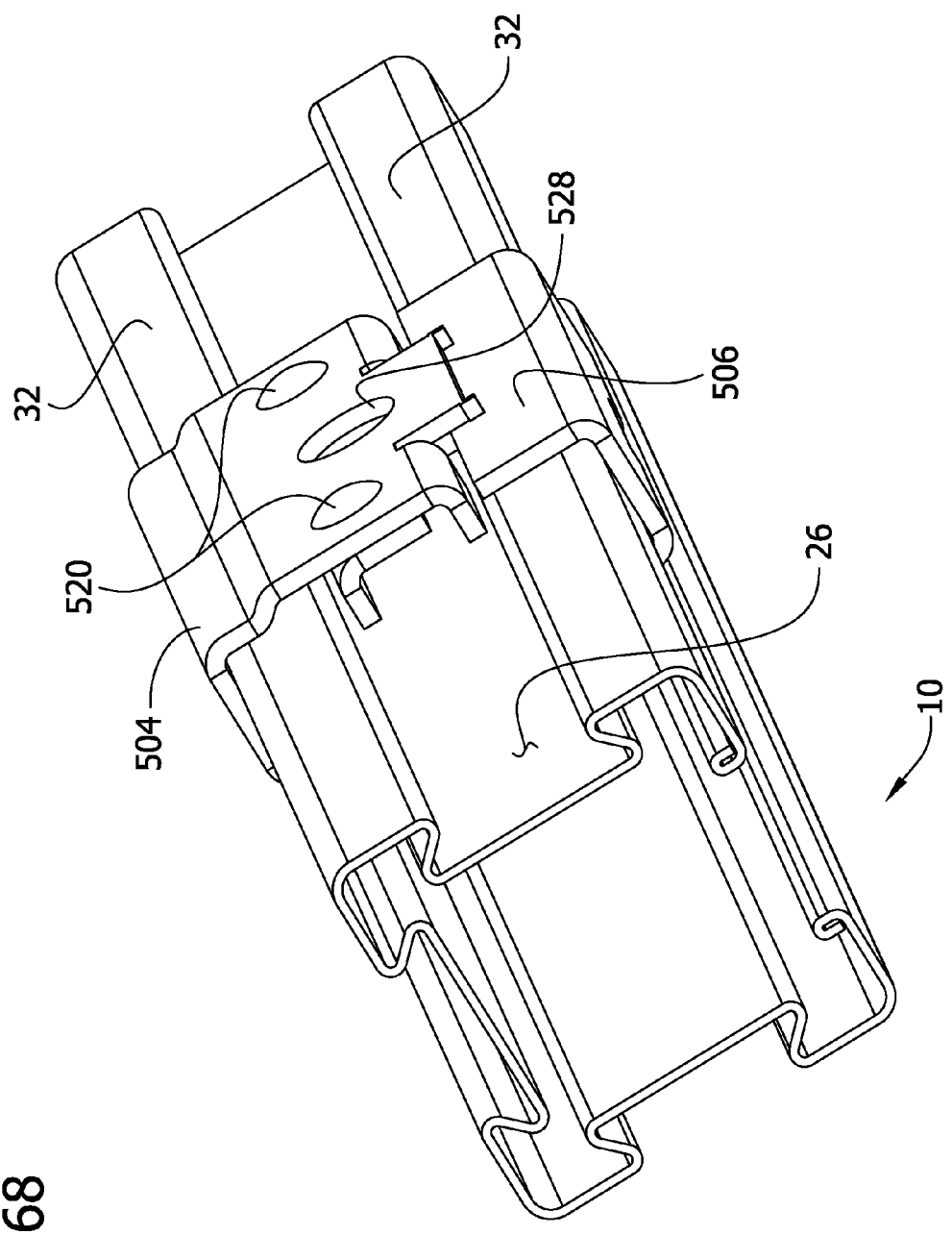
Figure 69:
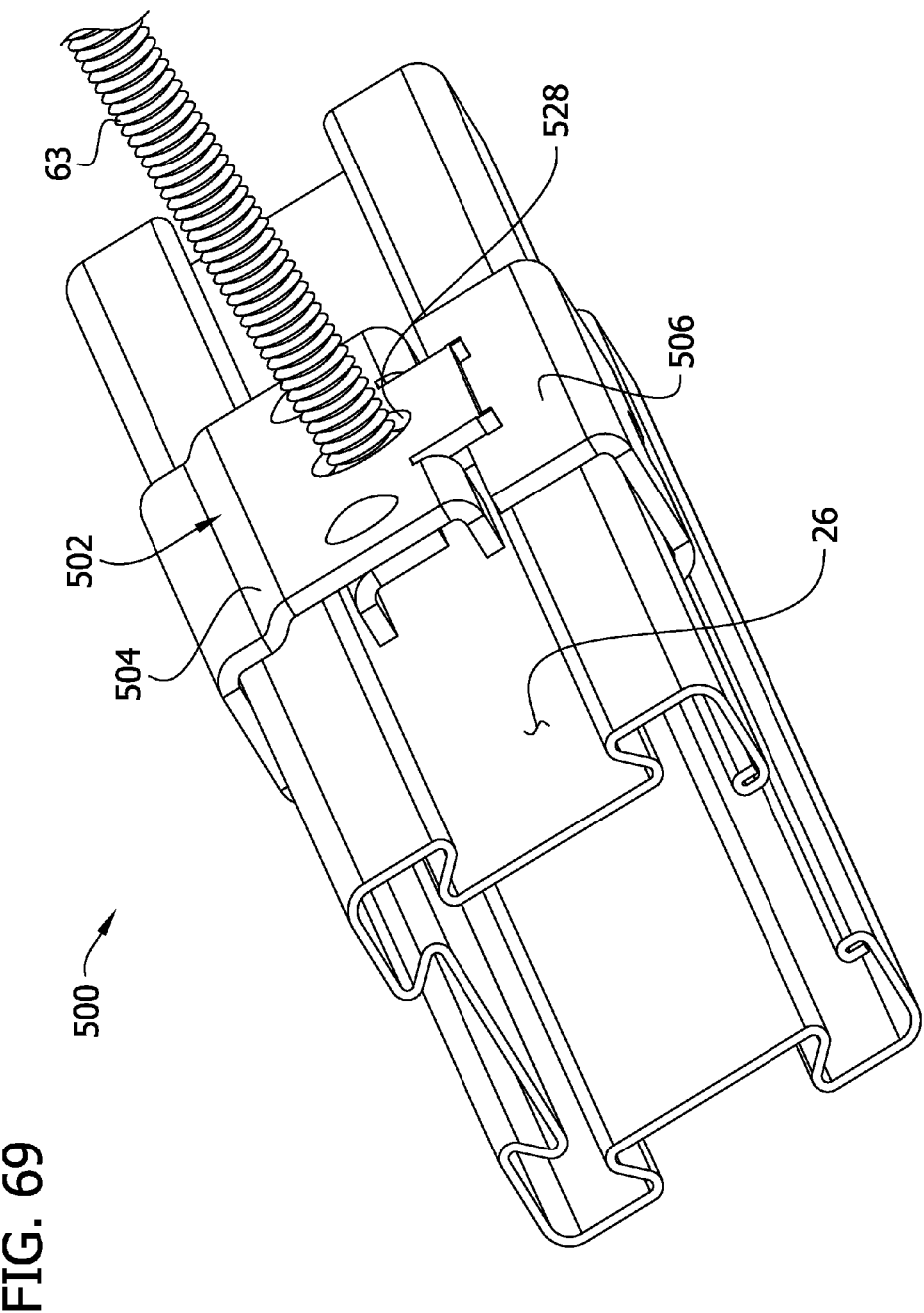

To install the fitting 500, the inner component 506 is snapped into position as illustrated in FIG. 67. Then the outer component 504 is snapped into position over the inner component, as illustrated in FIG. 68. When the inner and outer components 506, 504 are in position on the channel framing 10, a component, such as a threaded rod 63 or a bolt (not shown), can be inserted through the aligned openings 530, 528 in the components 506, 504 and threaded into the fastening member(s) 532 to secure them to the framing 10. A nut (not shown) on the threaded rod 63 can be used to tighten the components 504, 506 against one another. As the nut is tightened, the components 504, 506 are drawn laterally toward one other (as indicated by the arrows in FIG. 66) due to the inclined surfaces 522, 526 of the dimples 520, 524 until enough of the offset in the positions of the dimples is eliminated to allow the dimples to nest within one another. When the components 504, 506 of the fitting are secured in this manner it is very unlikely that the components will become accidentally dislodged from the channel framing 10.

Figure 70:
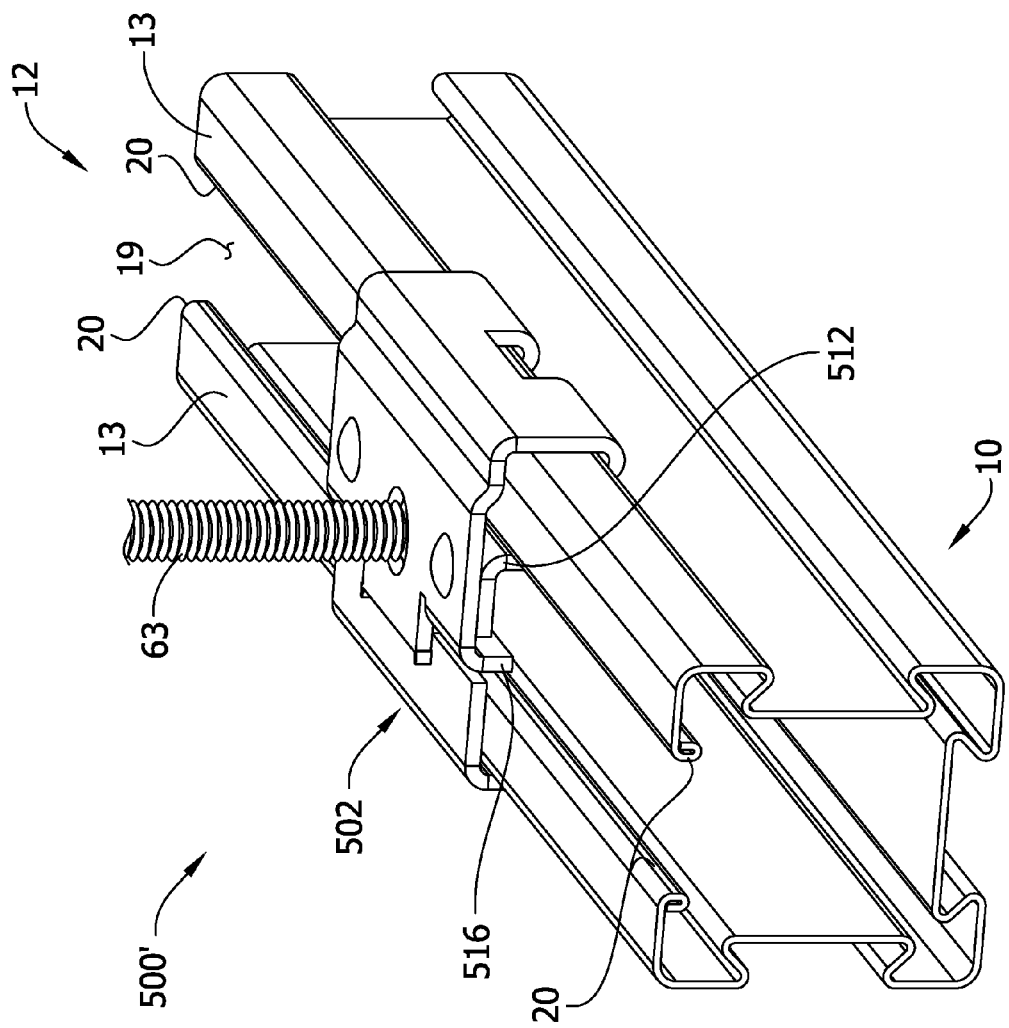
FIG. 70 is a perspective of another embodiment of a hanger assembly.

Referring now to FIG. 70, the hanger assembly 500' is illustrated in a different configuration in which the fitting 502 is installed on the side 12 of the framing 10 having the open slot 19 instead of a fitting groove 26. The fitting 502 operates in substantially the same manner in this configuration 500' of the hanger assembly 500, except the fingers 512, 516 extend into the slot 19 instead of the fitting groove 26. The framing 10 and fitting 502 are dimensioned relative to one another so there is a little bit of space between at least one of the set of fingers 512, 516 and the lips 20 defining the sides of the slot 19. Upon tightening the nut on the rod 63 to squeeze the components 504, 506 together and draw them laterally inward toward one another, the framing is suitably compressed until the lips 20 abut against the fingers 512, 516 at which point the fingers of the components 504, 506 limit further compression of the framing. In this position, the fingers 512, 516 on the components 504, 506 provide additional structural stability to the hanger assembly 500'.

Figure 71:
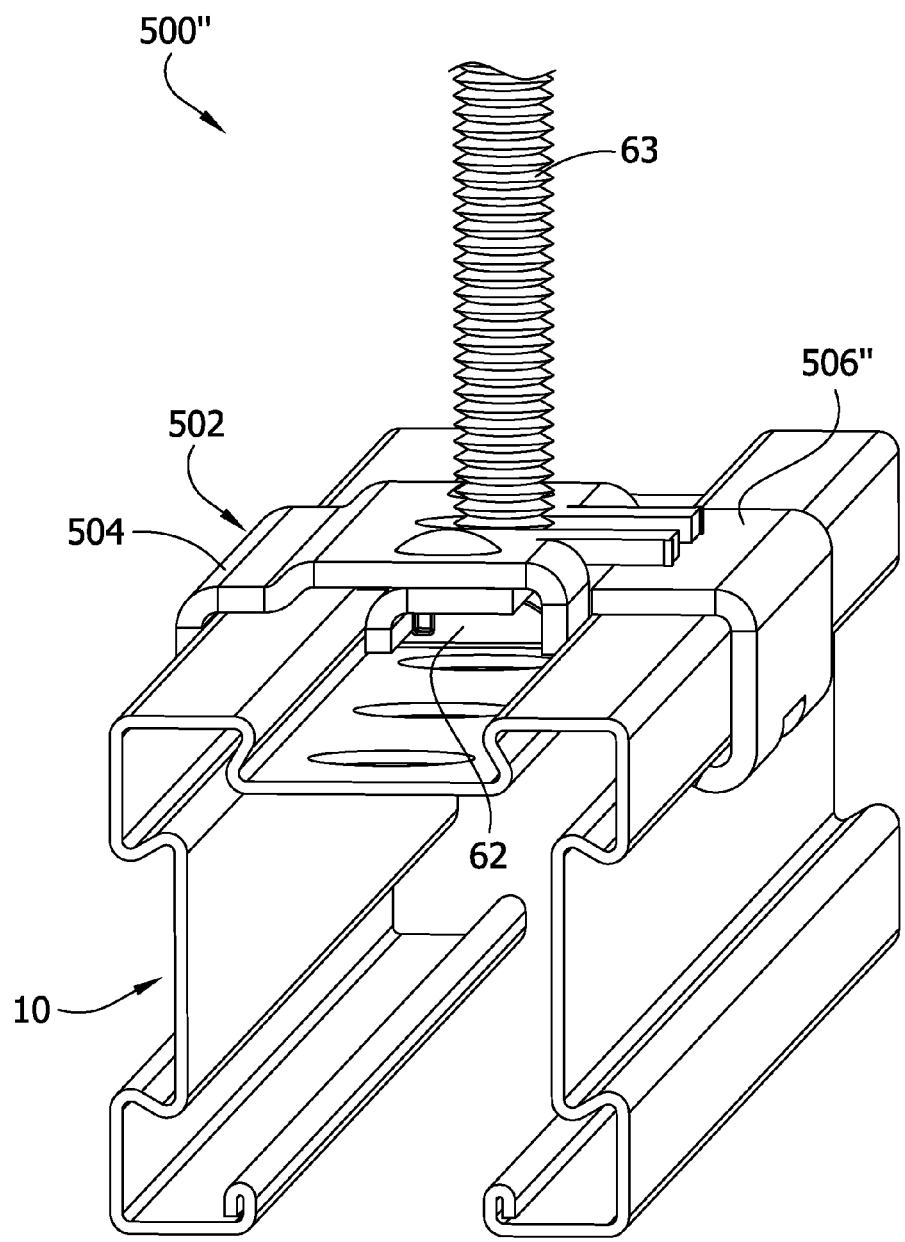
FIG. 71 is a perspective of another embodiment of a hanger assembly.
Figure 72:
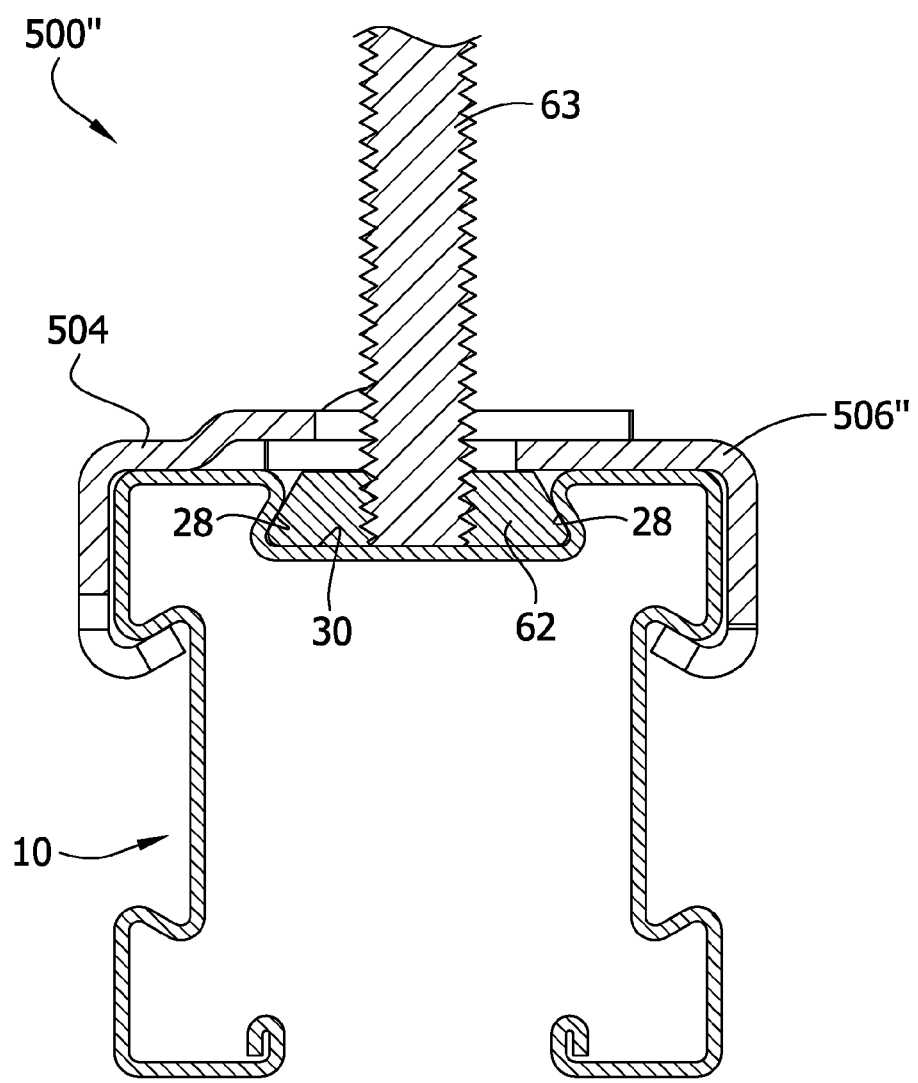
FIG. 72 is a side elevation of a cross section of the hanger assembly of FIG. 71 taken in a transverse plane including the center of a threaded rod of the assembly.

Another embodiment of a hanger assembly 500" is illustrated in FIGS. 71 and 72. It is substantially similar to the hanger assembly 500 described above, except that the coupling component 506" does not include an integral threaded fastener like 532 on 506. One of the coupling components 62 described above is positioned under the inner component 506" so its opening 71 is in alignment with the openings 528, 530 of the fitting components 504, 506". The opening 71 in the coupling component 62 receives the end of the threaded rod 63. The coupling component 62 is suitably locked in the fitting groove 26 as described above. A threaded nut or washer (not shown) on the rod 63 can be used to tighten the components 504, 506" against the coupling component 62.

Figure 73:
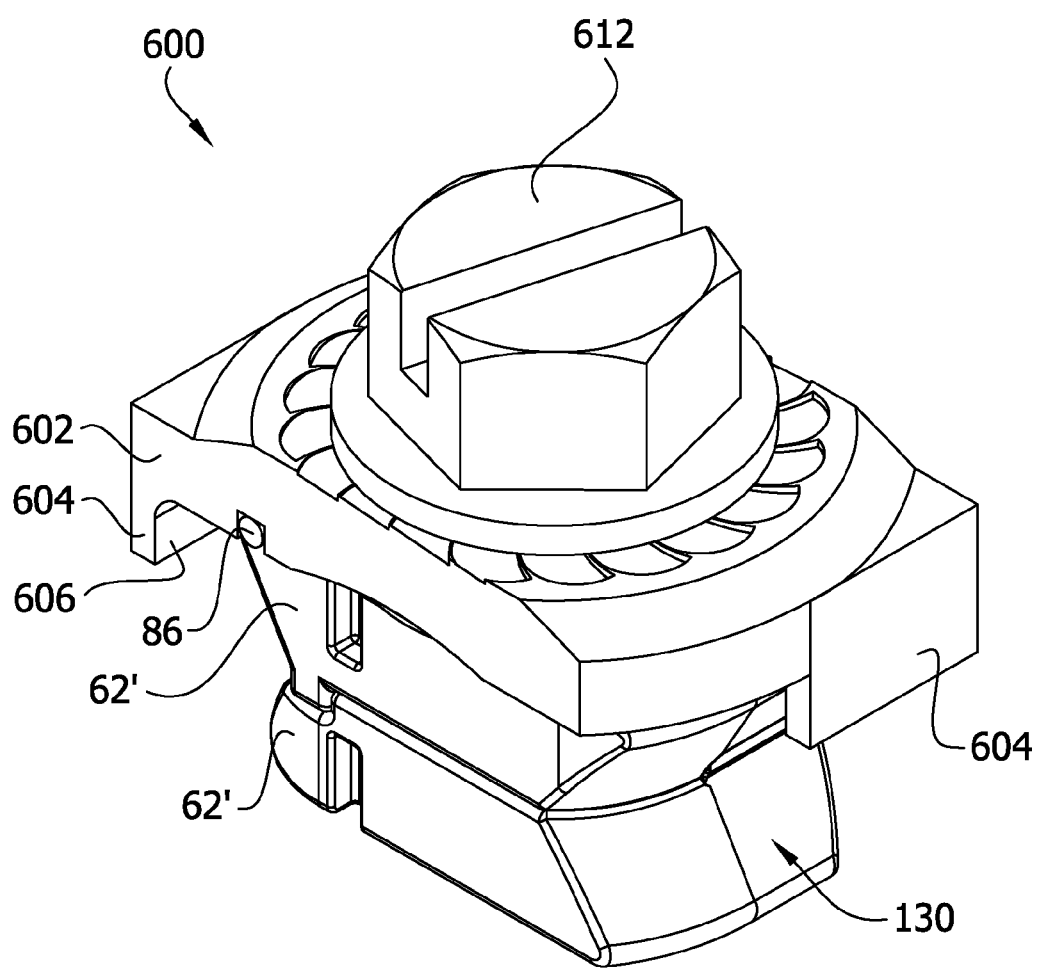
FIG. 73 is a perspective of another embodiment of a fitting including two of the coupling components of FIG. 21 forming a dual coupling component assembly.
Figure 74:
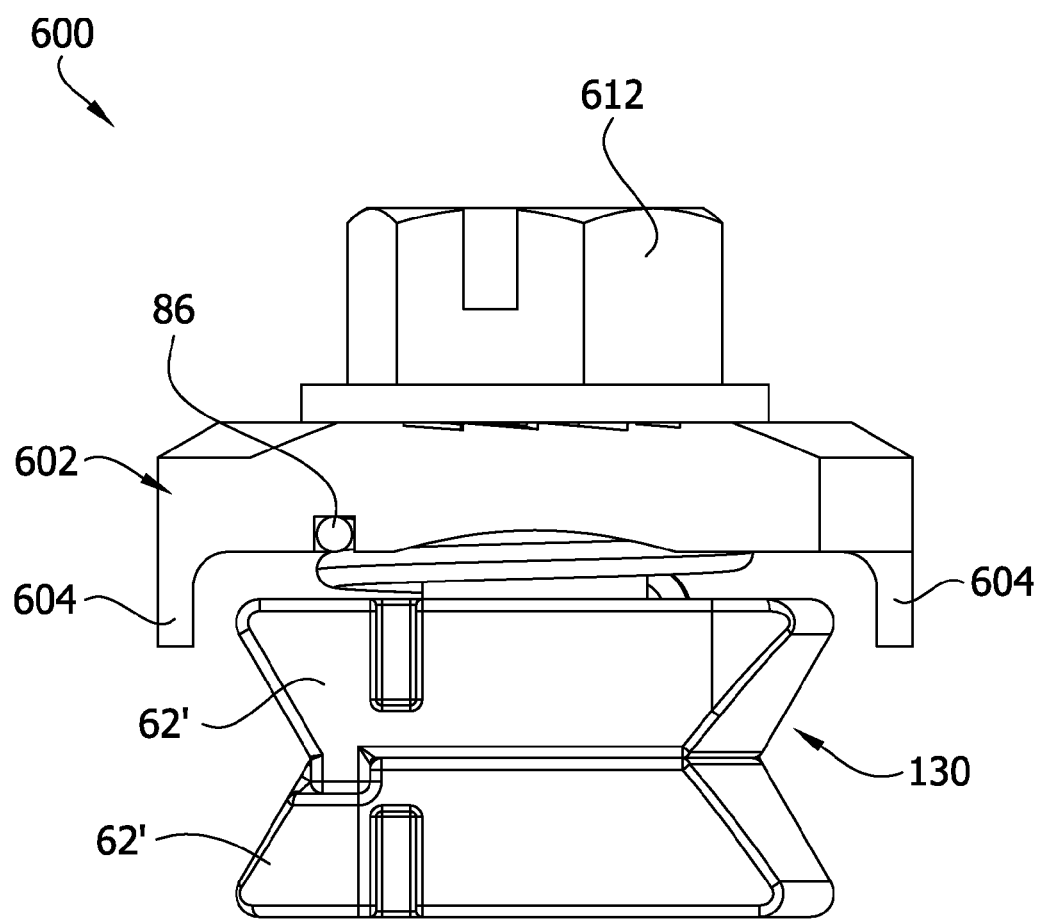
FIG. 74 is a side elevation of the dual coupling component assembly of FIG. 73.
Figure 75:
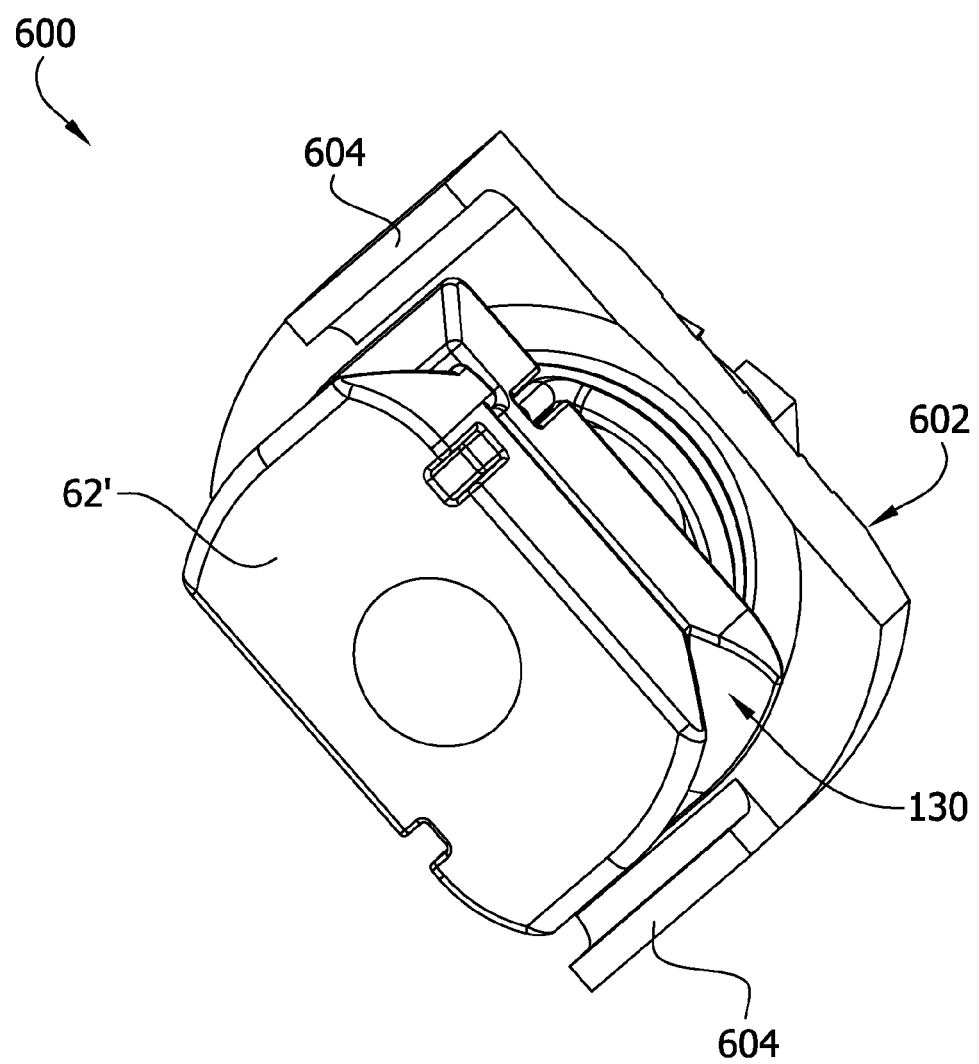
FIG. 75 is another perspective of the dual coupling component assembly of FIG. 73

Referring to FIGS. 73-75, another embodiment of a fitting including the dual coupling component assembly 130 described above is generally designated 600. The fitting 600 is substantially identical to the fitting 150 described above except as noted. The washer 602 is similar to the washer 84 described above except that the washer 62 includes a pair of tabs 604 extending down from the opposite sides of the washer 62. As illustrated in FIG. 74, the tabs 604 extend down past at least the adjacent surface 64' of the coupling component 62' to which it is coupled by the spring 86. The tabs 604 are suitably positioned generally symmetrically at diagonally opposite corners of the washer 602. The tabs 604 have inwardly facing surfaces 606 that are generally parallel to one another. The tabs 604 are suitably spaced from one another a distance that is about equal to the width of the fitting groove 26 of the channel framing 10 plus the thickness of the material used to make the channel framing. When the washer 602 is attached to the dual coupling component assembly 130, as illustrated in FIG. 74, the tabs 604 are positioned outside and spaced from the opposite sides 70' of the adjacent coupling component 62'.

Figure 76:
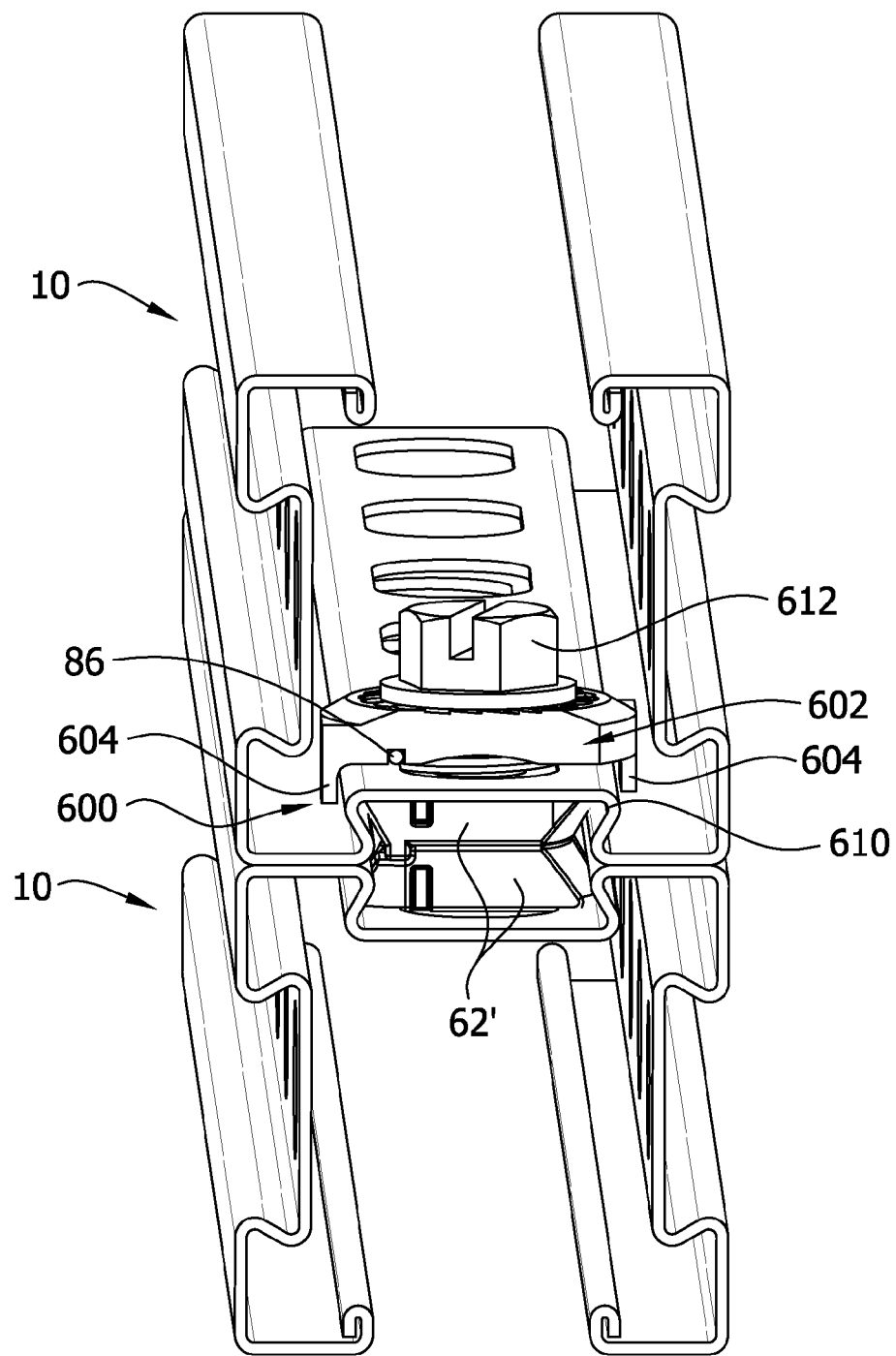
FIG. 76 is a perspective of two pieces of channel framing connected to one another in a side-by-side arrangement by the fitting of FIG. 73.
Figure 77:
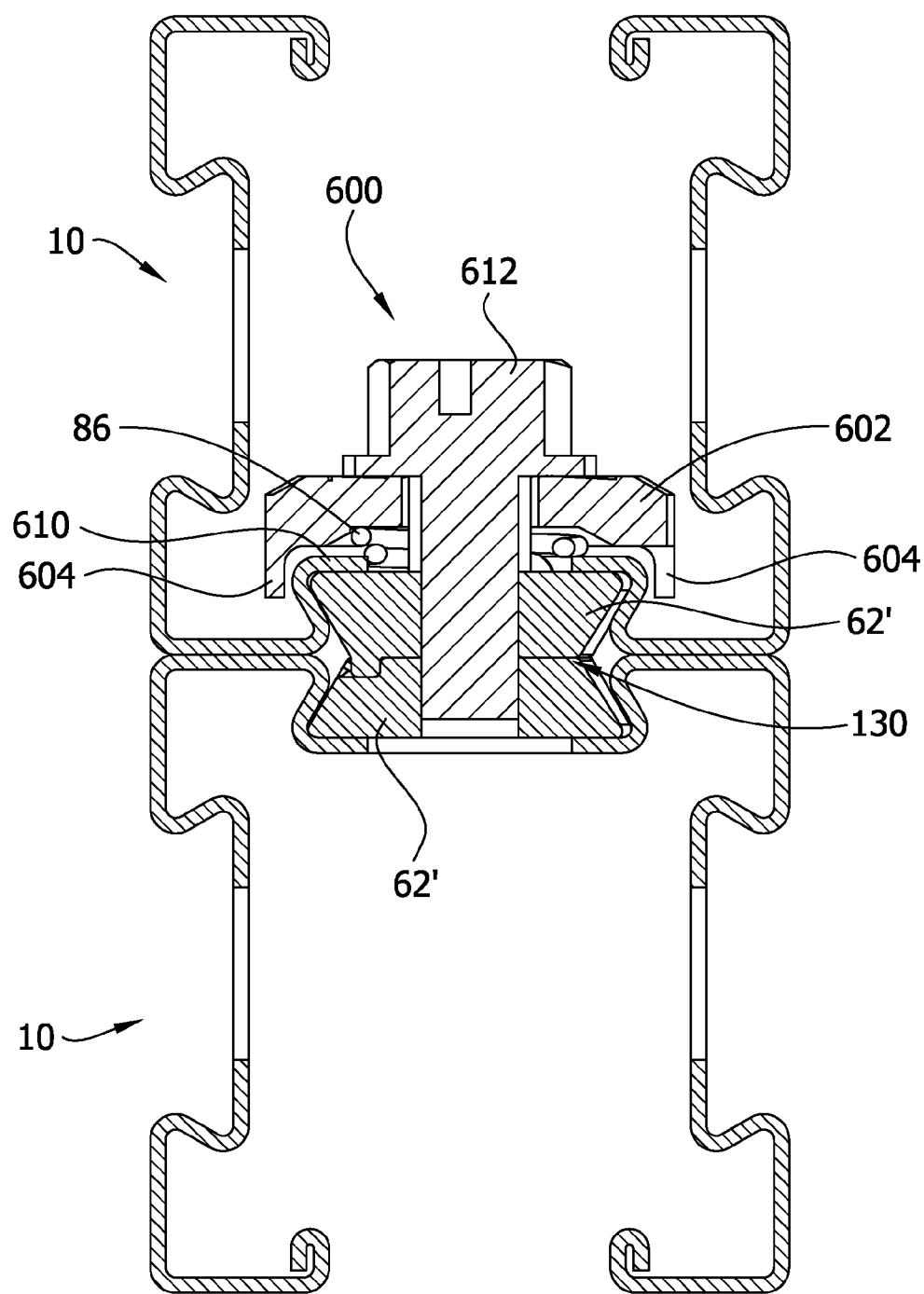
FIG. 77 is a side elevation of the two pieces of channel framing illustrated in FIG. 76.
Figure 78:
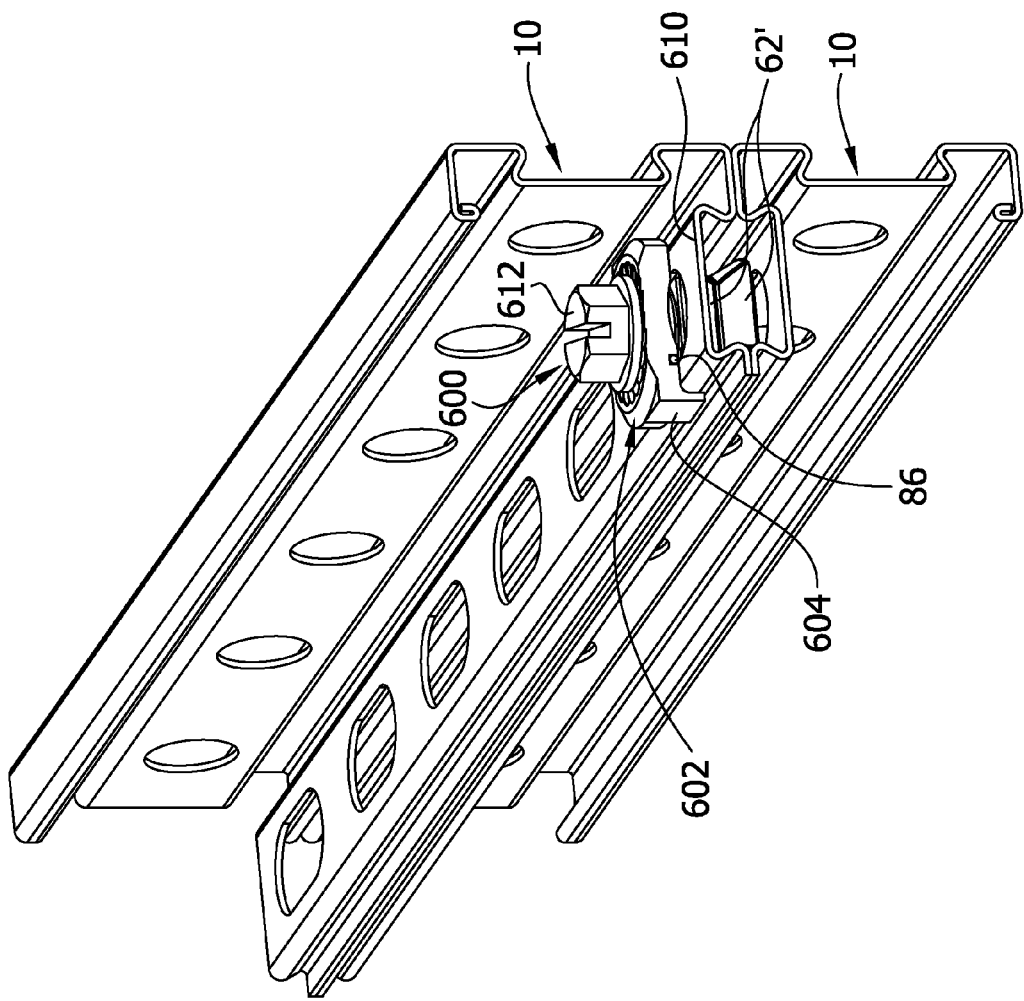
FIG. 78 is a fragmentary perspective of the two pieces of channel framing illustrated in FIG. 76 with portions of the channel framings removed to show internal features.

The fitting 600 can be used to connect two pieces of channel framing 10 to one another in a side-by-side configuration, as shown in FIGS. 76-78, in substantially the same way as the fitting 150 described above. When the fitting 600 is installed in this manner, the tabs 604 on the washer 602 fit over the sides of the internally extending rail 610 formed by the contours of the channel framing 10 on the inside of the fitting groove 26. Because the tabs 604 extend over the sides of the rail 610, the tabs 604 limit rotation of washer 602. For example, if the washer 602 begins to rotate in either direction, the tabs 604 will collide with the rail 610 and block further rotation of the washer 602. This helps keep the washer 602 generally in its intended orientation as the bolt 612 securing the coupling components 62' is tightened. Because the spring 86 is attached to the washer 602 as well as one of the coupling components 62' having the washer in the correct orientation also helps ensure the coupling components 62' do not accidentally rotate out of position.

As can be seen from the above disclosure, in at least some embodiments two or more pieces of channel framing can be readily and easily secured to one another using one or more of the fittings disclosed above. For example, the two or more pieces of channel framing can be readily combined at the job site, without the need to have the pieces of channel framing welded to one another. Thus, workers at the job site have the flexibility to assemble channel framing assemblies by themselves, according to the needs at the job site. Furthermore, the workers can also quickly and easily disassemble and re-use pieces of channel framing that were assembled at the job site.

In addition, as can also be seen from the above disclosure, in at least some embodiments one or more sides of the channel framing, in addition to the slotted side having the continuous slot opening (e.g., side 12), can be used to connect components (e.g., hanger rods, pipes, etc.) to the channel framing. In one particular application, the side opposite the slotted side (e.g., side 14) can be used to connect desired components to the channel framing. Moreover, the side 12 of the channel framing 10 having the slot 19 can have the same configuration as the slotted sides of conventional channel framings to make the systems described herein compatible with existing channel nuts, pipe clamps, miscellaneous fitting, etc.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A fitting for connecting first and second pieces of channel framing to one another, wherein each piece of channel framing includes an elongate channel framing body having opposite longitudinal ends, a length extending between the opposite longitudinal ends, an interior surface defining an open interior extending lengthwise of the body, and a fitting side defining an external fitting groove extending lengthwise of the body, the fitting comprising:

a coupling component having first and second coupling portions, the first coupling portion having a dovetail cross-sectional shape which tapers toward the second coupling portion, the second coupling portion having a dovetail cross-sectional shape which tapers toward the first coupling portion and is inverted relative to the first coupling portion, wherein the first and second coupling portions are fixed to one another to inhibit relative rotation between the first and second coupling portions, wherein the first coupling portion is configured for reception in the fitting groove of the first piece of channel framing, and the second coupling portion is configured for reception in the fitting groove of the second piece of channel framing to connect the first and second pieces of channel framing to one another such that the fitting sides of the first and second pieces of channel framing are juxtaposed and face one another; and a washer secured to the coupling component and configured to engage the interior surface of the fitting side of the first piece of channel framing when the first and second coupling portions of the coupling component are received in the respective fitting grooves of the first and second pieces of channel framing.

2. The fitting set forth in claim 1, further comprising a resiliently deformable element interposed between and connecting the coupling component and the washer, the resiliently deformable element configured to generate a force to clamp the fitting side of the first piece of channel framing between the washer and the coupling component.

3. The fitting set forth in claim 1, wherein the coupling component comprises a nut, the nut defining a threaded opening for receiving a threaded fastener.

4. The fitting set forth in claim 3, wherein the washer defines a through opening generally aligned with the threaded opening defined by the nut.

5. The fitting set forth in claim 1, wherein the coupling component comprises first and second nuts secured to one another, wherein the first nut defines the first coupling portion and the second nut defines the second coupling portion.

6. The fitting set forth in claim 1, in combination with the first and second pieces of channel framing, wherein the first coupling portion is secured within the fitting groove of the first piece of channel framing, and the second coupling portion is secured within the fitting groove of the second piece of channel framing to connect the first and second pieces of channel framing to one another such that the fitting sides of the first and second pieces of channel framing are juxtaposed and face one another.

7. The fitting in combination with the first and second pieces of channel framing set forth in claim 6, wherein each fitting groove of the first and second pieces of channel framing has a dovetail cross-sectional shape.

8. The fitting in combination with the first and second pieces of channel framing set forth in claim 6, wherein the fitting includes a washer secured to the coupling component and engaging an interior surface of the fitting side of the first piece of channel framing.

9. The fitting in combination with the first and second pieces of channel framing set forth in claim 6, wherein the first piece of channel framing defines a fitting opening extending through the fitting side from the interior surface to the fitting groove, wherein the fitting extends through fitting opening.

10. The fitting in combination with the first and second pieces of channel framing set forth in claim 9, wherein the fitting includes a stop configured to limit rotation of the coupling component within the respective fitting grooves of the first and second pieces of channel framing.

11. The fitting in combination with the first and second pieces of channel framing set forth in claim 8, wherein the fitting includes a resiliently deformable element interposed between and connecting the coupling component and the washer, the resiliently deformable element configured to generate a force to clamp the fitting side of the first piece of channel framing between the washer and the coupling component.

12. A method of assembling a channel framing assembly, the method comprising:
provided a first piece of channel framing including an elongate first channel framing body having opposite longitudinal ends, a length extending between the opposite longitudinal ends, an interior surface defining an open interior, a fitting side defining an external fitting groove extending lengthwise of the first channel framing body, and a slotted side defining an elongate slot extending lengthwise of the first channel framing body and into the open interior of the first channel framing body;
providing a second piece of channel framing including an elongate second channel framing body having opposite longitudinal ends, a length extending between the opposite longitudinal ends, an open interior, a fitting side defining an external fitting groove extending lengthwise of the second channel framing body, and a slotted side defining an elongate slot extending lengthwise of the second channel framing body and into the open interior of the second channel framing body;
providing a fitting including
a coupling component having first and second coupling portions, the first coupling portion having a dovetail cross-sectional shape which tapers toward the second coupling portion, the second coupling portion having a dovetail cross-sectional shape which tapers toward the first coupling portions and is inverted relative to the first coupling portion, wherein the first and second coupling portions are fixed to one another to inhibit relative rotation between the first and second coupling portions, wherein the first coupling portion is configured for reception in the fitting groove of the first piece of channel framing, and the second coupling portion is configured for reception in the fitting groove of the second piece of channel framing to connect the first and second pieces of channel framing to one another such that the fitting sides of the first and second pieces of channel framing are juxtaposed and face one another, and
a washer secured to the coupling component and configured to engage the interior surface of the fitting side of the first piece of channel framing when the first and second coupling portions of the coupling component are received in the respective fitting grooves of the first and second pieces of channel framing; and
connecting, using the fitting, the first and second pieces of channel framing to one another such that the fitting sides of the first and second pieces of channel framing are juxtaposed and face one another, wherein said connecting the first and second pieces of channel framing to one another includes
inserting the first coupling portion of the coupling component within the fitting groove of the first piece of channel framing,
inserting the second coupling portion of the coupling component within the fitting groove of the second piece of channel framing, and
engaging the interior surface of the fitting side of the first piece of channel framing with the washer secured to the coupling component when the first and second coupling portions of the coupling component are received in the respective fitting grooves of the first and second pieces of channel framing.

13. The method of assembling a channel framing assembly set forth in claim 12, wherein the first piece of channel framing defines a fitting opening extending through the fitting side from the interior surface to the fitting groove, wherein said connecting the first and second pieces of channel framing to one another includes inserting the fitting into the open interior of the first piece of channel framing and then inserting the coupling component through the fitting opening and into the fitting groove of the first piece of channel framing.

14. The method of assembling a channel framing assembly set forth in clam 13, further comprising rotating the coupling component, after said inserting the first coupling portion of the coupling component and after said inserting the second coupling portion of the coupling component, to lock the coupling component in the respective first and second fitting grooves of the first and second pieces of channel framing.

15. A fitting for connecting first and second pieces of channel framing to one another, wherein each piece of channel framing includes an elongate channel framing body having opposite longitudinal ends, a length extending between the opposite longitudinal ends, an interior surface defining an open interior extending lengthwise of the body, and a fitting side defining an external fitting groove extending lengthwise of the body, the fitting comprising:
a coupling component having first and second coupling portions, the first coupling portion having a dovetail cross-sectional shape which tapers toward the second coupling portion, the second coupling portion having a dovetail cross-sectional shape which tapers toward the first coupling portion and is inverted relative to the first coupling portion, wherein the first and second coupling portions are fixed to one another to inhibit relative rotation between the first and second coupling portions,
wherein the first coupling portion is configured for reception in the fitting groove of the first piece of channel framing, and the second coupling portion is configured for reception in the fitting groove of the second piece of channel framing to connect the first and second pieces of channel framing to one another such that the fitting sides of the first and second pieces of channel framing are juxtaposed and face one another,
wherein the coupling component is elongate having opposite longitudinal ends and a length extending between the opposite longitudinal ends, each of the first and second coupling portions of the coupling component being slidably insertable lengthwise into the respective fitting grooves of the first and second pieces of channel framing through open groove ends of the fitting grooves,
wherein the coupling component defines a fastener opening configured to receive a fastener to fasten the coupling component to the pieces of channel framing.

16. The fitting set forth in claim 15, in combination with the first and second pieces of channel framing, wherein the first coupling portion is secured within the fitting groove of the first piece of channel framing, and the second coupling portion is secured within the fitting groove of the second piece of channel framing to connect the first and second pieces of channel framing to one another such that the fitting sides of the first and second pieces of channel framing are juxtaposed and face one another.

17. The fitting in combination with the first and second pieces of channel framing set forth in claim 16, further comprising a fastener received in the fastener opening, wherein the fastener fastens the coupling component to the first piece of channel framing.

18. The fitting set forth in claim 1, further comprising a threaded fastener securing the washer to the coupling component.

19. Channel framing assembly comprising:
   first and second pieces of channel framing, wherein each of the first and second pieces of channel framing includes an elongate channel framing body having opposite longitudinal ends, a length extending between the opposite longitudinal ends, an interior surface defining an open interior extending lengthwise of the body, and a fitting side defining an external fitting groove extending lengthwise of the body: and
   a fitting connecting the first and second pieces of channel framing to one another, the fitting comprising a coupling component having first and second coupling portions, the first coupling portion having a dovetail cross-sectional shape which tapers toward the second coupling portion, the second coupling portion having a dovetail cross-sectional shape which tapers toward the first coupling portion and is inverted relative to the first coupling portion, wherein the first and second coupling portions are fixed to one another to inhibit relative rotation between the first and second coupling portions, wherein the first coupling portion is configured for reception in the fitting groove of the first piece of channel framing, and the second coupling portion is configured for reception in the fitting groove of the second piece of channel framing to connect the first and second pieces of channel framing to one another such that the fitting sides of the first and second pieces of channel framing are juxtaposed and face one another,
   wherein the first coupling portion is secured within the fitting groove of the first piece of channel framing, and the second coupling portion is secured within the fitting groove of the second piece of channel framing to connect the first and second pieces of channel framing to one another such that the fitting sides of the first and second pieces of channel framing are juxtaposed and face one another,
   wherein the fitting includes a washer secured to the coupling component and engaging an interior surface of the fitting side of the first piece of channel framing.

\* \* \* \* \*